INVENTOR
CEBERN B. TRIMBLE
BY Louis A Kline
John J. Callahan
HIS ATTORNEYS

Oct. 25, 1966 C. B. TRIMBLE 3,281,787

CHARACTER IDENTIFICATION SYSTEM HAVING IMPROVED RESISTOR MATRIX WAVE-SHAPE-IDENTIFYING MEANS

Filed Dec. 5, 1963

28 Sheets-Sheet 3

"O" & "I" CHARACTER WAVE FORMS AS SEEN BY "O" RESISTOR MATRIX

Oct. 25, 1966 C. B. TRIMBLE 3,281,787

CHARACTER IDENTIFICATION SYSTEM HAVING IMPROVED RESISTOR MATRIX WAVE-SHAPE-IDENTIFYING MEANS

Filed Dec. 5, 1963 28 Sheets-Sheet 19

United States Patent Office 3,281,787
Patented Oct. 25, 1966

3,281,787

CHARACTER IDENTIFICATION SYSTEM HAVING IMPROVED RESISTOR MATRIX WAVE-SHAPE-IDENTIFYING MEANS

Cebern B. Trimble, Dayton, Ohio, assignor to The National Cash Register Company, Dayton, Ohio, a corporation of Maryland Filed Dec. 5, 1963, Ser. No. 328,292
3 Claims. (Cl. 340—146.3)

The present invention relates to character identification apparatus and more particularly relates to improved apparatus for automatically reading human language and providing an output which can be employed in an information-handling machine.

In United States Patent No. 2,924,812, issued to Philip E. Merritt and Carroll M. Steele on February 9, 1960, there is disclosed an automatic reading system whereby human language may be converted into machine language by, for example, printing the human language symbol in ink which is capable of being magnetized, passing these ink symbols in sequence past a magnetic transducer for generating electrical signals having a distinctive wave shape for each symbol, and recognizing the distinctive wave shapes. The electrical signal derived from each symbol passing the magnetic transducer is applied to a delay line. A plurality of correlation networks are connected to sampling points spaced along the delay line. A different correlation network is provided for the different wave shapes which are to be applied to the system. Each correlation network is an electric circuit adapted to provide an output signal which is greater than that provided by any other one of the correlation networks when all networks receive identical input signals having the wave shape of a given one of the group of symbols to be recognized. The output signals of all of these networks are applied to circuits which detect the maximum correlation network output signal and in response thereto energize one of a number of leads corresponding to the symbol to be recognized. In this manner, recognition of human language may be achieved automatically.

An object of the present invention is to provide an improved character identification apparatus of the type shown in said United States Patent No. 2,924,812; that is, apparatus which utilizes summing networks to provide identification of the various characters.

In accordance with the present invention, there is provided, in a system for identifying each of a plurality of different wave shapes, apparatus comprising sampling means for receiving any one of said wave shapes and, in response thereto, for dispensing a plurality of samples thereof, and a plurality of wave-shape identifying means, each corresponding to one of the wave shapes and coupled to said sampling means to have delivered thereto predetermined ones of said samples according to its corresponding wave shape, each of said wave-shape-identifying means including summing means for producing, in response to the predetermined samples, a wave-shape-identifying output signal having an amplitude that is the greatest with respect to amplitudes of the output signals of the others of said summing means when the corresponding summing means wave shape occupies a reference position in the sampling means, each of the wave-shape-identifying means further including summing means output signal reduction means for reducing the amplitude of the output signals of all of the summing means except the summing means of the wave-shape-identifying means corresponding to the wave shape occupying the reference position in said sampling means.

In accordance with a more specific aspect of the present invention, there is provided, in a system for identifying each of a plurality of different wave shapes, apparatus comprising a plurality of transmission channels equal in number to the number of the different wave shapes, each of the transmission channels corresponding to one of the wave shapes, sampling means for receiving any one of the wave shapes, and, in response thereto, delivering a plurality of signal samples of the wave shape to all of the transmission channels, each of the transmission channels having a plurality of multiplying elements disposed therein, each of the plurality of multiplying elements being adapted to multiply the amplitude of a signal applied thereto by a value proportional to the amplitude of a respective signal sample delivered by the sampling means when the corresponding channel wave shape occupies a reference position in the sampling means to produce multiplied signals of a like polarity, each of the transmission signals having at least one additional multiplying element disposed therein, each of the additional multiplying elements being adapted to multiply the amplitude of a signal applied thereto by a value proportional to the amplitude of another signal sample delivered by the sampling means when a different channel wave shape occupies the reference position in the sampling means to produce a multiplied signal of a polarity different from those multiplied signals produced by the plurality of multiplying elements, each of the plurality of multiplying elements being coupled to receive the respective one of the signal samples delivered to the associated transmission channel when the corresponding channel wave shape occupies the reference position in the sampling means to produce the multiplied signals of a like polarity, each of the additional multiplying elements being coupled to receive another one of the signal samples delivered to the associated transmission channel when the different channel wave shape occupies the reference position in the sampling means to produce the multiplied signals of a polarity different from those multiplied signals produced by the plurality of multipyling elements, means in each of the transmission channels for combining all of the multiplied signals produced by the multiplying elements therein when a wave shape occupies the reference position in said sampling means and for delivering a corresponding combination signal, and means for sensing the combination signals delivered by all of the transmission channels to determine which one of the delivered signals has the greatest amplitude and for producing a signal identifying one of the transmission channels which delivers the greatest amplitude signal. Accordingly, one or more transmission channels are provided with summing means, which includes at least an additional multiplying element which is ineffective when the corresponding channel wave shape occupies the reference position in the sampling means, but the additional multiplying element is effective when a different channel wave shape occupies the reference position in the sampling means. When a particular character wave shape is located in its reference position in the sampling means, the additional multiplying element in the summing network corresponding to that character wave shape is ineffective to lessen the amplitude of the signal delivered by that transmission channel. Nevertheless, the additional multiplying element included in the summing means of the remaining transmission channels is effective to lessen the amplitude of the signal which would normally be delivered by all of these transmission channels. The present invention provides a character identification apparatus in which the transmission channel corresponding to the character wave shape in the sampling means delivers a signal whose difference in amplitude from the amplitudes of the signals delivered by the remaining transmission channels is considerably greater than other known character identification systems of this type.

The invention will be more clearly understood from reference to the accompanying drawings, in which:

FIGURES 1 to 7 inclusive constitute the block diagram of a wave-shape-identification system in accordance with the present invention;

Figure 1:
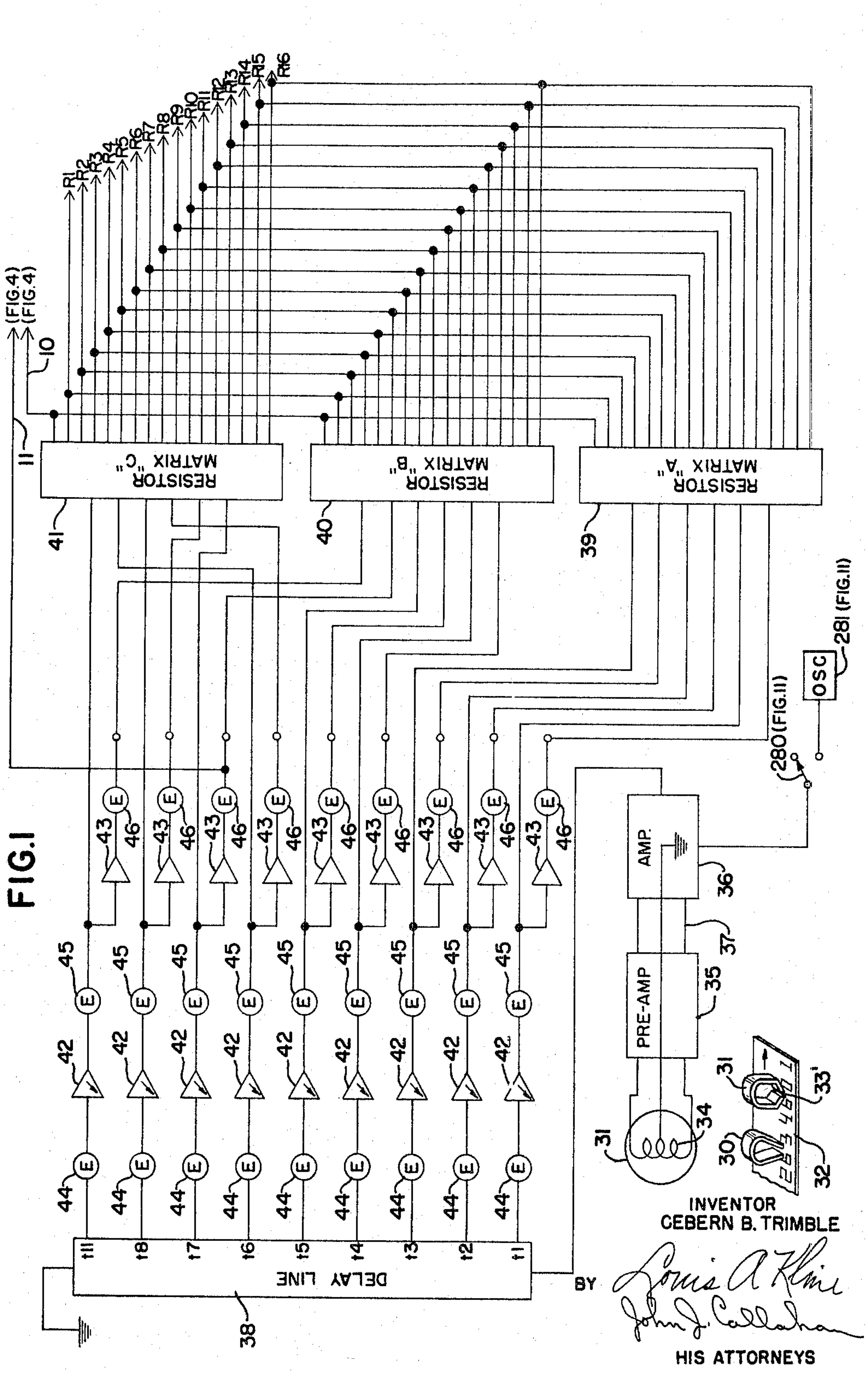
Figure 2:
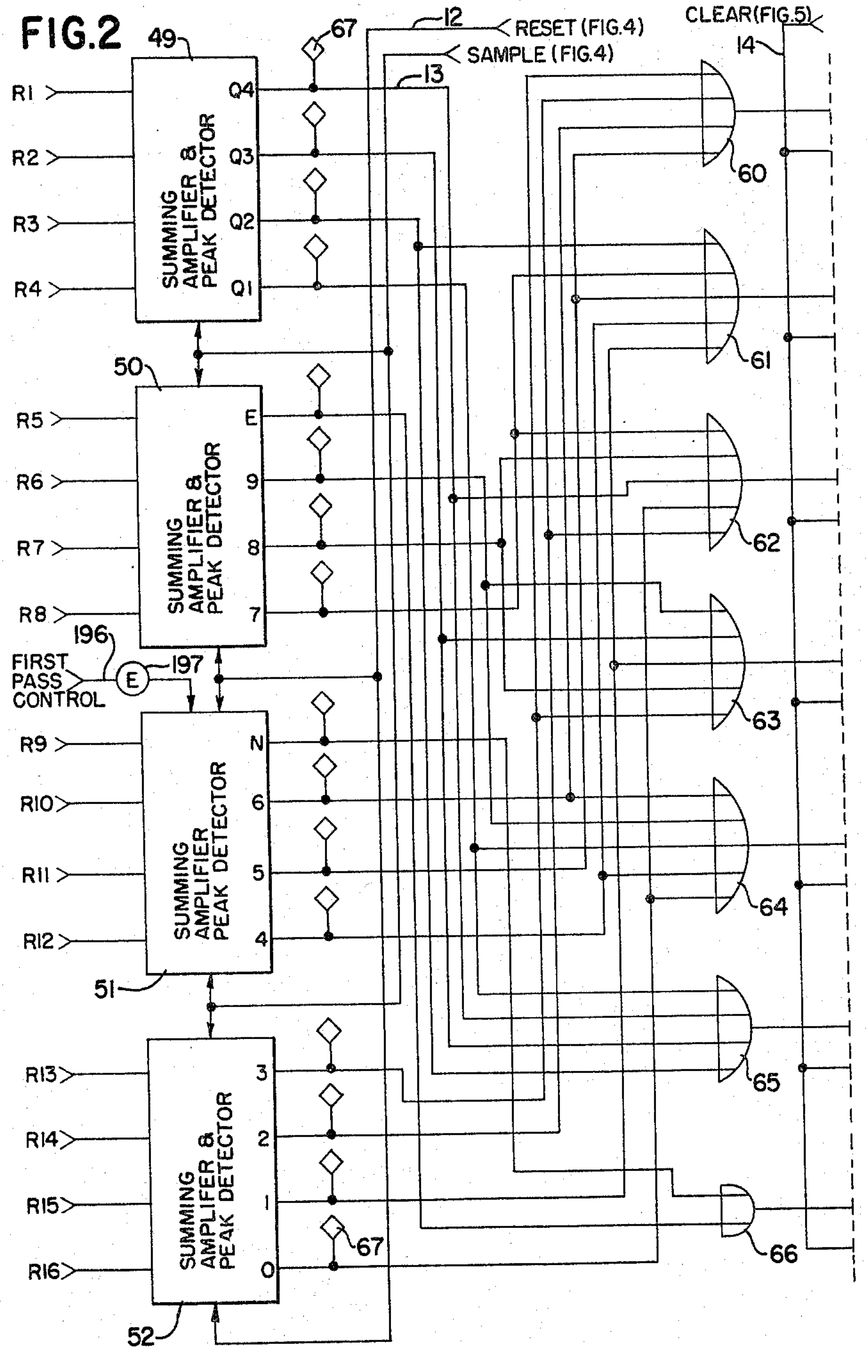
Figure 4:
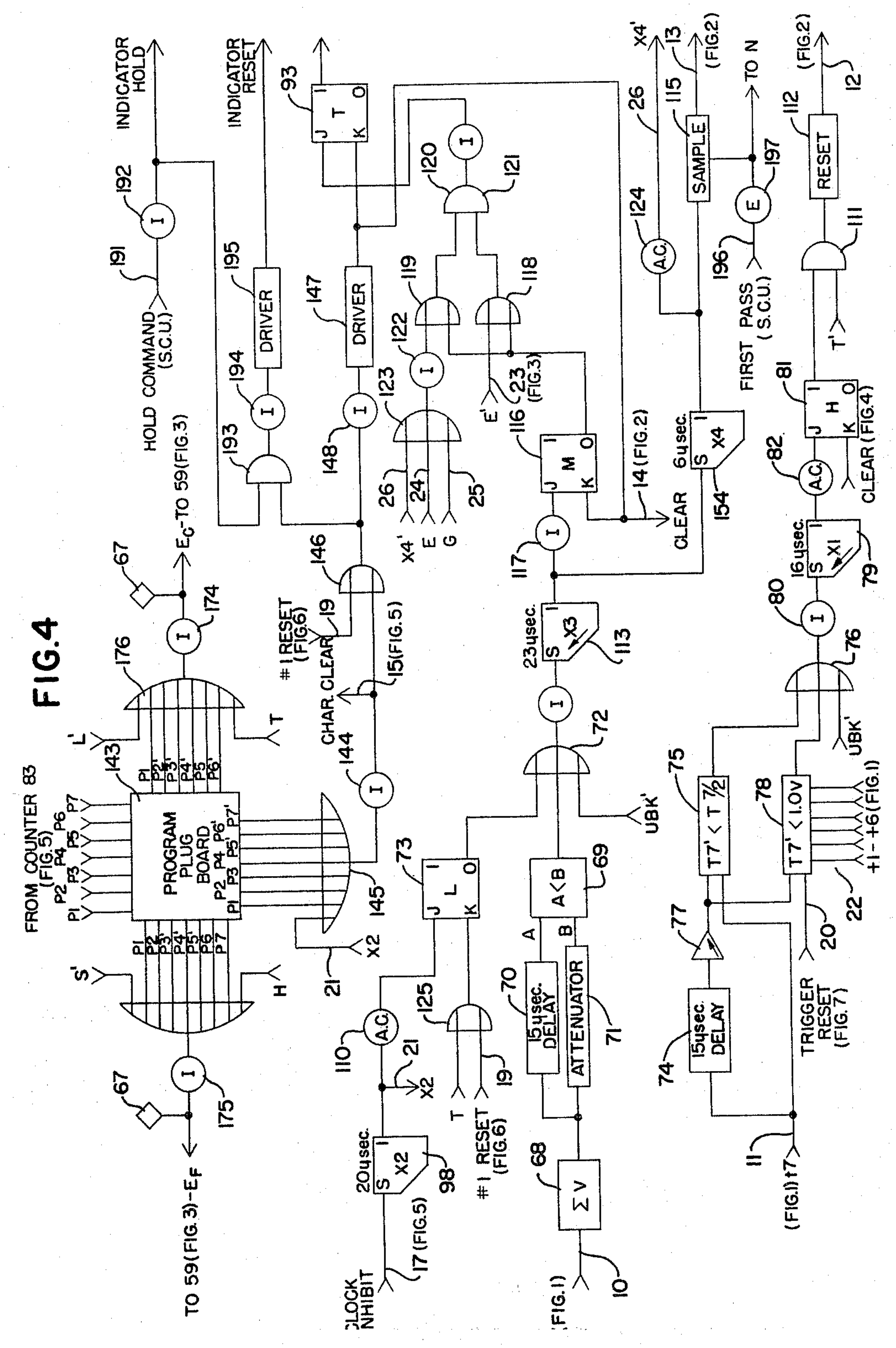
Figure 5:
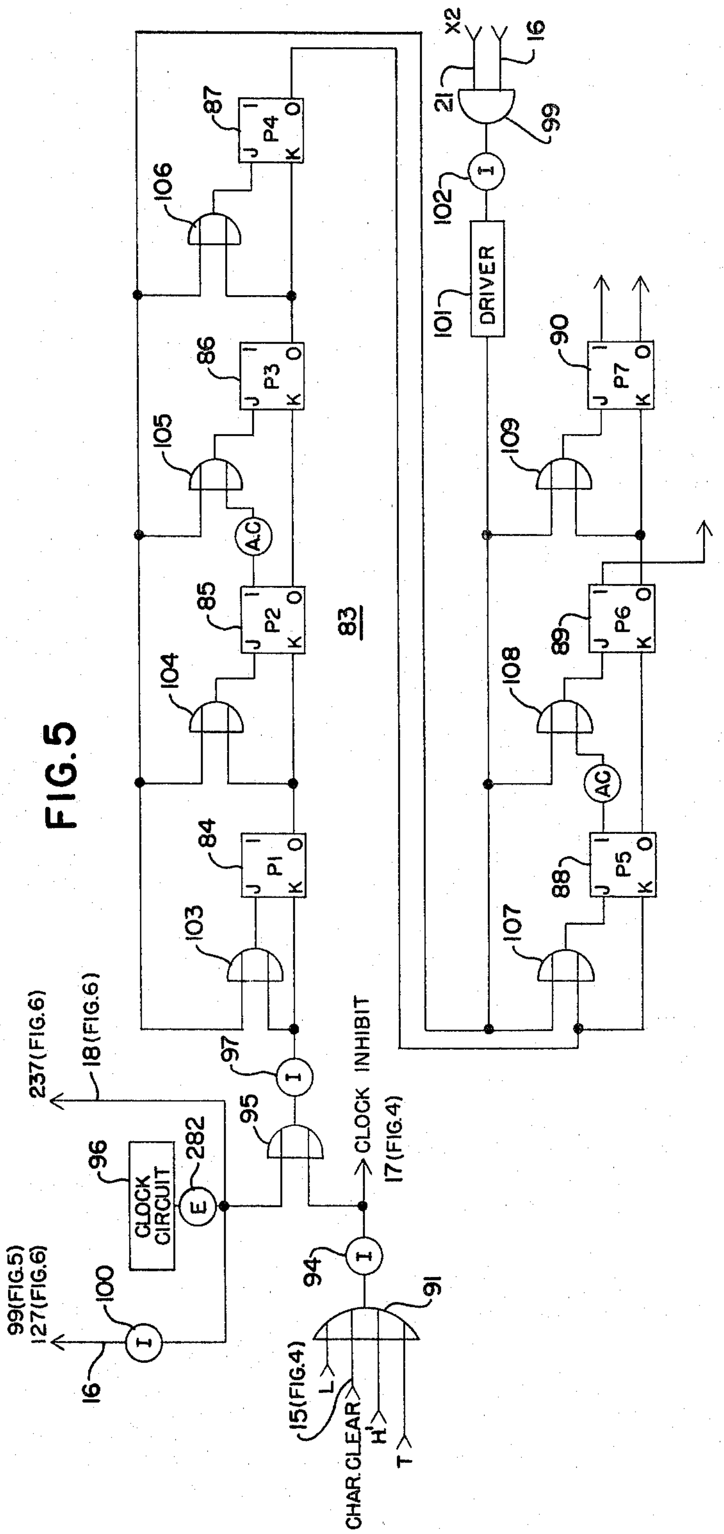
Figure 7:
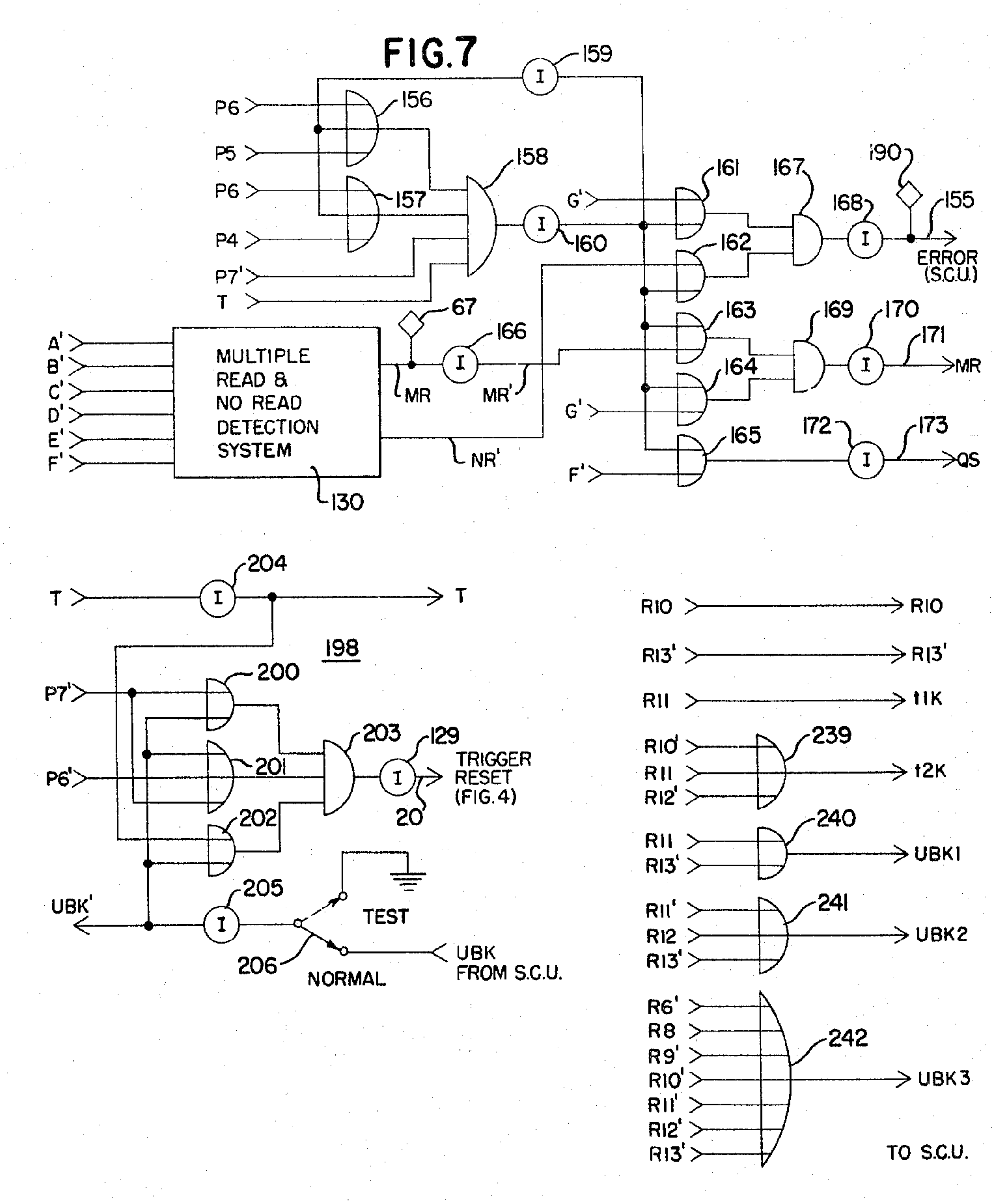
Figure 10:
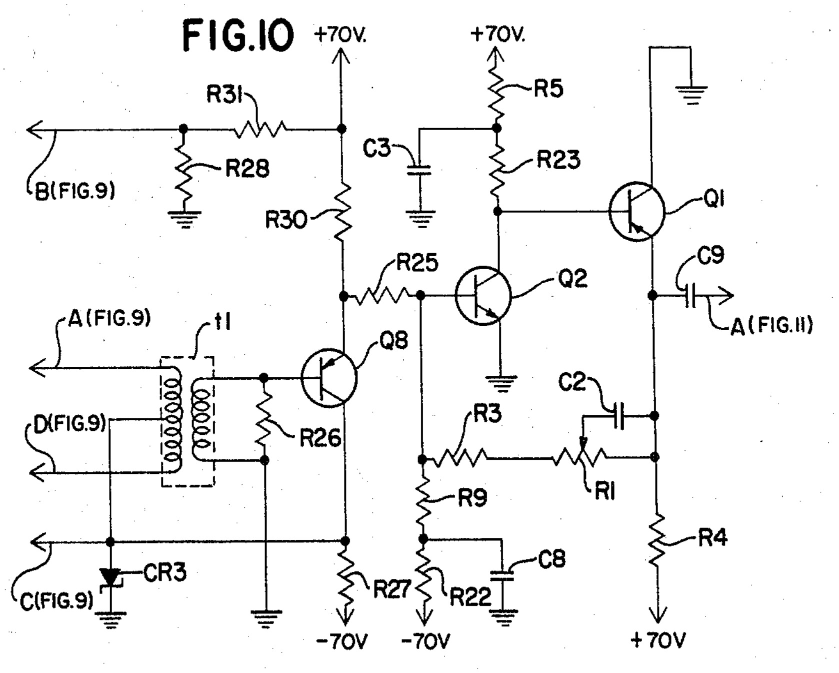
Figure 11:
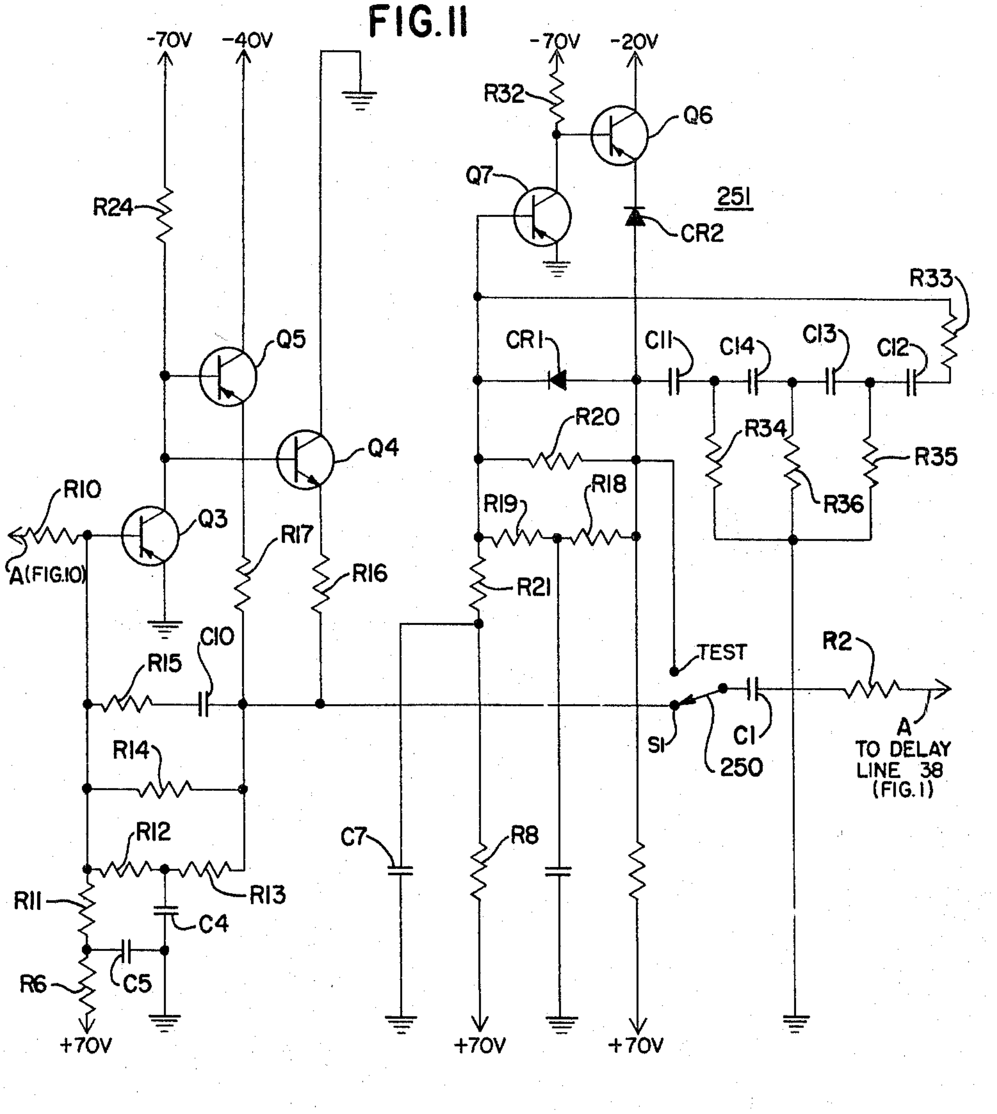
Figure 12:
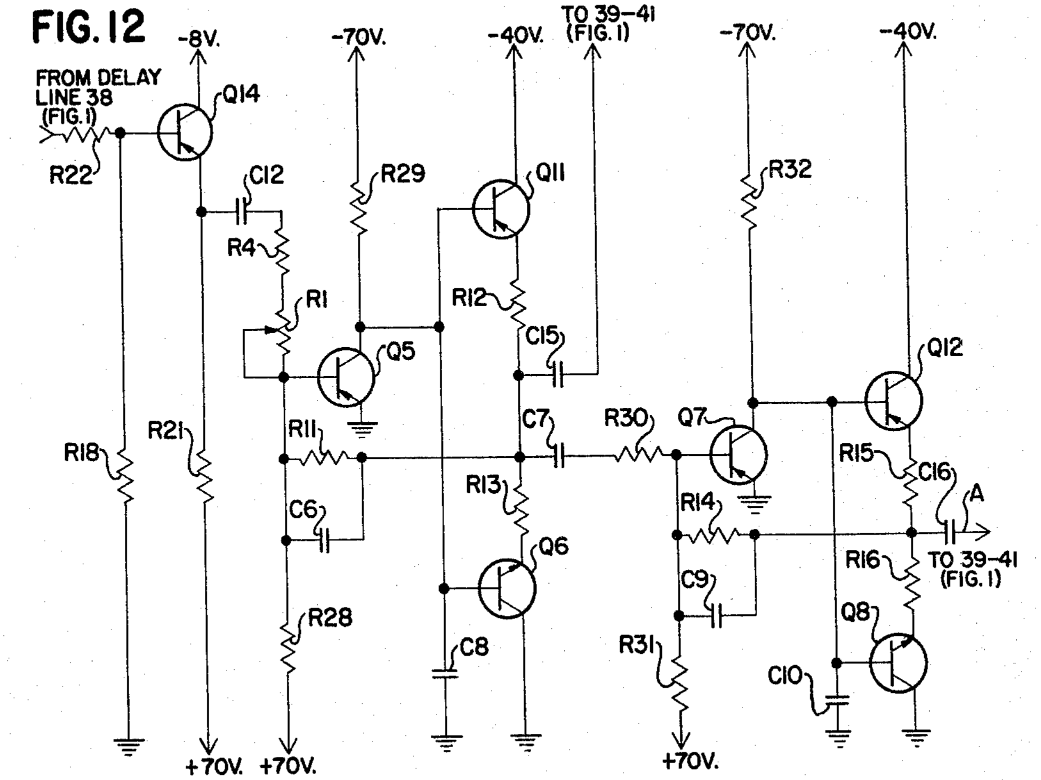
Figure 13:
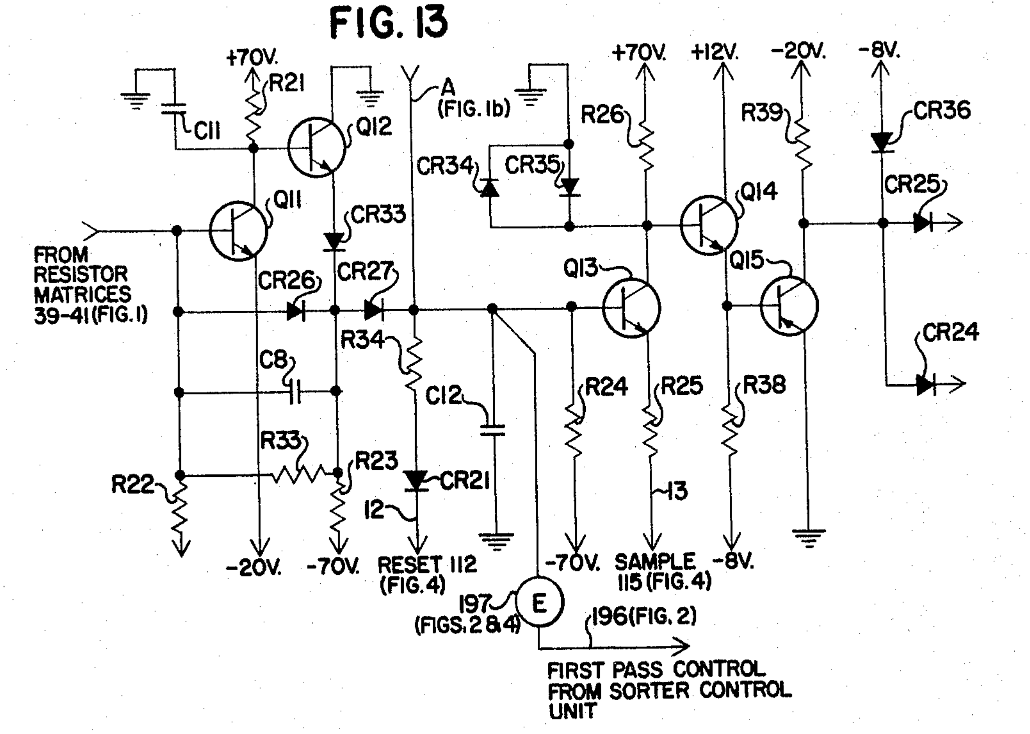
Figure 14:
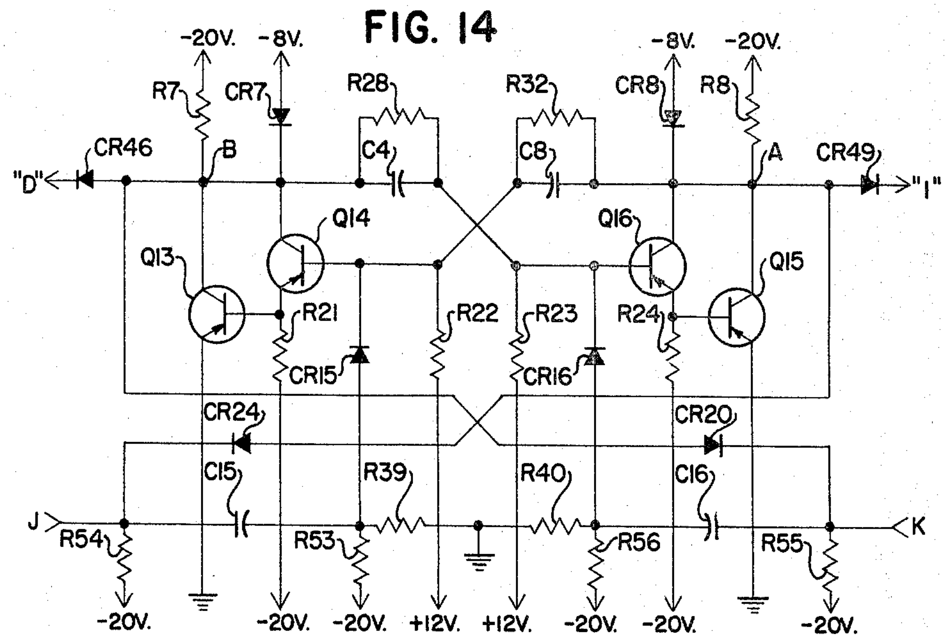
Figure 15:
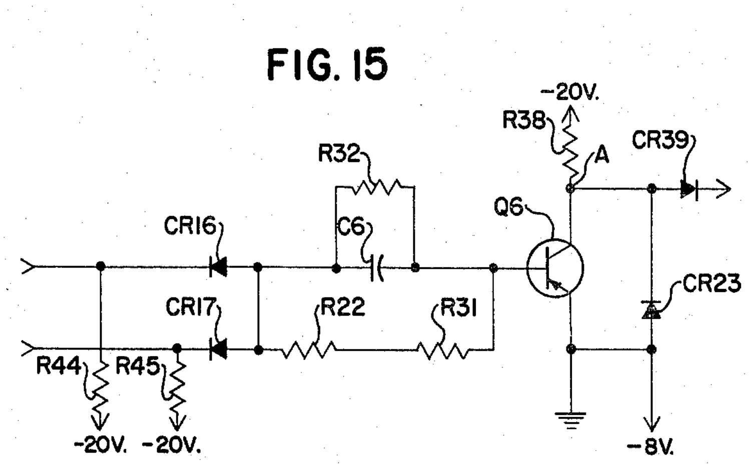
Figures 16, 17:
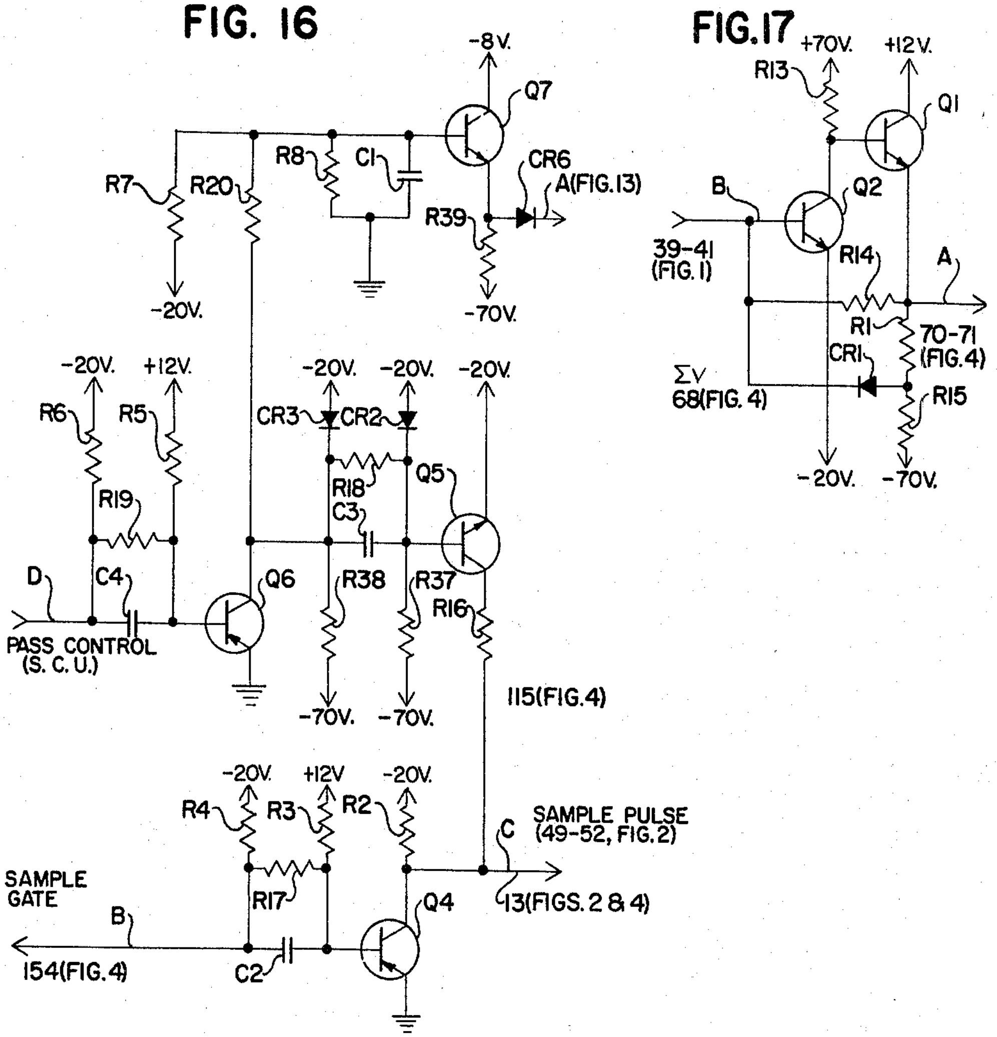
Figure 19:
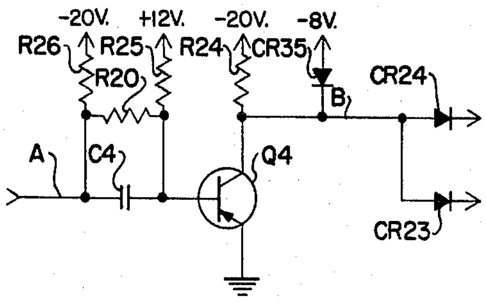
Figure 18:
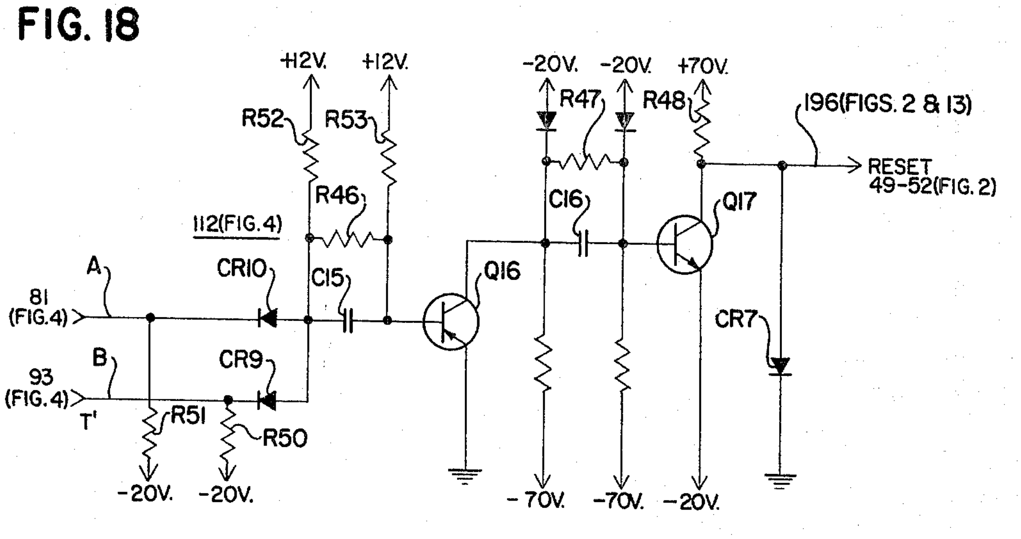
Figure 20:
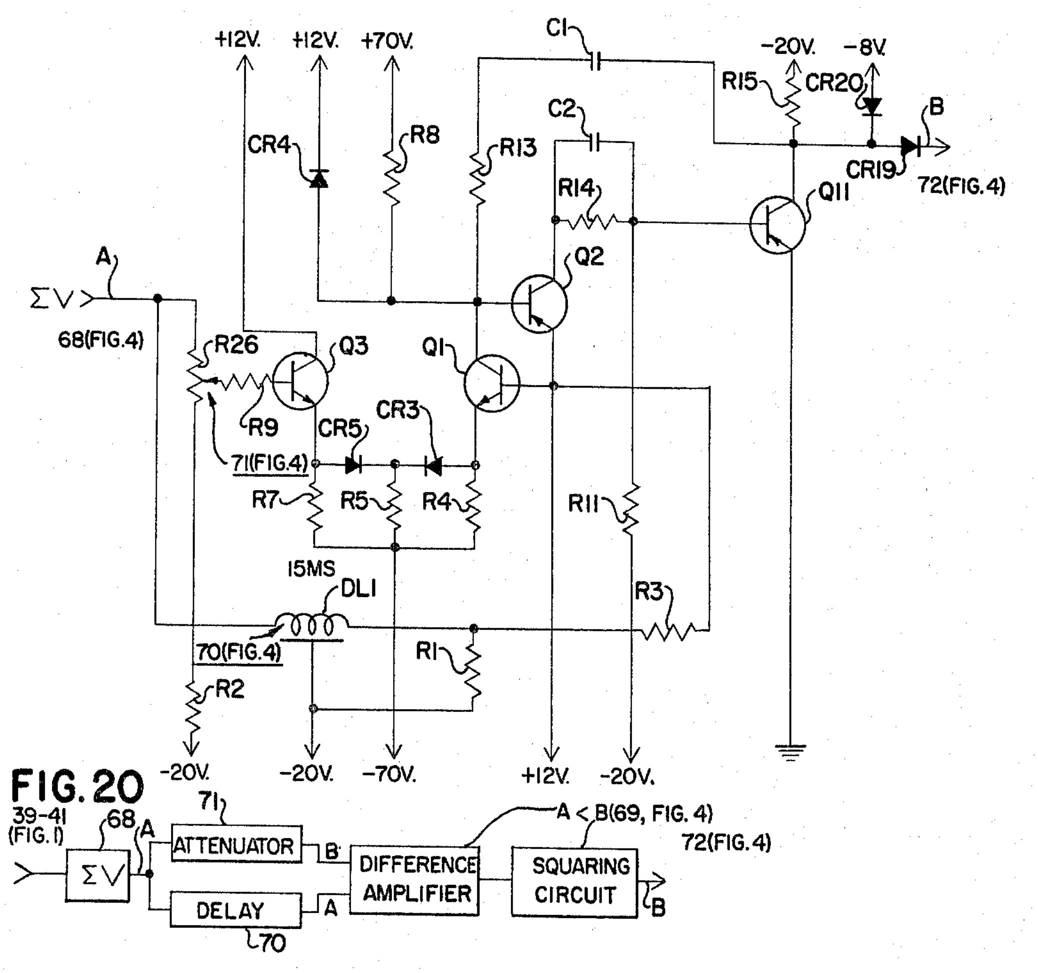
Figure 24:
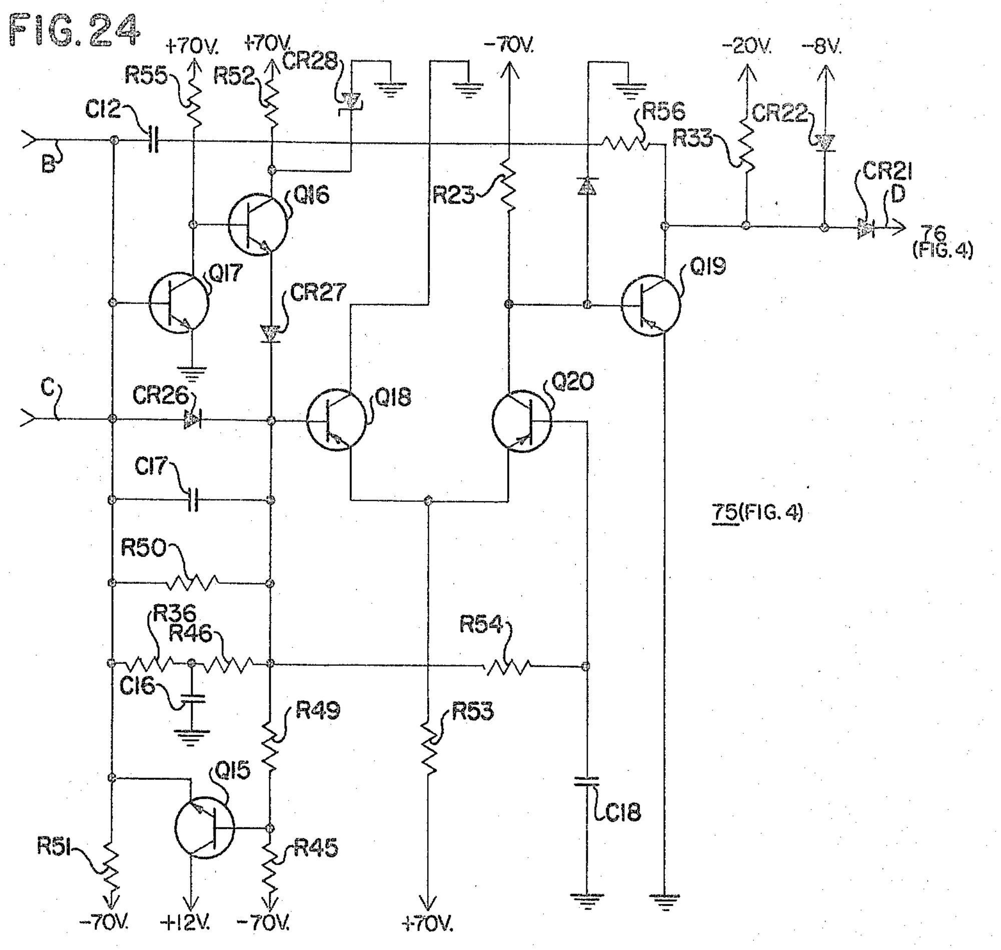
Figure 21:
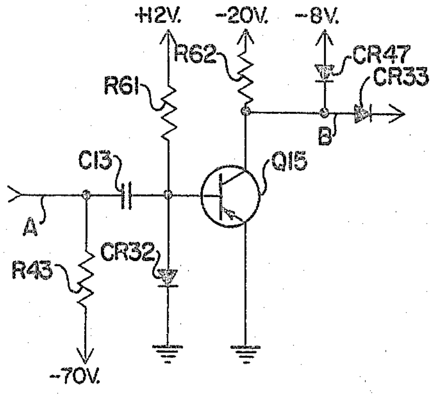
Figure 23:
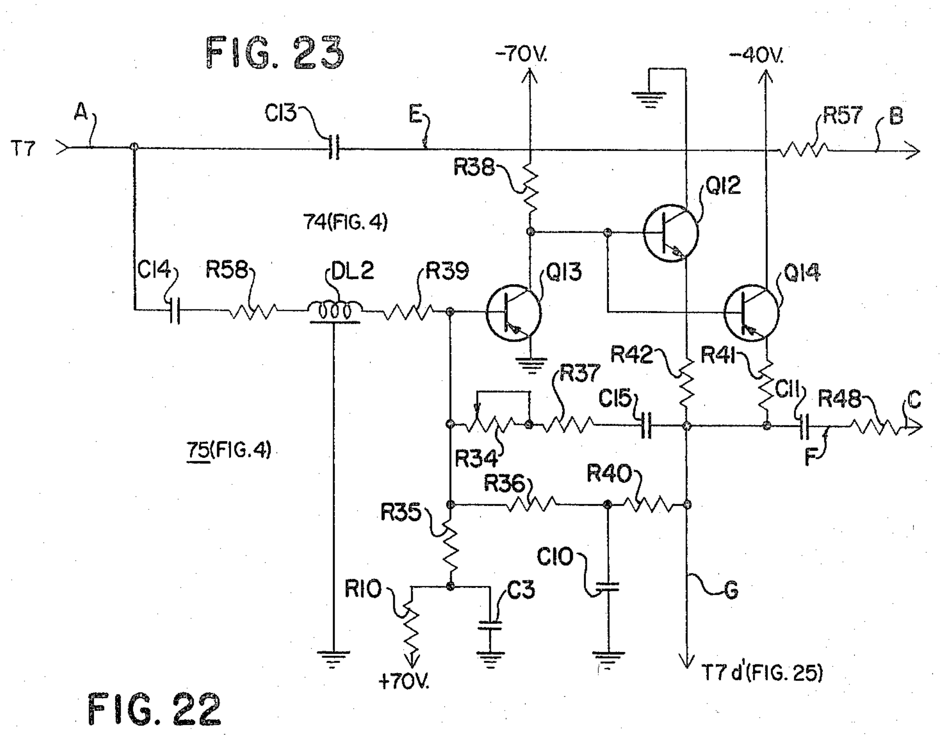
Figure 22:
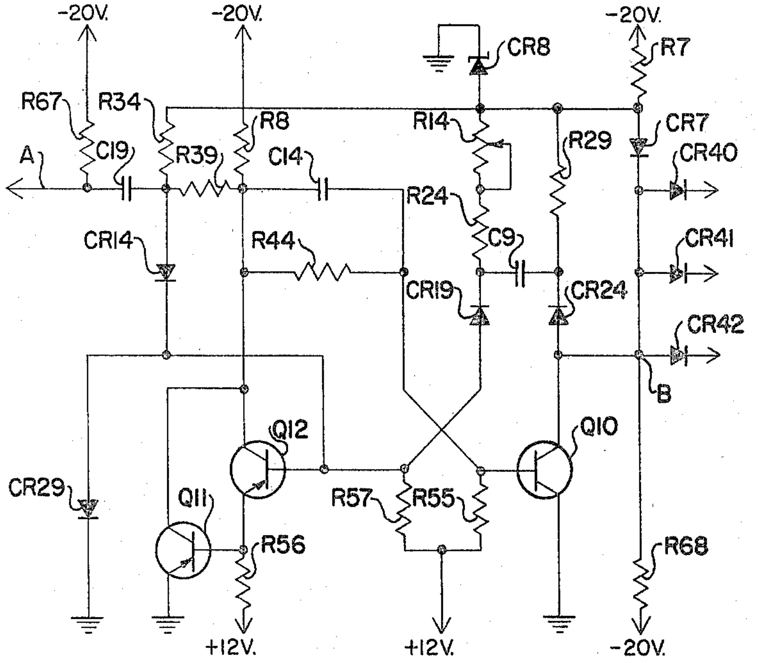
Figure 25:
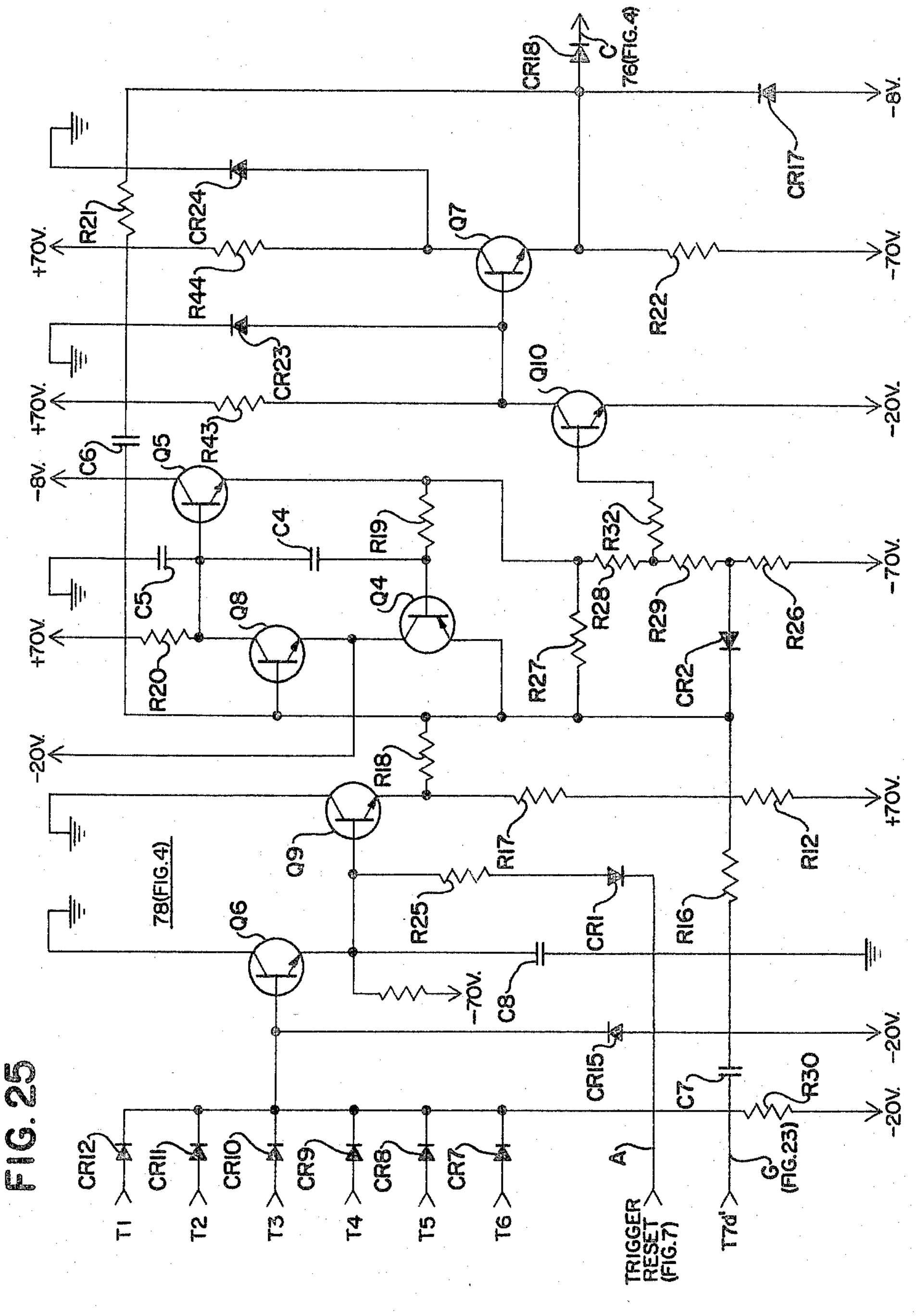
Figure 28:
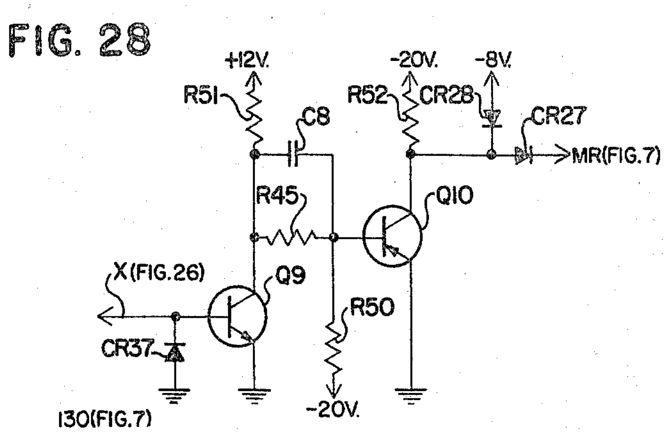
Figure 29:
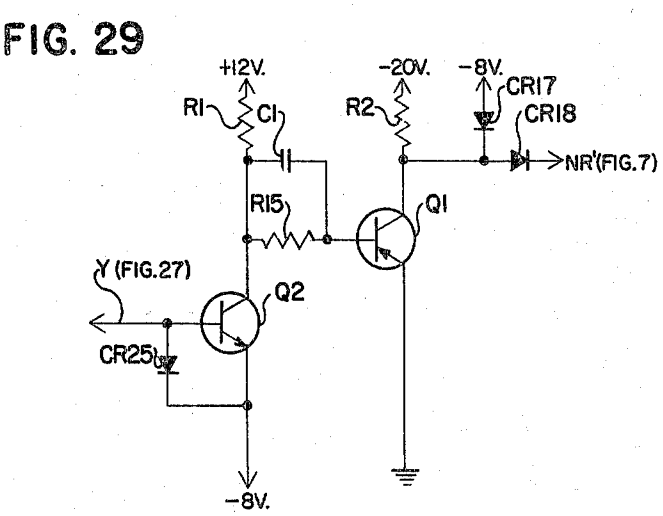
Figure 26:
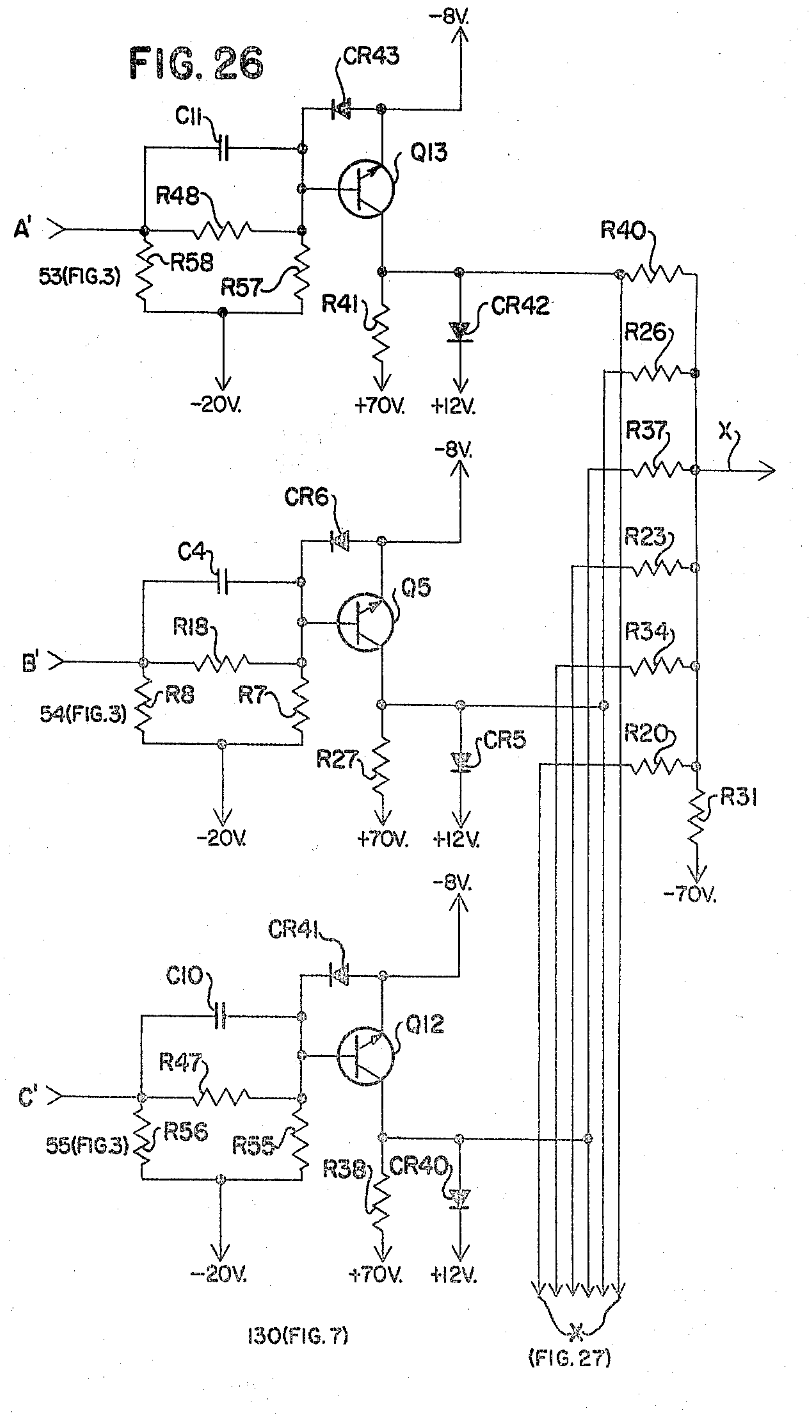
Figure 27:
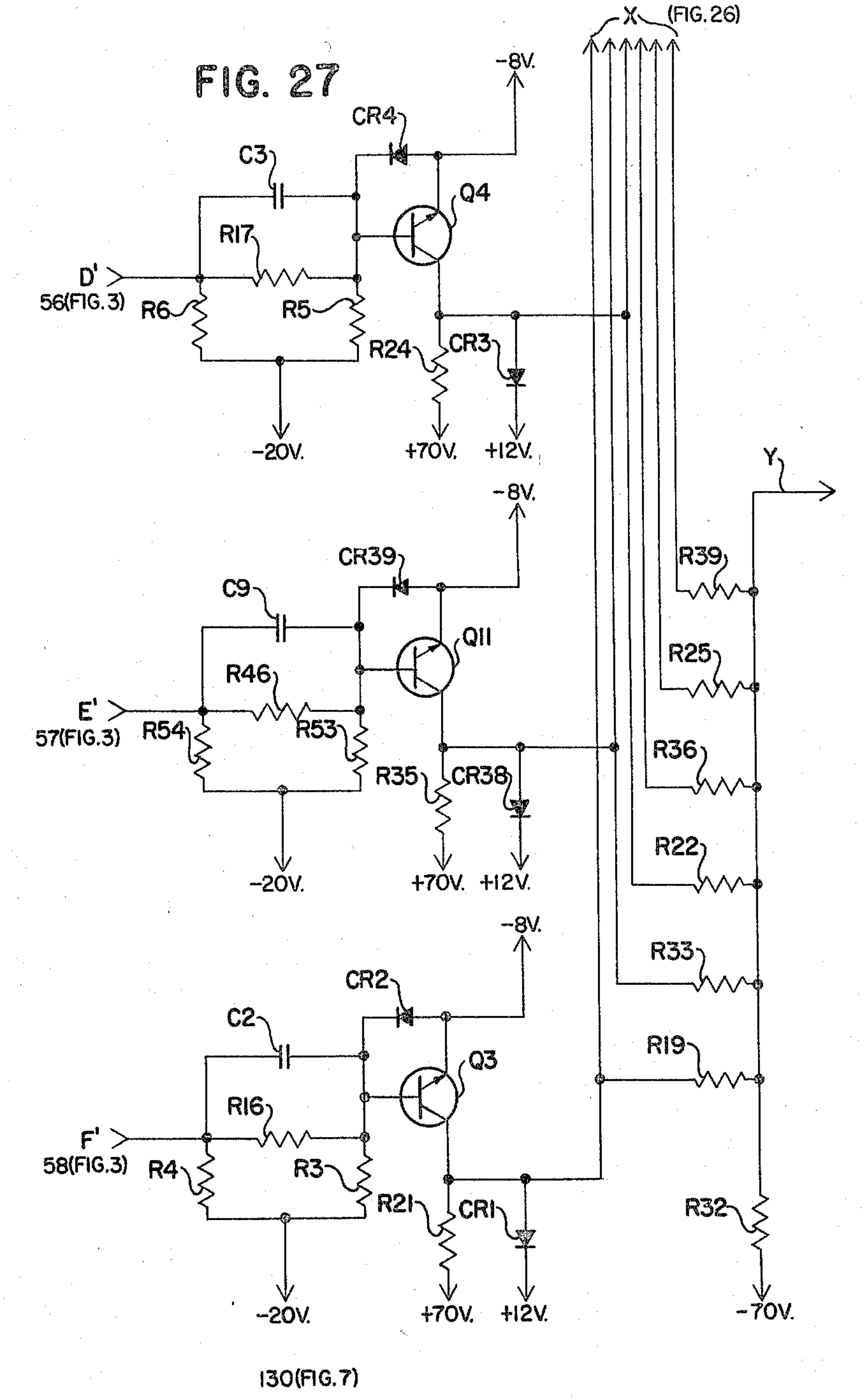
Figure 30:
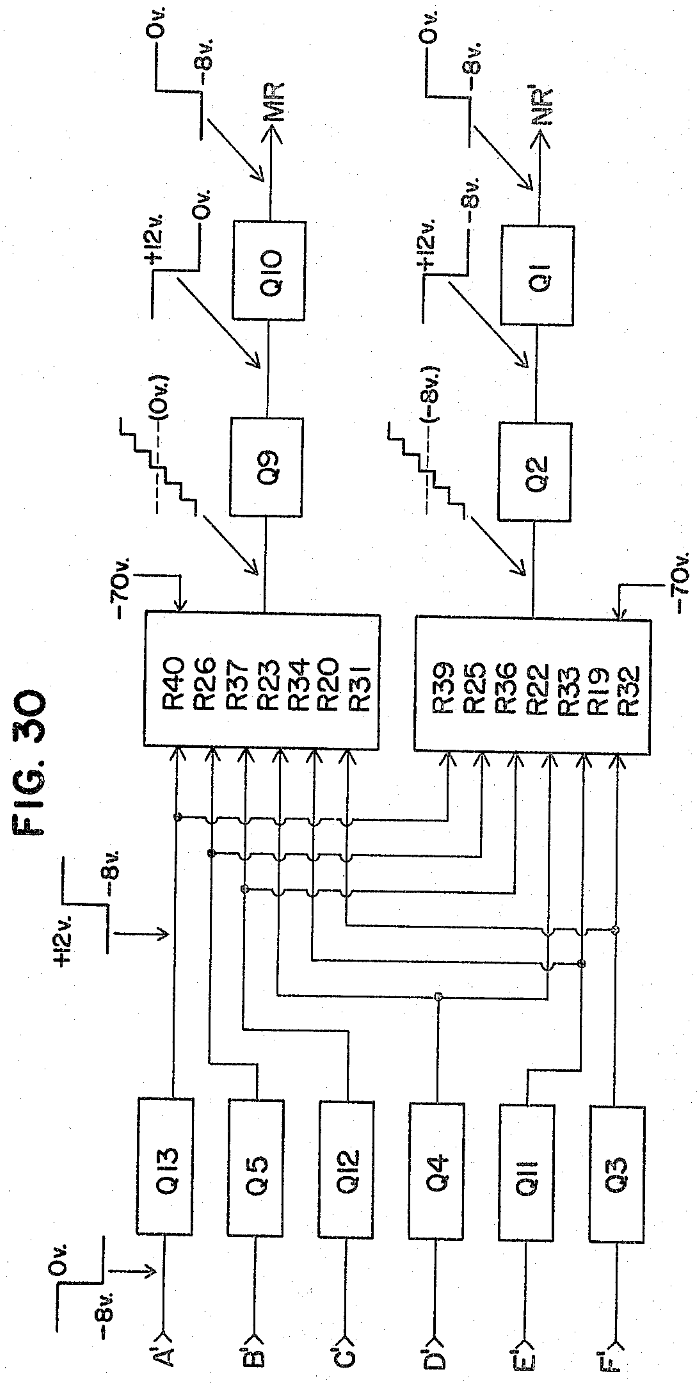
Figure 32:
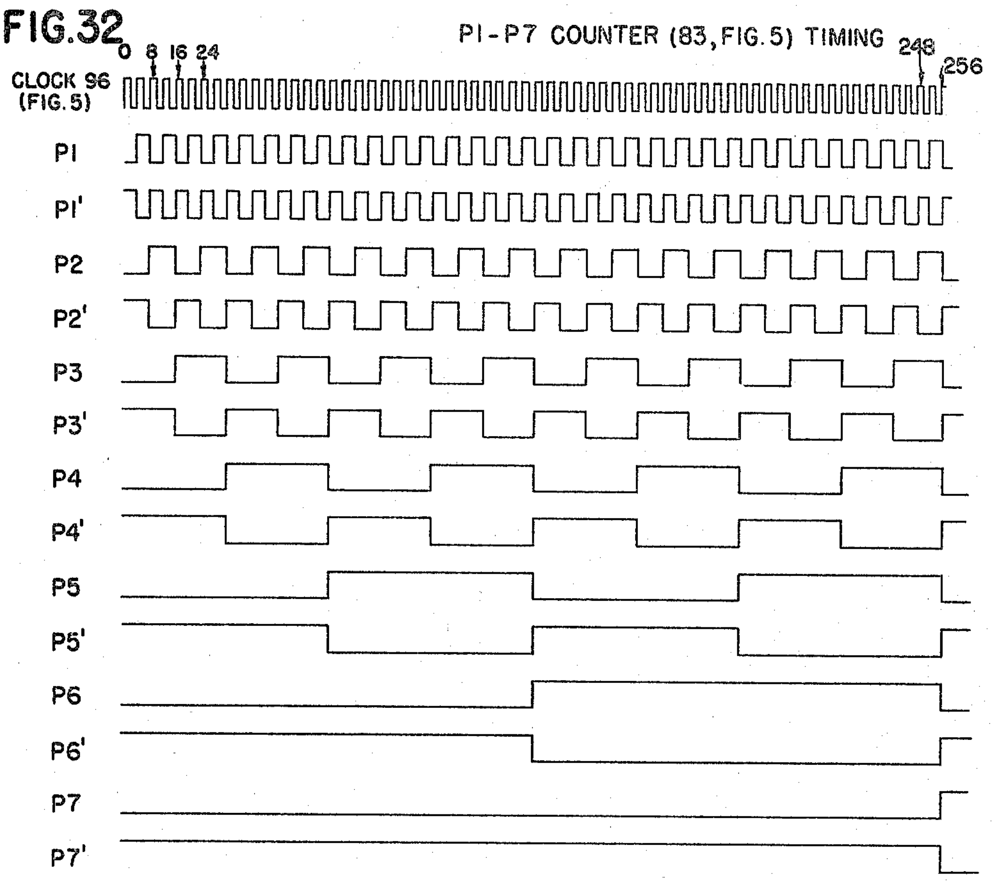
Figure 31:
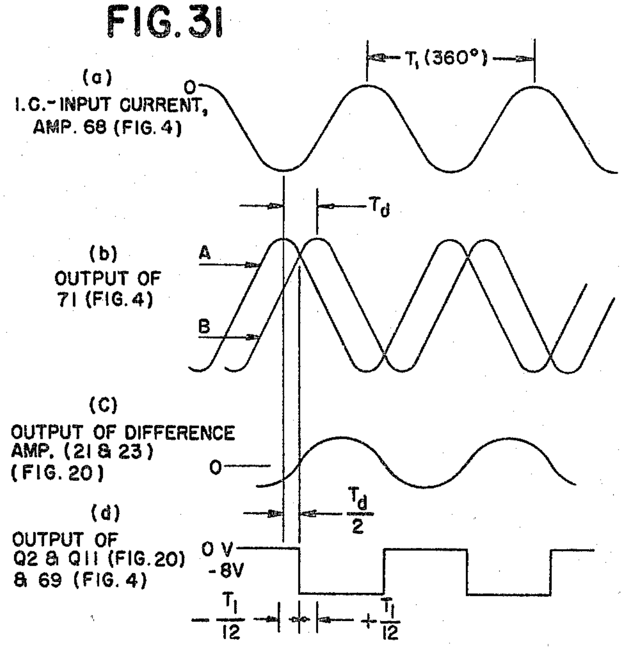
Figure 33:
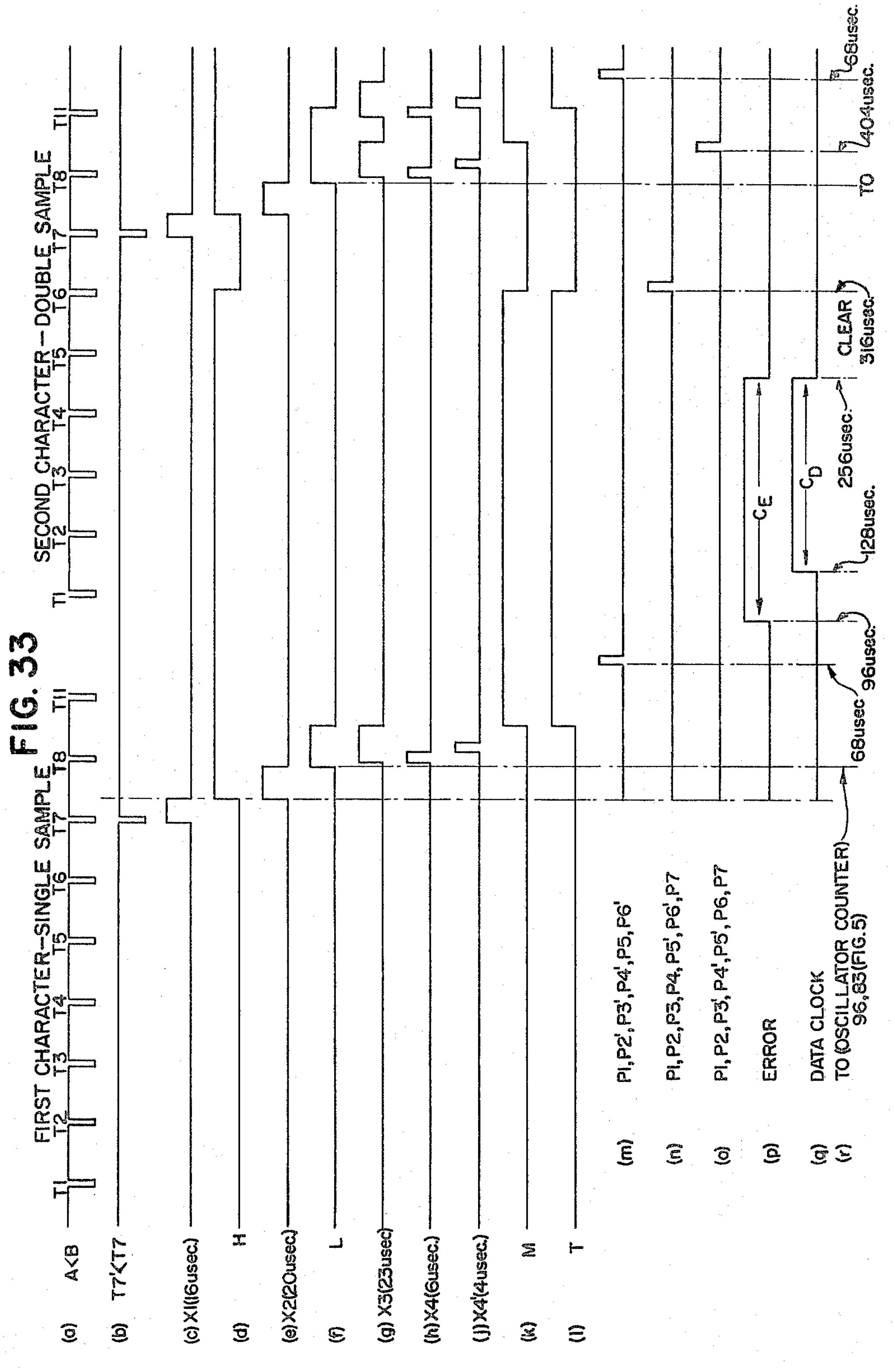
Figure 34:
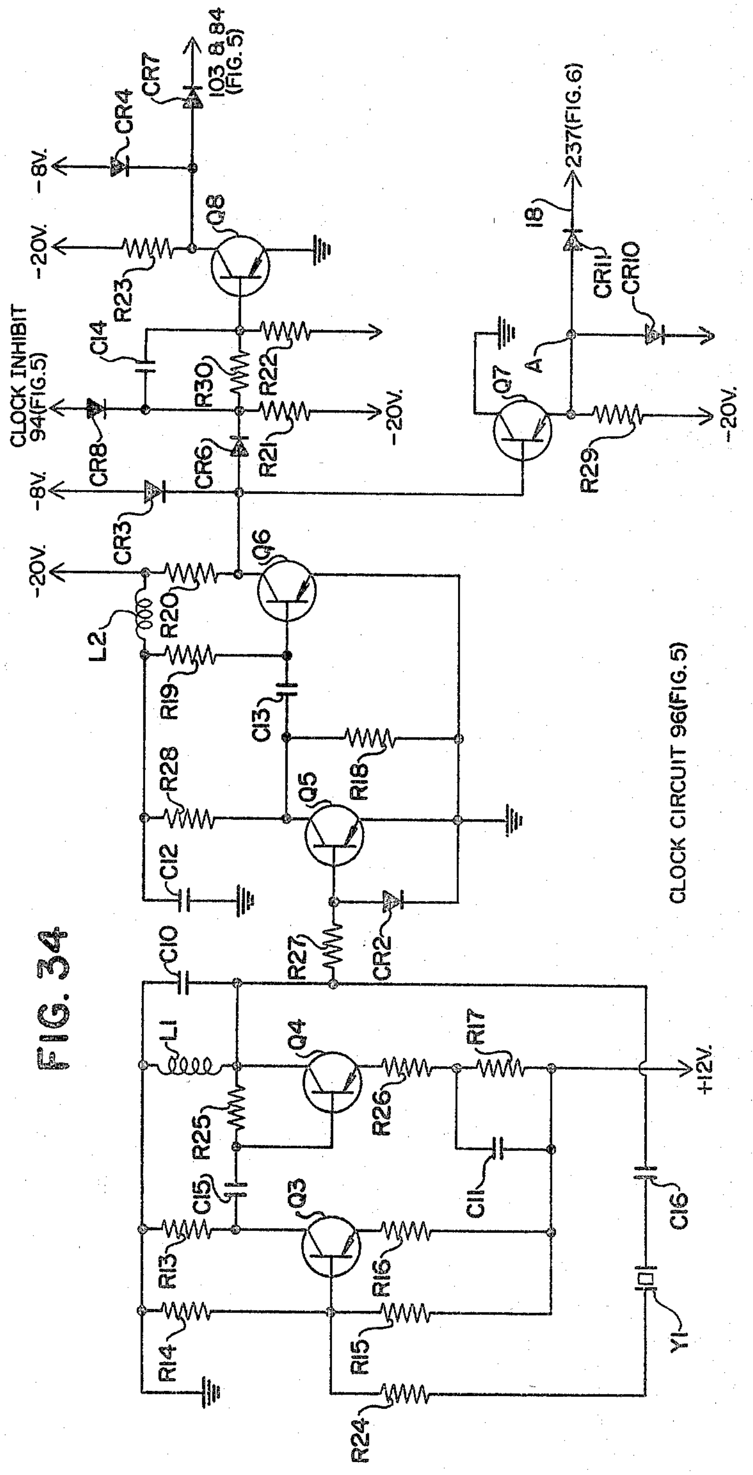
Figure 37:
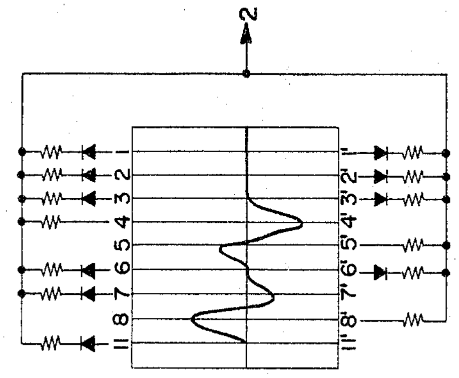
Figure 39:
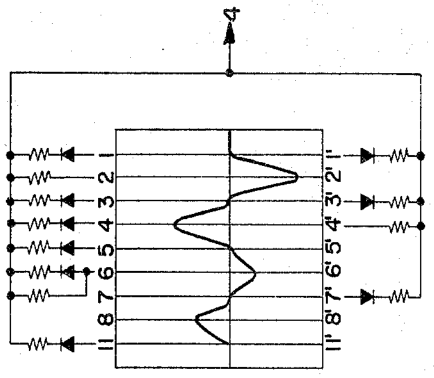
Figure 36:
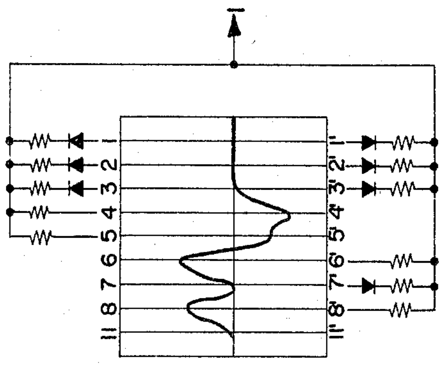
Figure 38:
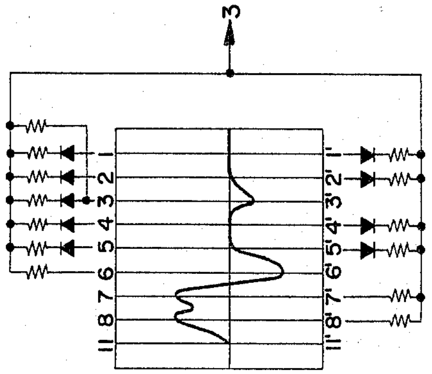

FIGURES 10 and 11 constitute the circuit diagram of character amplifier shown in FIGURE 1;

FIGURE 12 is the circuit diagram of the delay line amplifiers shown in FIGURE 1;

FIGURE 13 is the circuit diagram of the summing amplifier and peak detectors shown in FIGURE 2;

FIGURE 14 is a circuit diagram of a bistable multivibrator or flip-flop circuit, useful in the system of FIGURES 1 to 7;

FIGURE 15 is a circuit diagram of a logic inverter useful in the system of FIGURES 1 to 7 inclusive;

FIGURE 16 is the circuit diagram of the sample driver shown in FIGURE 4;

FIGURE 17 is the circuit diagram of the summing amplifier shown in FIGURE 4;

FIGURE 18 is the circuit diagram of the reset amplifier shown in FIGURE 4;

FIGURE 19 is a circuit diagram of a driver inverter useful in the system of FIGURES 1 to 7;

FIGURE 20 is the circuit diagram of the $A<B$ comparator shown in FIGURE 4;

FIGURE 21 is a circuit diagram of an A. C. inverter useful in the system of FIGURES 1 to 7;

FIGURE 22 is a circuit diagram of a monostable multivibrator or one-shot circuit useful in the system of FIGURES 1 to 7;

FIGURES 23 and 24 constitute the circuit diagram of the $+7'<+7/2$ comparator shown in FIGURE 4;

FIGURE 25 is the circuit diagram of the $+7'<1.0$ volt comparator shown in FIGURE 4;

FIGURES 26 to 29 constitute the circuit diagram of the multiple read and no-read system shown in FIGURE 7;

FIGURE 30 is a block diagram useful in explaining the operation of the multiple read and no-read system;

FIGURE 31 illustrates wave forms useful in explaining the operation of the summing amplifier of FIGURE 17;

FIGURE 32 is a timing diagram illustrating the timing sequence of the P1–P7 counter of FIGURE 7;

FIGURE 33 is a timing diagram of the wave shape identification system;

FIGURE 34 is the circuit diagram of the clock circuit shown in FIGURE 5; and

Figure 51:
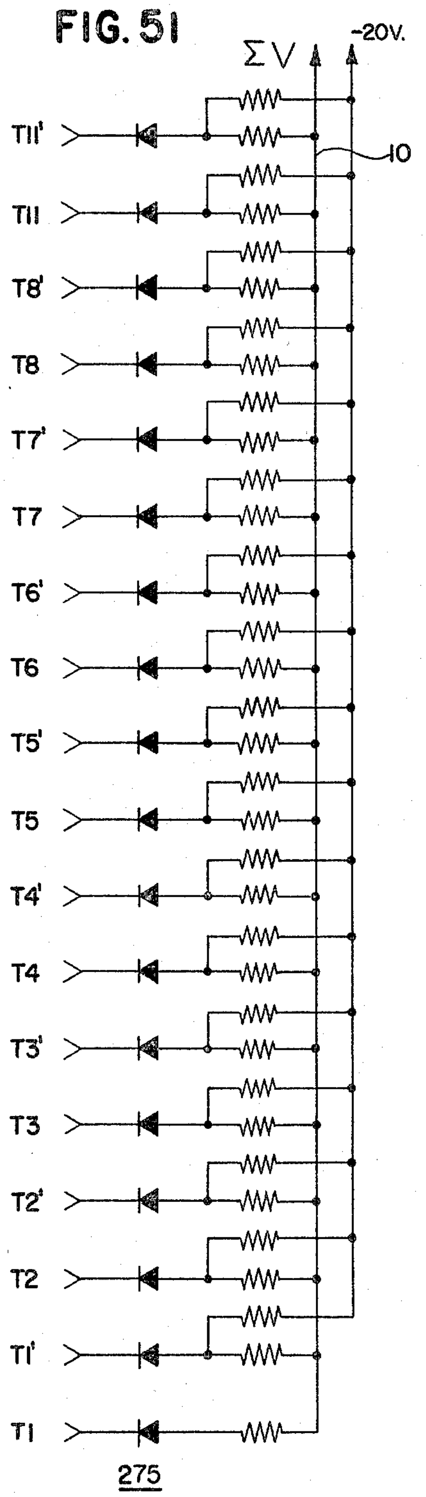

FIGURES 35 to 50 inclusive depict the wave shapes of each of the characters (0 to 9), the symbols Q1 to Q4, an error wave shape, and a noise wave shape. Each of these wave shapes is shown in reference position in the sampling means, and there is illustrated how predetermined samples of these wave shapes are applied to their corresponding resistor matrices;

FIGURE 51 is a circuit diagram of another resistor matrix which receives samples from all sampling points of the sampling means to generate a timing or sampling signal, permitting sampling of the output signals of the summing amplifier and peak detector circuits when a wave shape is in its reference position in the sampling means.

The Automatic Reading System of this invention is shown in FIGURES 1 to 7 inclusive. Logic levels used by system circuit elements responding from binary inputs are 0 volts (True) and —8 volts (False). The Reading System comprises the magnet 30, a reading transducer 31, and the necessary electronics to read and identify any of fourteen stylized magnetic characters printed on business documents, such as the document 32. The magnetic characters constitute a font which is known as type E–13B. For a detailed description of the E–13B font, reference may be made to Bank Management publication 147 IR (1962), entitled "The Common Machine Language for Mechanized Check Handling," prepared by the Bank Management Commitee of the American Bankers' Association. The type E–13B font comprises the numerals 0 to 9 and four special symbols called the Transit Number Symbol, the Amount Symbol, the Account Symbol, and the Dash Symbol. The document 32, such as a check which has type E–13B characters imprinted thereon in magnetic ink adapted to be magnetized, is moved past the magnet 30 and then past the transducer 31. The magnet 30, which may be a permanent magnet, magnetizes the magnetic characters to be recognized prior to their being "read" by the transducer 31. The transducer 31, which may also be termed "a magnetic reading head," is provided with a narrow slit 33, oriented transversely to the direction of motion of the document 32. The reading head 31 is responsive to the time-rate-of-change of the magnetic flux induced therein by the passing magnetized characters and delivers an output signal corresponding to these flux changes. Thus, the output signal provided by the transducer 31 is a function of time, the magnitude of which at any instant is determined by the shape of orientation of the magnetized area passing the slit 33 at that moment. Wave shapes similar to those shown in FIGURES 35 to 48 inclusive are thus generated as relative motion is provided between the transducer 31 and the respective magnetized characters.

The automatic reading system of this invention may be associated with a sorting apparatus of the type described and claimed in United States Patent No. 3,067,874, issued to Karl F. Rigg et al. on December 11, 1962. Such sorting apparatus may be adapted to carry the documents 32 past the permanent magnet 30 and the transducer 31 at a speed of approximately 324 inches per second. The magnetized characters on the documents 32 then pass the transducer 31, where a varying current is induced in its winding. The induced current in the winding 34 varies in amplitude as the density of the magnetic characters changes. The magnetic characters are so designed that the positive and negative current peaks can occur at regular intervals; that is, every forty microseconds at the scan speed of 324 inches per second. The length of the character wave font varies with the width of the individual characters. The "0" character, for example, has a width of 0.0910 inch, while the "1" character is approximately 0.0520 inch wide. However, possible current peaks still recur at a fixed interval. An analysis of the character wave forms shown in FIGURES 35 to 48 inclusive shows that the leading edge of a character always produces a positive peak, and the trailing edge produces a negative peak.

The signals from the transducer 31 are amplified first by a differential preamplifier 35, which has a gain of approximately 75. The output signals from the preamplifier 35 are coupled into the input of a character amplifier 36 through a center tap primary transformer represented at 37. In the preamplifier 35, together with its associated center tap primary transformer, the signals are converted from differential or balanced to ground signals to single-ended signals. These single-ended signals are amplified further by the character amplifier 36, which has an adjustable gain, and are matched and fed into a 320.766-microsecond delay line 38. The total delay time of 320.766 microseconds presented by the delay line 38 is sufficient to completely contain the longest character wave form. The delay line 38 is provided with nine taps T1 to T8 and T11, which are located at forty-microsecond intervals along the delay line 38, so that all of the individual wave form peaks can be simultaneously sampled or "looked at" for a given instant of time. A character wave form is considered to be inside the delay line when the first positive peak of the wave form has reached tap point +8. Each of the nine taps, T1 to T8 and T11, of the delay line 38 is coupled to a resistor matrix 39, 40, or 41 through delay line amplifiers 42 and 43.

Eight of the delay line amplifiers 42 are provided with means to adjust their gains. The amplifier 42, which is connected to the last tap T11 of the delay line 38, has a fixed gain and is used as the reference to adjust the gains of the other eight delay line amplifiers 42.

Between each of the delay line taps T1 to T8 and T11, there is provided an emitter follower 44. Another emitter follower 45 is provided between each of the delay amplifiers 42, the resistance matrix units 39 to 41, and the amplifiers 43. A further emitter follower 46 is provided at the output of each of the delay line amplifiers 43. The first delay line amplifiers 44 raise the signal level of the sampled character signals to compensate for the attenuation of the delay line 38 and to provide an inverted signal to the resistance matrix units 39 to 41 and to the second delay line amplifiers 43. The second delay line amplifiers 43 re-invert the sampled character signals at unity gain and provide non-inverted signals to the resistance matrix units 39 to 41.

The resistance matrix units 39 to 41, in combination, comprise sixteen individual resistance matrices or summing networks, one for each of the fourteen characters recognized by the reading system, one for noise detection, and another for error detection. The outputs of the emitter followers 45 and 46 are applied to all of the sixteen resistance matrices in parallel. Each one of the resistance matrices is designed with a summing function determined by the wave shape derived from the delay line 38 when the character corresponding to a particular resistance matrix is being scanned by the transducer 31. For example, one of the sixteen resistance matrices is designed with a summing function determined by the wave shape derived from the delay line 38 when the numeral "0" is being scanned by the transducer 31, and the design of each of the remainder resistance matrices is similarly conditioned by the respective wave shaped derived from the delay line 38 when the respective numbers "1" to "9," the four symbols of the E–13B font, the noise, and the error characters are being scanned by the transducer 31.

The manner in which each of the sixteen resistance matrices or summing networks is designed may be as follows. The various wave shapes, which are derived by scanning the sixteen different characters, must be known in advance. Each wave shape can be computed from the shape and area of the character or can be presented visually by repeated scanning of a character and applying the output of the magnetic transducer to a cathode-ray oscilloscope. The relative amplitudes of a number of points on the wave shape, corresponding to the positions of the delay line sampling points (taps T1 to T8 and T11) when the wave shape is to be properly aligned in the delay line in its reference position, are used to determine the values of the summing networks in the resistance matrices.

The resistors contained in each of the sixteen resistance matrices sum the voltages applied thereto from the delay line taps or sampling points in such a manner that for a given wave shape one of the resistance matrices will have a larger negative output than any of the others. This condition, of course, exists only for the brief instance that the wave shape is in its reference position in the delay line 38. Each of the sixteen resistance matrices is also provided with a subtraction feature, whereby sample voltage peaks from a wave shape subtract from all other resistance matrices except the one which is provided to identify that particular wave shape.

Figure 8:
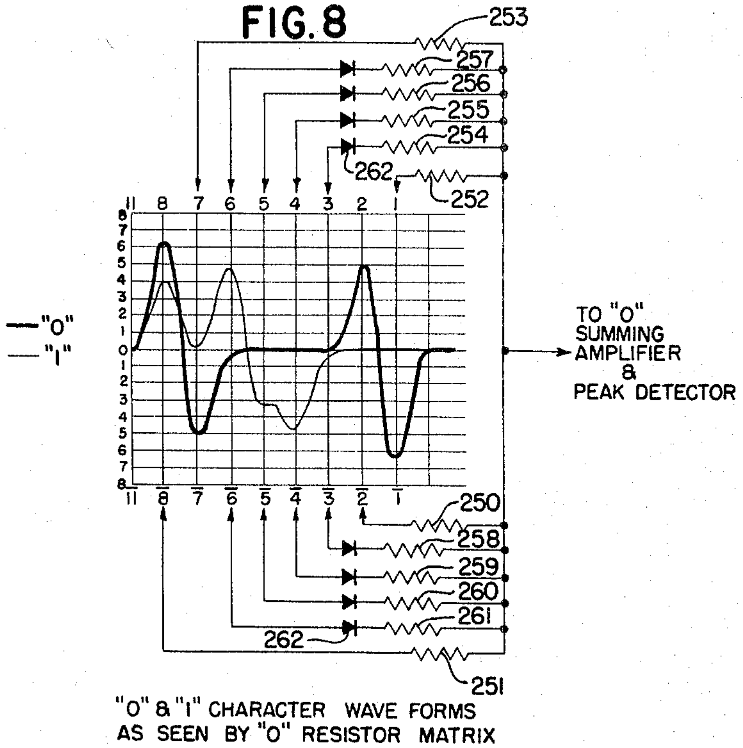
FIGURE 8 depicts the "0" and "1" character wave shapes in reference position in the sampling means, and illustrates how predetermined samples of these character wave shapes are applied to the "0" resistor matrix.

Referring now to FIG. 8, there is illustrated the "0" character wave shape in its reference position in the delay line 38 to be detected by the "0" resistance matrix, summing amplifier, and peak detector. In this figure, the positive wave shape peaks are coupled to resistors of the resistance matrix through the inverting character amplifiers 42. If the "0" resistance matrix were receiving some other character wave shape, such as the "1" wave shape shown in FIG. 8, the peaks would be in a different configuration, and positive potentials would cause the diodes 262 to conduct, thereby causing the output on the "0" resistance matrix to go positive.

Each resistance matrix output is coupled to an individual summing amplifier and peak detector. In FIG. 1, R1 to R16 represent the output conductors of each of the sixteen resistance matrices contained in the resistance matrix units 39 to 41. In FIG. 2, each of the summing amplifier and peak detector units 49 to 52 contains four summing amplifier and peak detector circuits. The unit 49 receives the outputs of four of the resistance matrices provided for the symbols Q1 to Q4 over the conductors R1 to R4, the unit 50 receives the outputs of four more of the resistance matrices provided for the E or error character and the numbers "9," "8," and "7" over the conductors R5 to R8, the unit 51 receives the outputs of four more of the resistance matrices provided for the N or noise character and the numbers "6," "5," and "4" over the conductors R9 to R12, and the unit 52 receives the outputs of the last four of the resistance matrices provided for the numbers "3," "2," "1," and "0" over the conductors R13 to R16.

The output of each of the sixteen resistance matrices contained in the units 39 to 41 fluctuates as the wave shape propagates down the delay line 38. However, the sixteen peak detectors in the units 49 to 52 remain in a reset state until just before the first positive peak for the leading edge of the wave shape reaches tap 8 of the delay line 38. At this time, all of the sixteen peak detectors are sampled for a six-microsecond period (FIGURE 33*h*). One of the sixteen peak detectors will receive a relatively large positive signal at this time and charge a storage capacitor associated with each of the peak detectors to the peak value of the positive voltage received. An isolation diode in series with each of the storage capacitors associated with the peak detectors prevents the charge from dissipating until the peak detectors are reset again.

Accordingly, the output signal of each of the sixteen resistance networks is coupled to a summing amplifier and peak detector where the value of the sampled character signals is stored on a storage capacitor (C12, FIGURE 13). One of these storage capacitors is provided for each of the sixteen possible characters to be recognized by the reading system.

The sampling operation for the summing amplifier and peak detector circuits of the units 49 to 52 is controlled by the timing system described hereinafter. This sampling operation allows the storage capacitor of the peak detector circuit which holds the maximum charge to be identified. The charge on this storage capacitor is compared with the charges on the other fifteen storage capacitors. Accordingly, the storage capacitor which holds the maximum charge at the sampling time causes a pulse signal to appear on the appropriate output conductor of the units 49 to 52. The foregoing pulse signal is used to set two of the flip-flops 53 to 59 by way of certain of the OR gates 60 to 66.

An indicator circuit 67 is coupled to each of the output conductors, summing amplifiers, and peak detectors in the units 49 to 52.

An accurate timing system is provided to sample the peak detectors and the summing amplifiers in the units 49 to 52. The sampling operation occurs when the peaks of the character wave forms are in alignment with the delay line taps T1 to T8 and T11. The timing system is also provided with apparatus to prevent making sampling decisions based on imbedded magnetic ink or other magnetic particles which may be present on the document being read. Timing is initiated when the first positive peak of a character is detected at tap T7 of the delay line 38. The sampling of the character wave form in the delay line 38 occurs approximately forty microseconds later, when the first positive peak of the character wave form is at tap T8. Certain of the characters are sampled again at tap T11 of the delay line 38.

As a character wave form travels down the delay line 38, its positive peaks are detected by an OR gate 275 (FIG. 51) provided in the outputs of the resistor matrix units 39 to 41. The output of the OR gate 275 comprises negative-going peaks of the character wave form and the inverted character wave form sampled from the delay line 38, which recur every forty microseconds. These negative peaks are coupled via a conductor 10 to a summing amplifier 68 (FIG. 4), where they are amplified and inverted. The signal output of the summing amplifier 68 is coupled to a comparator 69 via two paths. One path contains a fifteen-microsecond delay line 70, and the other path contains an attenuator 71. The attenuator 71 compensates for the loss presented by the delay line 70. The outputs of the delay line 70 and the attenuator 71, termed A and B signals, respectively, are applied to the comparator 69, which is designated the $A<B$ comparator. When the amplitude of the delayed signal A is greater than that of the actual signal B, the output of the comparator 69 goes false (FIG. 33*a*). The output of the comparator 69 goes false about 7.5 microseconds after a positive peak has passed a tap of the delay line 38.

The output of the comparator 69 is applied to an OR gate 72, which also receives as inputs the output of a flip-flop 73 and an unblanking signal UBK′. The unblanking signal UBK′ is false as long as a document is at the read station of the sorting apparatus. The flip-flop 73 is termed the sample pulse inhibit flip-flop. The sample pulses cannot be generated until the flip-flop 73 is set (FIG. 33*f*) as the result of the positive leading edge of a character wave form passing tap T7 of the delay line 38.

The leading edge of a character wave shape first coming into the delay line 38 is first detected at the output amplifier 43, which is coupled to tap T7 of the delay line 38. The output of this delay line amplifier 43 is applied via the emitter follower 46 over a conductor 11 to a delay line 74 (FIG. 4) and to a comparator 75 (FIG. 4) designated $+7'<+7/2$. If characters are being read by the transducer 31, the unblanking signal UBK′ developed in the sorting apparatus is false at this time and is applied as one input to an OR gate 76. When the first positive peak of the character wave form reaches Tap T7 of the delay line, the voltage pulse is coupled into one input of the comparator 75. That same voltage pulse is delayed fifteen microseconds by the delay line 74 and then is amplified and inverted by an amplifier 77. The degree of amplification provided by the amplifier 77 is sufficient to compensate for the loss of signal in the delay line 74. The output of the amplifier 77 is applied to the comparator 75 and to another comparator 78, designated $+7'<1.0$ volt. In the comparator 75, the inverted and delayed signal output of the amplifier 77 is effectively added to the original signal, or, in a sense, the delayed signal non-inverted is subtracted from the other. The output of the comparator 75 goes false (FIG. 33b) when the delayed and amplified signal from the amplifier 77 is greater in magnitude than one half the direct signal applied thereto. The output of the comparator 78 goes false when the signal output of the amplifier 77 is greater in amplitude than one volt.

The comparator 78 also provides a special threshold control. Taps T1 to T6 of the delay line 38 are effectively coupled to the comparator 78, as indicated by the six conductors 22 (FIG. 4). If the signal voltages which follow that first arriving at tap T7 of the delay line are great enough in magnitude, they cause a change in the threshold in the following manner. The voltages appearing on the taps T1 to T6 of the delay line 38 are compared with each other in the comparator 78. The greatest of these voltages is stored in the comparator 78, and the result is then divided by "3." If the result of the division is greater than one volt, then that division by "3" resulting magnitude determines the threshold. In other words, if a small voltage were present at the leading edge of a character, perhaps caused by an extraneous particle of magnetic ink on the document being read, the strength of the character behind the magnetic particle would increase the threshold to such an extent that the magnetic particle leading the character would not in effect trigger the comparator 78. In this case, the output of the OR gate 76 would remain true, and the first one-shot circuit 79 in the timing system would not be set. If the leading edge of the character is of sufficient strength to trigger both the comparator 78 and the comparator 75, both of their output signals would be false. The unblanking signals UBK′ from the sorting apparatus unit would also be false, at this time. Accordingly, a true pulse would then occur at the output of an inverter 80, which would cause the one-shot circuit 79 to be set (FIG. 33c). Accordingly, the setting of the one-shot circuit 79 can be stated as $X1=(T7'>\text{T1-T6 max./K})\ (T7'>T7/2)\ T7'\geq 1.0$ volt) (UBK). The manner of generating the $T7'<T7/2$ term is similar to the manner of obtaining the $A<B$ signal output of the comparator 69. The output of the comparator 75 goes true when the delayed signal amplitude from the amplifier 77 exceeds one half the non-delayed signal amplitude. Two conditions must be satisfied for the output of the comparator 78 to go true, as this comparator functions as both a voltage comparator and a noise discriminator. The signal output of the amplifier 77 must be equal to or greater than one volt; in addition, it must be equal to or greater than one third of the peak level of the voltages on taps T1 through T6 of the delay line 38, where $K=3$.

At the end of the sixteen-microsecond output signal from the one-shot circuit 79, a flip-flop circuit 81 is set (FIG. 33d) via the A.C. inverter 82.

At the time of the setting of the flip-flop circuit 81, the counter 83 (FIG. 5), comprising the flip-flop circuits 84 to 90, is stopped. The stopping of the counter 83 is accomplished by applying to the inputs of an OR gate 91 (FIG. 5) signals representing the functions L, character clear, H′, and T. The L function corresponds to the signal present at the "1" terminal of the flip-flop circuit 73, the character clear function corresponds to the signal present on the conductor 15 (FIG. 4), the H′ function corresponds to the signal present at the "0" terminal of the flip-flop circuit 81, and the T function corresponds to the signal present at the "1" terminal of a flip-flop circuit 93 (FIG. 4). In order to obtain a True pulse output from the inverter 94 (FIG. 5), the four inputs to the OR gate 91 must be False. Since the output H′ at the "0" terminal of the flip-flop circuit 81 is True until that flip-flop circuit is set, the output of the inverter 94 will be False. The output of the inverter 94 is coupled to one input of a two-input OR gate 95. A clock circuit 96 is coupled to the other input of the OR gate 95. The output of the OR gate 95 is coupled by way of an inverter 97 to the counter 83. Since the output of the inverter 94 is False until the flip-flop circuit 81 is set, the clock pulses developed by the clock circuit 96 are applied through the OR gate 95 and the inverter 97 to the counter 83. In response to these clock pulses, the counter operates as a binary counter.

When the flip-flop circuit 81 is set H′ goes False, and the output of the inverter 94 goes True. The True output signal of the inverter 94 is designated the clock inhibit signal and is applied over the conductor 17 to a 20-microsecond one-shot circuit 98 (FIG. 4), causing the setting thereof. See FIG. 33*e*. The output X2 of the one-shot circuit 98 is True when set, and is applied over the conductor 21 to one input of a two-input AND gate 99 (FIG. 5). The other input of the AND gate 99 receives clock signals from the clock circuit 96 by way of an inverter 100 over the conductor 16. The True output X2 of the one-shot circuit 98 (FIG. 4) operates to gate into the input of a driver 101 (FIG. 5), by way of an inverter 102, the clock signals from the clock circuit 96. The True output of the driver 101 is applied to the "J" or set terminals of the flip-flop circuits 84 to 90 by way of OR gates 103 to 109. Accordingly, during the 20-microsecond output of the one-shot circuit 98, a burst of clock pulses from the clock circuit 96 is gated into the counter 83, thereby assuring the setting thereof. The clear state of the counter 83 occurs when all of the flip-flop circuits 84 to 90 are in their set state. When the first clock pulse from the clock circuit 96 is applied via the inverter 97 to the counter 83, the flip-flop circuits 84 to 90 go to their K or reset state.

The 20-microsecond output of the one-shot circuit 98 (FIG. 4) is also applied by way of an A.C. inverter 110 to the "J" terminal of the flip-flop circuit 73. Therefore, at the end of the 20-microsecond pulse output of the one-shot circuit 98, the counter 83 has been started, and the flip-flop circuit 73 is set (FIG. 33*f*). The False output from the "0" terminal of the flip-flop circuit 73 is applied to one input of the OR gate 72. Accordingly, the OR gate 72 is conditioned to pass signals from the output of the comparator 69.

When the flip-flop circuit 81 is set, the signal at its "1" output terminal is True and is applied to one input of a two-input AND gate 111. The "0" output terminal of the flip-flop circuit 93 is coupled to the other input of the AND gate 111. The flip-flop circuit 93 is in its reset state at this time, so that the signal at its "0" output terminal is True. Accordingly, the AND gate 111 produces a True output which is applied to a reset driver 112, causing operation thereof. The reset driver 112 normally produces an output which back-biases discharge diodes coupled to storage capacitors of the summing amplifiers and peak detectors in the units 49 to 52. During the time that a character waveform should be in proper alignment in the delay line 38, the maximum charge should occur on the storage capacitor in the resistor matrix associated with that particular character waveform. During this time, the storage capacitor should be allowed to charge. After this times, the output of the reset driver 112 goes negative (−20 volts), so as to cause discharge of the storage capacitor. As the flip-flop circuit 93 is defined as the character decision flop-flop circuit, as described hereinafter, the time of its setting (FIG. 33L) indicates that the reset is no longer needed, since a character decision has been arrived at, and the storage capacitors in the summing amplifier and peak detector units 49 to 52 can be discharged. The reset driver 112 operates to discharge all the storage capacitors in all sixteen character channels of the units 49 to 52.

Therefore, the flip-flop circuit 81 is set (FIG. 33*d*) at the termination of the sixteen-microsecond output of the one-shot circuit 79. The reset signal appearing on the conductor 12 at the output of the reset driver 112 (FIG. 4) is then removed from the units 49 to 52 by the logic:

$$\text{Reset}=HT'$$

The storage capacitors of the individual peak detectors in the units 49 to 52 can now begin to charge. The function H also raises the clock inhibit function by the logic:

$$\text{Clock Inhibit}=HL'T'C_c'$$

The $C_c'$ function is termed Character Clear. The Clock Inhibit function inhibits the 250 kc. clock circuit 96 from clocking the counter 83. In addition, the Clock Inhibit function causes the setting of the oneshot circuit 98. During the 20-microsecond output of the one-shot circuit 98, the pulse output of the clock circuit 96 is applied via the conductor 16, the AND gate 99, the inverter 102, and the reset driver 101 to the counter 83 to set all the flip-flop circuits 84 to 90 to the "J" state.

The end of the 20-microsecond output of the one-shot circuit 98 (FIG. 33*e*) occurs just before the character waveform in the delay line reaches tap T8. At this time, the Sample Pulse Inhibit flip-flop circuit 73 is set (FIG. 33*f*). Two events follow upon the setting of the flip-flop circuit 73. First, the Clock Inhibit Signal goes False, causing the OR gate 95 to be enabled for passage therethrough of clock pulses from the clock circuit 96. Accordingly, the counter 83 begins to count these clock pulses. Second, the Sample Pulse Inhibit OR gate 72 is enabled by the output of the flip-flop circuit 73, thereby allowing the next $A<B$ pulse from the comparator 69 to cause the setting of a one-shot circuit 113 (FIG. 33*g*). The OR gate 72 produces a False output when its three inputs are False, which output is applied via an inverter 114 to the one-shot circuit 113. The True output of the one-shot circuit 113 is applied to a six-microsecond one-shot circuit 154, causing the setting thereof. A sampling operation now occurs at the peak detector circuits in the units 49 to 52, and a preliminary character decision signal is present on the output conductors of the peak detector circuits. The True output of the one-shot circuit 154 is called the sample gate (FIG. 33*h*) and is applied to a sample driver 115. The sample driver 115 develops a False output, called the sample pulse, which is applied via the conductor 13 to the units 49 to 52 (FIG. 2) to effect a sampling operation. A second sampling operation may occur, depending on which character is present in the delay line 38.

Figure 6:
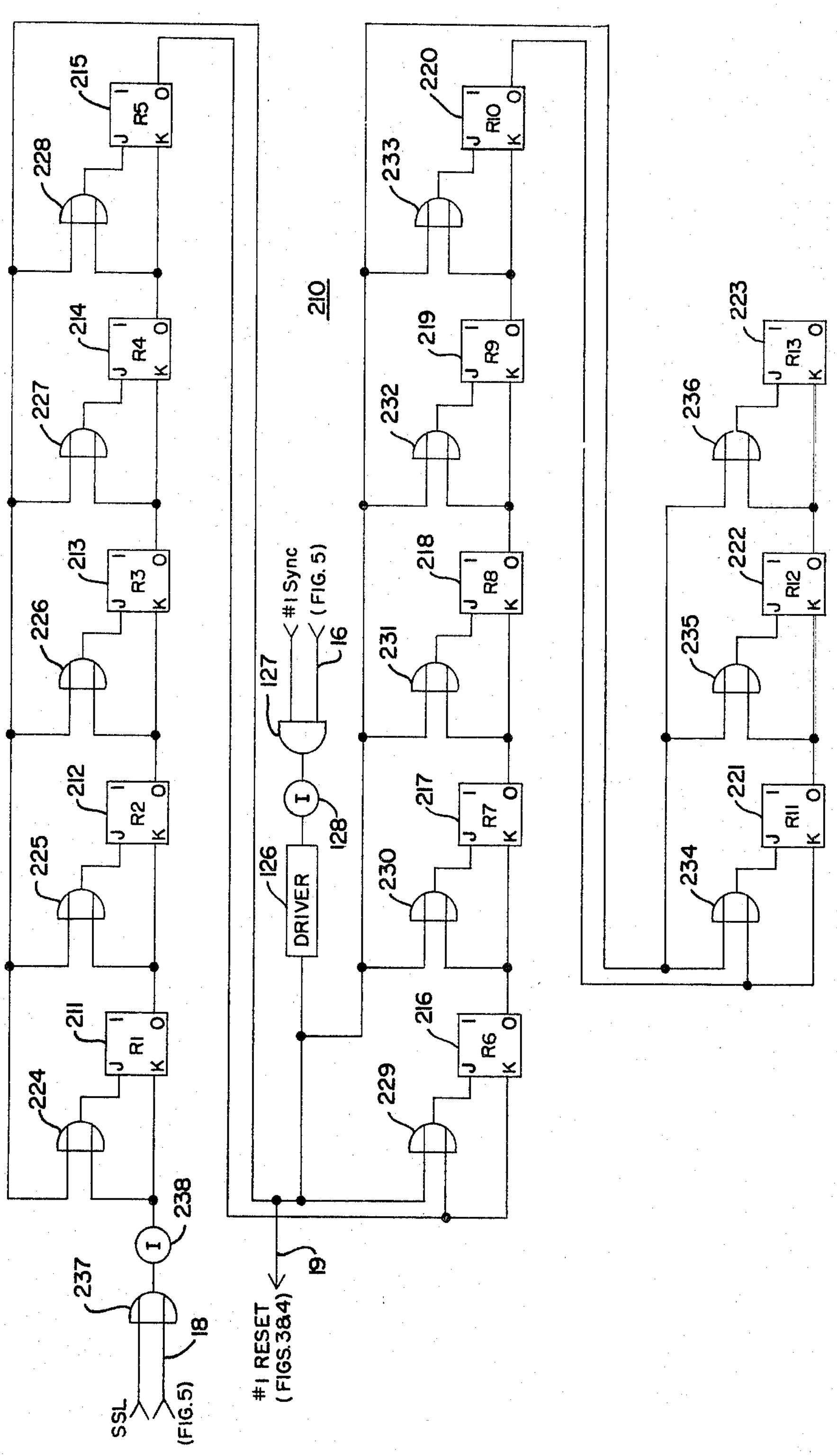

Assume for the time being that a second sampling operation will not be made. At the termination of the 23-microsecond output of the one-shot circuit 113, a flip-flop circuit 116 is set (FIG. 33*k*). This setting operation is accomplished by having the output of the one-shot circuit 113 applied via an inverter 117 to the "J" input terminal of the flip-flop circuit 116. The "0" output terminal of the flip-flop circuit 116 is connected to two two-input OR gates 118 and 119. The outputs of the OR gates 118 and 119 are connected to an AND gate 120, whose output in turn, is coupled via an inverter 121 to the "J" input terminal of the character decision flip-flop circuit 93. The other input for the OR gate 118 is function F′, derived from the "0" output terminal of the flip-flop circuit 58 (FIG. 3) and applied thereto via the conductor 23. The other input for the OR gate 119 is the output of an inverter 122, which receives the output of a three-input OR gate 123. The inputs for the OR gate 123 are the functions X4′, E, and G. The X4′ function (FIG. 33*j*) is the signal output of an A.C. inverter 124, which is connected to the output of the six-microsecond one-shot circuit 154. The E function is the signal derived from the "1" output terminal of the flip-flop circuit 57 and is applied to the OR gate 123 via the conductor 24. The G function is the signal derived from the "1" output terminal of the flip-flop circuit 59 and is applied to the OR gate 123 via the conductor 25. The output of the flip-flop circuit 116 conditions the flip-flop circuit 93 for operation. The logic for the setting of the flip-flop circuit 93 is:

$$T=M(X4'+E+G+F)$$

where X4′ is the four-microsecond signal occurring at the time of the setting of the one-shot circuit 154, E is the output of the flip-flop circuit 57 when set in response to a character decision representing the numerals 0, 4, 6, or 9, or the symbol Q1, G is the output of the flip-flop circuit 59 when set in response to a noise or error signal, and F is the output of the flip-flop circuit 58 when set in response to a character decision representing either of the symbols Q1 to Q4. Accordingly, the functions E, F, or G from the flip-flop circuits 57 to 59 of the data register cause the setting of the flip-flop circuit 93, since the function X4′ will have occurred before the flip-flop circuit 116 is set. The setting of the character decision flip-flop circuit 93 completes the character decision operation by causing the reset driver 112 to operate, thereby causing the resetting of the sixteen peak detectors in the units 49 to 52, and by causing the flip-flop circuit 73 to be reset. The resetting of the flip-flop circuit 73 is accomplished by way of a two-input OR gate 125, whose inputs are the signals T derived from the flip-flop circuit 93 and the #1 Reset signals derived from a driver 126 (FIG. 6). The driver 126 is coupled to the output of a two-input AND gate 127 via an inverter 128. One input to the AND gate 127 is termed the #1 Sync pulse and is developed in the sorting apparatus. The #1 Sync pulse occurs when the lead edge of a document is detected. The other input to the AND gate 127 is the output of the clock circuit 96. The setting of the character decision flip-flop circuit 93 also causes a trigger reset signal to be developed at the output of an inverter 129 (FIG. 7). The trigger reset signal is applied via the conductor 20 to the comparator 78 to cause the resetting thereof.

Returning to the function of the flip-flop circuit 73, it has been described that the output of the comparator 69 is used to set the one-shot circuit 113. From the resistor matrices in the units 39 to 41 by way of the summing amplifier 68, a signal is derived which reaches a peak resembling a sine wave each forty microseconds or for each division of time represented by a tap or sampling point of the delay line 38. This signal is derived by summing the voltages from the taps T1 to T8 and T11 of the delay line 38 in the summing amplifier 68. The output of the summing amplifier 68 is then applied to the comparator 69 via two paths. One path contains the attenuator 71, which matches the attenuation provided by the delay line 70 in the other path. At the time that the delayed signal is equal to or greater than the non-delayed signal, the output of the comparator 69 goes False. If this occurs during the time of reading of a check, the unblanking signal $\overline{\text{UBK}}$ applied to the OR gate 72 is False also. Since the flip-flop circuit 73 has now been set, the signal applied to the OR gate 72 from its "0" output terminal is also False. Therefore, at this time the one-shot circuit 113 will be set. The setting of the one-shot circuit 113 causes the one-shot circuit 154 to be set. In this manner, the time of the setting of the one-shot circuit 154 determines the time of the sample pulse output of the sample driver 115.

The significance of applying the voltages from the taps T1 to T8 and T11 of the delay line 38 to the summing amplifier 68 in order to derive an output from the comparator 69 is as follows. If the character being read is slightly off spacing within itself—that is, if the character waveform as it propagates down the delay line 38 does not line up in time with the taps T1 to T8 and T11—then the character waveform cannot be said to fit perfectly in the delay line 38. The maximum output that would be detected from a resistor matrix of the units 39 to 41 might not occur at the same time that the leading edge of the character waveform is exactly at tap T8 of the delay line 38. For example, if the character itself were slightly thin, the maximum output information from a resistor matrix would occur before the character waveform actually arrived at tap T8 of the delay line 38. If the character itself were a little wide, the opposite would be true. Accordingly, the output pulses of the comparator 69 are to some extent locked to the fit of the character in the delay line 38. The sampling pulses then are developed from this fitting of a character within the delay line 38.

Returning now to a description of the operation of the one-shot circuits 79 and 98, it was stated previously that the edge of a character waveform is at tap T7 of the delay line 38 when it is first detected, and that forty microseconds later it should be at tap T8 and perfectly fit the delay line 38 if it were an ideal character waveform. Since the one-shot circuit 79 delays the setting of the flip-flop circuit 81 for sixteen microseconds, this denotes that the leading edge of the character waveform has progressed about half the distance between taps T7 and T8. Another twenty microseconds of the forty-microsecond interval is taken up by the one-shot circuit 98. Therefore, the OR gate 72 should not be operative to set the one-shot circuit 113 to develop sample pulses until the first peak of the character waveform has actually reached tap T8 of the delay line 38. In the case of thin characters, where the fit of the character waveform in the delay line 38 comes somewhat earlier than the arrival of the leading edge of the character waveform at tap T8, the output of the comparator 69 will have already gone False before the time of the setting of the flip-flop circuit 73, thus allowing the setting of the one-shot circuit 113. In the case of wider than normal characters, the character waveform itself would determine the time of occurrence of the sample pulses as dictated by the output of the comparator 69. When the OR gate is operated, causing the setting of the one-shot circuit 113 and thus the setting of the one-shot circuit 154, the sample pulse is applied to the sample driver 115. The output of the sample driver 115 is applied to the sixteen storage capacitors in the units 49 to 52 to sample these capacitors, and the one capacitor that retains the maximum charge produces an output which is applied via the appropriate OR gates 60 to 66 to two of the six flip-flop circuits 53 to 59. If the output of the units 49 to 52 represented an error (E) or a noise (N) character, then the flip-flop circuit 59 would be set. At the end of the twenty-three-microsecond output of the one-shot circuit 113, the flip-flop circuit 116 is set (FIG. 33*k*).

It was pointed out previously that two distinct types of characters are identified by the utilization of a common one of the flip-flop circuits 53 to 59. In one case, the four symbols Q1 to Q4 utilize the flip-flop circuit 58, and in the other case the characters 0, 4, 6, and 9 utilize the flip-flop circuit 57. The gating circuitry comprising the OR gates 60 to 66 makes use of this distinction between the characters read, and the distinction that the flip-flop circuit 59 is uniquely utilized for the identification of an error or noise character.

At the termination of the output of the one-shot circuit 113, when the flip-flop circuit 116 is set, the OR gates 118 and 119 are enabled. If the first character decision stored in the flip-flop circuits 53 to 59 is a Q symbol, then the function F′ applied to the OR gate 118 will be False, causing its operation. The AND gate 120 will be operated, thus causing the flip-flop circuit 93 to be set. Accordingly, the flip-flop circuit 93 was set (FIG. 33L) after a single sampling operation for the Q symbol read. Similarly, if the first character decision stored in the flip-flop circuits 53 to 59 were a 0, 4, 6, or 9 character, then the flip-flop circuit 57 would be in its set state. The function E applied to the OR gate 123 would cause operation thereof. Then, at the time of the setting of the flip-flop circuit 116, the OR gate 119 will operate to cause operation of the AND gate 120. As a result, the output of the inverter 121 goes True, causing the setting of the character decision flip-flop circuit 93, which terminates the sampling operation. The "1" output terminal of the flip-flop circuit 93 is coupled to the OR gate 125 (FIG. 4), so that, when the flip-flop circuit 93 is set, the OR gate 125 is operated, causing the resetting of the flip-flop circuit 73. Since the flip-flop circuit 73 must be in its set state in order to allow sample pulses to be derived, the resetting of the flip-flop circuit 73 in response to the setting of the flip-flop circuit 93 terminates the sampling operation.

If the first character decision stored in the flip-flop circuits 53 to 59 represents either the 1, 2, 3, 5, 7, or 8 characters, and so the flip-flop circuits 57 to 59 are not in their set state, then two sampling operations respecting these characters are performed. At the end of the twenty-three-microsecond output of the one-shot circuit 113, the flip-flop circuit 116 is set, thereby enabling one of the inputs to each of the OR gates 118 and 119. At the end of the twenty-three-microsecond output of the one-shot circuit 113, the X4′ signal which is applied to the OR gate 123 has already been dissipated, since it was derived in the A.C. inverter 124 from the trailing edge of the six-microsecond pulse output of the one-shot circuit 154. The duration of the X4′ pulse was four microseconds. Accordingly, at the end of the output of the one-shot circuit 113, the inverter 121 does not produce an output to cause the setting of the flip-flop circuit 93, since the OR gates 118 and 119 are not operated. The F′ input to the OR gate 118 remains True, since the first character decision did not involve a Q symbol. As the flip-flop circuit 93 remains in its reset state after the foregoing character decision, a second sampling operation can be performed. Accordingly, when the second sample pulse occurs forty microseconds after the first one, the output of the one-shot circuit 154 triggers the A.C. inverter 124, causing a True signal on the conductor 23 to be applied to the OR gate 123. The gates 119 and 120 will be operated, and the inverter 121 will develop a True output, thereby causing the setting of the flip-flop circuit 93. Accordingly, two sampling operations are performed to arrive at a final character decision for the characters 1, 2, 3, 5, 7, and 8.

In summary, the logic circuitry provided for the setting of the character decision flip-flop circuit 93 insures that the flip-flop circuit 93 remains in its reset state if the characters 1, 2, 3, 5, 7, and 8 are read by the reading system. Accordingly, after the first character decision has been made respecting those characters, a second sampling operation will occur when the character waveform reaches tap T11 of the delay line 38. Two sampling operations (double sampling) are performed on the characters 1, 2, 3, 5, 7, and 8, because, if one of these characters arrives at tap T8 of the delay line 38 ahead of the ideal sampling time, it may be interpreted as some other character. For example, if the first positive peak of the character waveform for the "5" character should arrive at tap T8 of the delay line 38 ahead of the sampling time determined by the output of the sample driver 115, then that character waveform might be erroneously determined to be an "8" character waveform. The result of the second sampling operation is that the result of the first sampling operation is stored in the appropriate flip-flop circuits 53 to 59 of the data register. The flip-flop circuits 53 to 59 are coupled to a multiple read and no read detection system 130 (FIG. 7), which compares the character decisions made as a result of the two sampling operations. If the character decisions are not identical, then a multiple read condition is indicated by the detection system 130. After the second sampling operation, the flip-flop circuit 93 is set, terminating the sampling operations. This setting of the flip-flop circuit 93 takes place at the termination of the second sample signal in response to the termination of the X4′ signal (FIG. 33*j*). The flip-flop circuit 93, when set, will function as described previously for a single sample operation.

The fourteen character information outputs from the units 49 to 52 for the four Q symbols Q1 to Q4 and the characters 0 to 9 are applied to an encoder network comprising the OR gates 60 to 66. This encoder network encodes the character information into a two-out-of-six bit code as shown in the following table:

| Register (A–F) | Symbols | | | | | | | | | | | | | |
|---|---|---|---|---|---|---|---|---|---|---|---|---|---|---|
| | 0 | 1 | 2 | 3 | 4 | 5 | 6 | 7 | 8 | 9 | Q1 | Q2 | Q3 | Q4 |
| A | 0 | 0 | 1 | 1 | 0 | 1 | 1 | 0 | 0 | 0 | 0 | 0 | 0 | 0 |
| B | 0 | 1 | 0 | 0 | 1 | 1 | 0 | 1 | 0 | 0 | 0 | 1 | 0 | 0 |
| C | 1 | 0 | 1 | 0 | 0 | 0 | 0 | 1 | 1 | 0 | 0 | 0 | 0 | 1 |
| D | 0 | 1 | 0 | 1 | 0 | 0 | 0 | 0 | 1 | 1 | 0 | 0 | 1 | 0 |
| E | 1 | 0 | 0 | 0 | 1 | 0 | 1 | 0 | 0 | 1 | 1 | 0 | 0 | 0 |
| F | 0 | 0 | 0 | 0 | 0 | 0 | 0 | 0 | 0 | 0 | 1 | 1 | 1 | 1 |

The encoded character decision is then applied to the data register, where the appropriate flip-flop circuits 53 to 58 are set in accordance with the above table. The output from the data register is then converted by a conversion network comprising OR gates 131 to 138, AND gates 139 to 142, and inverters 270 to 273 to an inverse four bit binary code. The coded information output (lines *b*1, *b*2, *b*4, and *b*8) of the inverters 270 to 273 is then applied to the sorting apparatus to control the sorting of checks or for further transfer to a data-processing unit associated therewith. The code configuration for the character decision applied to the sorter control unit is shown in the following table:

| Outputs | Symbols | | | | | | | | | | | | | |
|---|---|---|---|---|---|---|---|---|---|---|---|---|---|---|
| | 0 | 1 | 2 | 3 | 4 | 5 | 6 | 7 | 8 | 9 | Q1 | Q2 | Q3 | Q4 |
| 8′ (b8) | 1 | 1 | 1 | 1 | 1 | 1 | 1 | 1 | 0 | 0 | 0 | 0 | 0 | 0 |
| 4′ (b4) | 1 | 1 | 1 | 1 | 0 | 0 | 0 | 0 | 1 | 1 | 0 | 0 | 1 | 1 |
| 2′ (b2) | 1 | 1 | 0 | 0 | 1 | 1 | 0 | 0 | 1 | 1 | 0 | 1 | 0 | 0 |
| 1′ (bl) | 1 | 0 | 1 | 0 | 1 | 0 | 1 | 0 | 1 | 0 | 1 | 0 | 0 | 1 |

The intermediate operation of converting the output of the units 49 to 52 to the two-out-of-six bit code is performed in order to provide for multiple read (MR) detection. In addition, the F flip-flop circuit 58 is utilized by other circuitry to detect the reading of a Q symbol.

The six flip-flop circuits 53 to 58 of the data register are reset before the next character decision is made by the clear signal, whose logic is: Clear=$Cc+R1$, where Cc=character clear signal and R1=#1 Reset signal. The character clear signal (FIG. 33*n*) occurs 316 microseconds after the sample pulse inhibit flip-flop circuit 73 (FIG. 4) was set from a previous reading cycle. This allows for a minimum spacing between two characters on the check 32 of 0.115 inch, or 355 microseconds. The time of the character clear signal can be changed by re-programming a program plugboard 143 (FIG. 4), which receives count information from the counter 83. The character clear signal is present at the output of an inverter 144, whose input is coupled to the output of a nine-output OR gate 145. The OR gate 145 receives eight inputs from the program plugboard 143 (P1–P4, P5′–P6′) and another input X2 from the output of the one-shot circuit 98. The character clear signal is applied to an OR gate 146 along with the R1 or #1 Reset signal. The #1 Reset signal is developed by the driver 126 (FIG. 6) in the manner previously described. The output of the OR gate 146 is applied to a driver 147 via an inverter 148 to develop the clear signal. The clear signal is then applied to the flip-flop circuits 53 to 59 (FIG. 3) and the flip-flop circuit 116 (FIG. 4), causing them to be reset.

The character decision is made and stored in the register flip-flop circuits 53 to 59 at the time that the first positive peak of a character waveform reaches tap T8 or at the time it reaches tap T8 and tap T11 of the delay line 38, depending on whether or not the character read is single sampled or double sampled.

Figure 3:
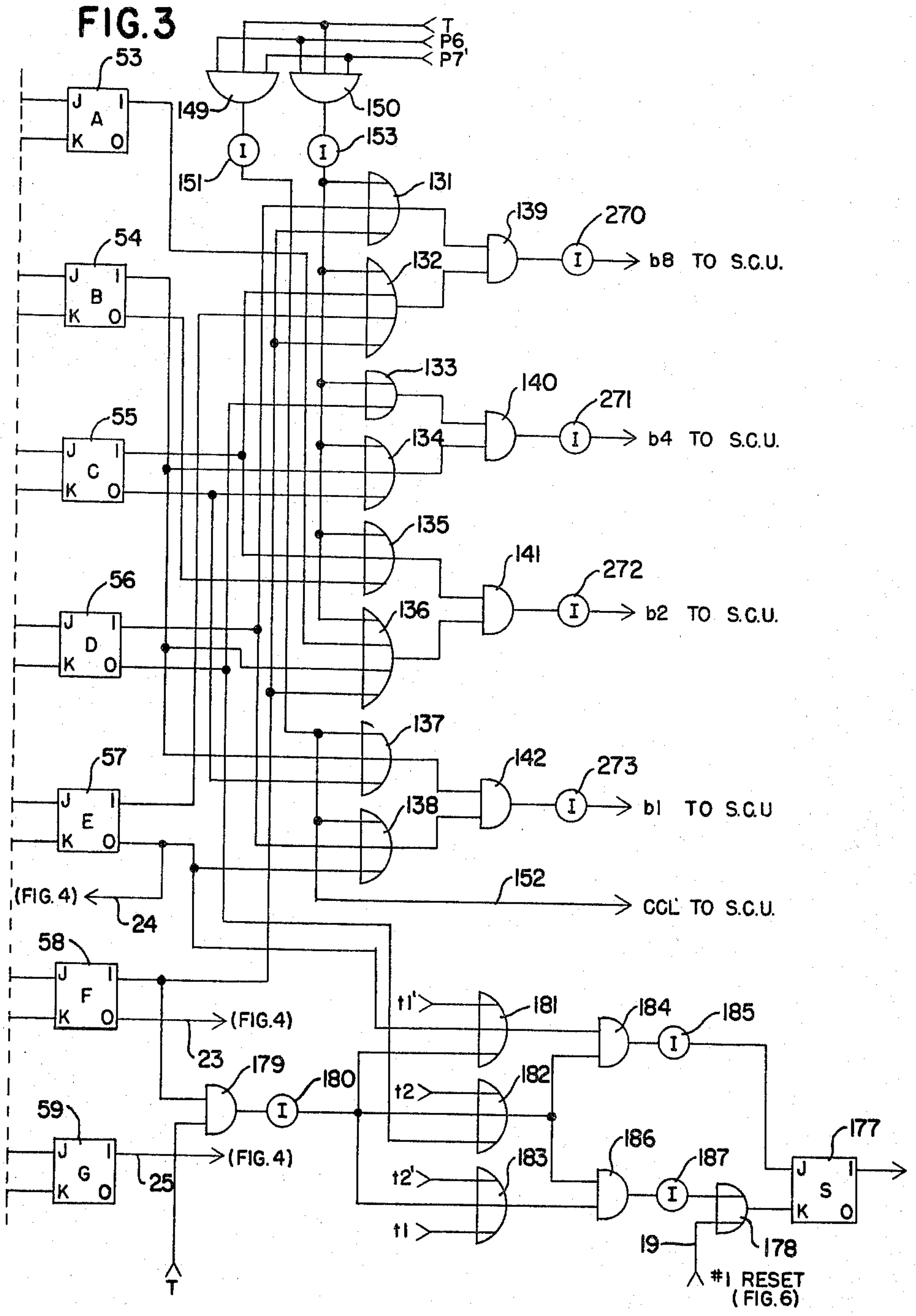

The outputs of the flip-flop circuits 53 to 59 are encoded by the conversion network to the inverse binary form and applied to the four character reader output lines *b*1, *b*2, *b*4, and *b*8. The output lines *b*1, *b*2, *b*4, and *b*8 are enabled when the counter 83 (FIG. 5) reaches a count of thirty-two (128 microseconds after its start) and will stay enabled until its count reaches 64 (256 microseconds after its start). Accordingly, the character outputs on the lines *b*1, *b*2, *b*4, and *b*8 will have a pulse width of 128 microseconds (FIG. 33*q*) and will be true thirty-two microseconds after the Error and Multiple Read (MR) outputs (FIG. 7) are clocked out of the character reader. The logic for the data clock ($C_D$) is $TP_6P_7'$. Accordingly, the output from the "1" terminal of the flip-flop circuit 93, and the outputs from the "1" terminal and the "0" terminal of the flip-flop circuits 89 and 90 respectively of the counter 83 (FIG. 5), are each applied to OR gates 149 and 150 (FIG. 3). The OR gate 149 is coupled via an inverter 151 to the OR gates 137 and 138 in the conversion network, thus enabling these gates at the time that the output of the inverter 151 goes False. The output of the inverter 151, which lasts for 128 microseconds, is also made available on an output conductor 152, and the signal present on this conductor is designated the CCL' signal, which is utilized in the sorter control unit. The OR gate 150 is coupled via an inverter 153 to the OR gates 131 to 136 in the conversion network, thus enabling these gates at the time that the output of the inverter 153 goes False.

The character reader is provided with means for detecting any of several unacceptable conditions denoting an error. When an error is detected, an error-indicating signal (True) is developed on an error output conductor 155 (FIG. 7) thirty-two microseconds before data information appears on the data output lines *b*1, *b*2, *b*4, and *b*8 (FIG. 3). The logic for developing an error-indicating signal on the error output conductor 155 is:

$Error = C_E\ (G+NR)$, where
$C_E = \text{Error Clock (FIG. 33}p) = TP_7'\ (P_4P_5+P_6)$,
$G = \text{Error Decision Flip-Flop Circuit } 59 = N+E+E_C+E_F$.

$C_E$, the Error Clock, in FIG. 7 comprises OR gates 156 and 157, an AND gate 158, and inverters 159 and 160. The output of the error clock is applied to one input of each of five OR gates 161 to 165. The OR gate 161 has applied to its other input the function G' derived from the "0" output terminal of the G flip-flop circuit 59 (FIG. 3). The OR gate 162 has applied to its other input the function NR' (No Read) developed in the multiple read and no read detection system 130. The OR gate 163 has applied to its other input the function MR' (Multiple Read) developed at the output of an inverter 166, whose input is coupled to the multiple read and no read detection system 130. The OR gate 164 also has the function G' applied to its other input. Finally, the OR gate 165 has applied to its other input the function F' derived from the "0" output terminal of the F flip-flop circuit 58 (FIG. 3). The output of each of the OR gates 161 and 162 is applied to an AND gate 167, whose output via an inverter 168 is applied to the error output conductor 155. The error-indicating signal appearing on the conductor 155 is utilized in the sorter control unit. The output of each of the OR gates 163 and 164 is applied to an output conductor 171. The signal appearing on the output conductor 171 is termed a multiple read signal and is utilized in the sorter control unit. The output of the OR gate 165 is applied via an inverter 172 to an output conductor 173. The signal appearing on the output conductor 173 is termed the Q*s* signal and is also utilized in the sorter control unit.

If the character decision flip-flop circuit 93 (FIG. 4) is set, then the output of the inverter 160 (the error clock output) goes true when the counter 83 (FIG. 5) reaches a count of "24," ninety-six microseconds after it was started, and this output remains true until the counter 83 reaches a count of "64," two hundred and fifty-six microseconds after it was started (FIG. 33*p*). During this time, if either the flip-flop circuit 59 (FIG. 3) is in its set state or the multiple read and no read detection system 130 develops a no read signal, then the functions G' or NR' applied to the OR gates 161 and 162 cause an error-indicating signal to appear on the output conductor 155.

As shown above, in the logic equation for developing an error-indicating signal on the output conductor 155, the G flip-flop circuit 59 (FIG. 3) is set by the functions N, E, $E_c$ or $E_F$. These functions are identified as follows: N is the output of the summing amplifier and peak detector circuit in the unit 51 (FIG. 2) and indicates a noise character recognized by that circuit. E is the output of the summing amplifier and peak detector circuit in the unit 50 (FIG. 2) and indicates an error character. Specifically, the function E is the character "8" with a missing or disturbed leading edge caused by improper printing thereof. $E_c$ is the output of an inverter 174 (FIG. 4) and indicates that it is too late to make a character decision. In other words, $E_c$ indicates that the time between the setting of the L flip-flop circuit 73 (FIG. 4) and the setting of the T flip-flop circuit 93 (FIG. 4) is greater than sixty-eight microseconds. $E_F$ is the output of an inverter 175 (FIG. 4) and indicates that the distance between two characters in a fixed field on a check 32 is greater than a maximum allowable amount of 0.135 inch.

Figure 50:
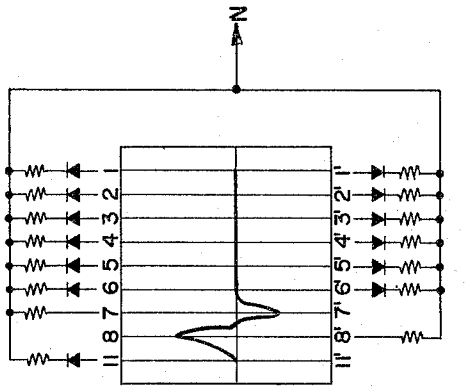

The detection of a noise character (N) will now be described. The waveform of a noise character in the delay line 38 is developed from a small fragment of magnetic material embedded either in or on the surface of the read area of a check 32. The signals generated from such particles may vary in amplitude, but are short in duration as compared to an acceptable character waveform. For example, a noise-generated waveform may have a positive leading edge, which has propagated to tap T8, and a negative trailing edge, which has propagated to tap T7 of the delay line 38, as shown in FIG. 50. The resistor matrix of the resistor matrix units 39 to 41 (FIG. 1) which is used to detect the noise character (N) contains diodes that are in series with matrix resistors. As the noise character waveform propagates down the delay line 38, only positive voltages derived from the positive peak of the noise character waveform will cause diodes coupled to the various taps of the delay line 38 to conduct. The summing amplifiers in the units 49 to 52 (FIG. 2) require negative potentials for their operation. When the noise character waveform (N) is so positioned in the delay line 38 that its positive leading edge is at tap T8, the inverted positive peak from tap T8 is resistively coupled to the resistor matrix output along with the negative non-inverted peak from tap T7. The negative potential is then detected by the peak detector provided in the unit 51 (FIG. 2) for the noise character waveform (N) at the time of the sampling operation. The output from the N summing amplifier and peak detector in the unit 51 (FIG. 2) causes the setting of the G error flip-flop circuit 59 (FIG. 3).

The detection of an error character (E) will now be described. The waveform resulting from reading the character "8" with a missing or disturbed leading edge is similar to that resulting from the reading of the character "5." A special set of resistors (FIG. 49) are contained in the resistor matrix included in the units 39 to 41 provided for the error character (E) to detect these characters so as to prevent them from developing an erroneous character decision. A disturbed "8" character is detected as a "5" character by the first sampling operation, but is detected as an error character (E) by the second sampling operation.

The detection of a late character decision (character decision too late) will now be described. The first sample pulse from the output of the sample driver 115 (FIG. 4) occurs approximately ten microseconds after the L sample pulse inhibit flip-flop circuit 73 (FIG. 4) has been set. If a second sampling operation is to be made, it will occur approximately forty microseconds after the first sample pulse. If a character decision has not been made within this time, a mistriggering situation has probably occurred. In order to allow for inaccuracies in printing of the characters on a check 32, the maximum time allowed for reaching a character decision is sixty-eight microseconds. The logic for character decision too late is: $E_c=T', L, P1, P2', P3', P4', P5, P6'$ (FIG. 33*m*). This equation states that $E_c$ occurs when the L sample pulse inhibit flip-flop circuit 73 (FIG. 4) is still set after sixty-eight microseconds, as indicated by the state of the $P_1$ to $P_7$ flip-flop circuits 84 to 90 of the counter 83 (FIG. 5). The sixty-eight-microsecond time interval can be changed at the program plugboard 143 (FIG. 4). The character decision too late signal $E_c$ appears at the output of the inverter 174 (FIG. 4). The inverter in turn is coupled to the output of an eight-input OR gate 176. The OR gate 176 receives six inputs from the program plugboard $P_1$, P2′, P3′, P4′, $P_5$, and P6′, an input L from the "0" output terminal of the L flip-flop circuit 73 (FIG. 4), and an input T′ from the "1" output terminal of the flip-flop circuit 93 (FIG. 4).

The detection of fixed field errors will now be described. Logic circuitry is provided to determine whether the distance between two characters in a fixed field exceeds 0.135 inch. If this maximum distance is exceeded, it is an indication that a portion or all of the next character is missing. An S flip-flop circuit 177 (FIG. 3) is used to identify a fixed field on the check read. A fixed field is one that is always printed closed with a predetermined number of characters. The first fixed field involved is the Amount Field, which occurs during the first four milliseconds of the check and is enclosed by Q1 symbols. It begins with the first Q1 symbol and extends one and one seventh inches into the read area, as measured from the lead edge of the check. The second fixed field involved is the Transit Routing Field, which is composed of the ABA Number and the FRD Number. Its beginning is detected by the first Q3 symbol occurring after 4.09 inches of travel of the check. The next Q3 symbol terminates the Transit Routing Field. The S flip-flop circuit 177 is used to identify these fixed fields in conjunction with a system of time and character recognition.

The S flip-flop circuit 177 (FIG. 3) is used to indicate the presence of a fixed field. The logic for the S flip-flop circuit 177 is:

$S$=fixed field=$S'+F(T_1E+T2'D)$.
$S'$=absence of fixed field=$S+F(t_1't_2+t_2'D)+R1$,
where $T$=T character decision flip-flop circuit 93 (FIG. 4),
$F$ (flip-flop circuit 58, FIG. 3)=$Q1+Q2+Q3+Q4$,
$E$ (flip-flop circuit 57, FIG. 3)=$Q1+0+4+6+8$,
$D$ (flip-flop circuit 56, FIG. 3)=$Q3+1+3+8+9$,
$t_1$=end of sync signal #1 to 4.096 milliseconds,
$t_2$=end of sync signal #1 to 12.280 milliseconds,
$R1$=reset #1 signal.

For the first 0.1 inch of check travel, the Sync #1 signal developed in the sorter control unit generates the signal #1 Reset (True). The signal #1 Reset is applied through an OR gate 178 to the reset terminal "K" of the flip-flop circuit 177 to insure that it is in its reset state. The flip-flop circuit 177 should be in its reset state caused by the reading of the last Q3 symbol on the previous check. After the termination of the Sync #1 signal and #1 Reset, the signals $t_1$ and $t_2$ (both developed in the sorter control unit) are brought true, and, on the reading of the first Q1 symbol, the flip-flop circuit 177 is caused to be set. This setting of the flip-flop circuit 177 provides an identification of the first fixed field on the check 32 and is accomplished in the following manner. On the reading of the first Q1 symbol, the T character decision flip-flop circuit 93 (FIG. 4) is in its set state, and the F flip-flop circuit 58 (FIG. 3) is in its set state. The signals T and F, both true, are applied to an AND gate 179, whose output is coupled via an inverter 180 to three OR gates 181 to 183. The OR gate 181 also receives the signals $t_1'$ and E, both false, which are developed in the sorter control unit and by the E flip-flop circuit 57 (FIG. 3) respectively. The output of the OR gate 181 is coupled to an AND gate 184, whose output is in turn coupled via an inverter 185 to the "J" terminal of the S flip-flop circuit 177, causing the setting thereof. After 4,096 milliseconds of check reading, which is the duration of the signal $t_1$ and the first fixed field, the S flip-flop circuit 177 is reset in the following manner. Upon the termination of the signal $t_1$, the OR gate 183 develops an output which is applied to an AND gate 186. The output of the AND gate 186 is then coupled via an inverter 187 and the OR gate 178 to the reset terminal "K" of the S flip-flop circuit 177, causing the resetting thereof. The S flip-flop circuit 177 then remains in its reset state until the $t_2$ signal goes false after 12.280 milliseconds of check travel and the first Q3 symbol of the second fixed field is read. The S flip-flop circuit 177 is set for the second time when the signals $t_2$ and D, both false, are applied to the OR gate 182. The signal D is derived from the "0" output terminal of the D flip-flop circuit 56, which is set upon reading of the first Q3 symbol. The output of the OR gate 182 is applied via the AND gate 184 and the inverter 185 to the "J" terminal of the S flip-flop circuit 177 to cause the setting thereof. Upon the reading of the second Q3 symbol, which closes the last fixed field, the S flip-flop circuit 177 is reset for the final time in the following manner. The signals $t_2$ and D, both false, are again applied to the OR gate 182. The output of the OR gate 182 is applied via the AND gate 186, the inverter 187, and the OR gate 178 to the "K" terminal of the flip-flop circuit 177 to cause the resetting thereof.

The function S, representing the output of the S flip-flop circuit 177 (FIG. 3) and indicating the reading of a fixed field, is used with timing information to determine whether the distance between the characters on a check 32 in a fixed field exceeds 0.135 inch, which distance is equivalent to a time interval of 418 microseconds at a check travel speed past the transducer 31 of 324 inches per second. The logic provided for this error detection termed maximum time fixed field ($E_F$) is:

$E_F=SH'P1, P2, P3', P4', P5', P6', P7$, where
$S$=fixed field (flip-flop circuit 177, FIG. 3)
$H$=sample pulse inhibit flip-flop circuit 81 (FIG. 4),
$P1$ to $P7$=404–408 microseconds (counter 83, FIGS. 5 and 33*o*).

The signal $E_F$ (output of the inverter 175, FIG. 4) goes true during a fixed field (S) if H has not been set by 424 microseconds, as measured from the time H was set from the last character read. The 424-microsecond interval corresponds to the time period of the X2 one-shot circuit 98 (FIG. 4) plus the count of 404 microseconds from the counter 83 (FIG. 5). The signal $E_F$ is applied to the "J" terminal of the G flip-flop circuit 59 (FIG. 3), causing the setting thereof, which, in turn, indicates an error condition to the sorter control unit for the anticipated character which was read late or not read at all.

Accordingly, the S flip-flop circuit 177 (FIG. 3) is used to detect errors in spacing, the missing of characters, or the mistriggering on characters in the Amount and Transit Routing Fields. The clock circuit 96 (FIG. 5), which drives the counter 83, provides for accurate timing between the leading edge of characters, making possible the detection of maximum spacing errors in these fixed fields.

The character presence time is defined as the time from the setting of the H flip-flop circuit 81 (FIG. 4) to the development of the character clear signal (output of the inverter 144, FIG. 4) and is set at 340 microseconds by means of the program plugboard 143. A character applied to the delay line 38 results in the setting of the H flip-flop circuit 81 (FIG. 4), the stopping of the counter 83 (FIG. 5), the clearing or resetting of the counter 83 during the output (X2) of the one-shot circuit 98 (FIG. 4), the restarting of the counter 83 at the end of the output of the one-shot circuit 98 when the L flip-flop circuit 73 is set. The counter 83 continues to count until the reading of another character indicated by the setting of the H flip-flop 81. When the counter 83 has started running after the setting of the flip-flop circuit 81 (FIG. 4), it continues to count until some time after the first character has been read and the next character is just about to be read. The minimum spacing between characters is determined in the following manner. The OR gate 145 (FIG. 4) is provided to determine the end of the character presence time. The count which is set up in the OR gate 145 determines to within four microseconds the duration of time that the clock circuit 96 (FIG. 5) is operating until the H flip-flop circuit 81 (FIG. 4) is reset by the clear signal. The character clear signal (output of the inverter 144, FIG. 4) is coupled to the character clear driver 147 (FIG. 4). The output of the character clear driver 147 (clear signal) causes the resetting of the flip-flop circuits 53 to 58 (FIG. 3) and the resetting of the flip-flop circuits 81, 93, and 116 (FIG. 4). The counter 83 continues to count, since the output (false) of the flip-flop circuit 81, when reset, is applied to the OR gate 91 (FIG. 5), causing it to allow signals from the clock circuit 96 to be applied through the OR gate 95 to the counter 83. The character presence time can be adjusted to four microseconds, which allows the character reader to eliminate effects of extraneous ink following a character or extraneous ink far enough ahead of a succeeding character read. This precise adjustment of the character presence time is used to disable any triggering of the system upon the extraneous ink or until such time as the succeeding character should be read.

Twenty-four indicators 67 are provided for the character reader. Sixteen indicators 67 (FIG. 2) are provided for the character output channels from the summing amplifier and peak detector units 49 to 52, another is provided for the internal multiple read signal output from the multiple read and no detection system 130 (FIG. 7), another is provided for the maximum time fixed field error condition $E_F$ developed at the output of the inverter 175 (FIG. 4), another is provided for the late character decision error condition $E_c$ developed at the output of the inverter 174 (FIG. 4), and four others are provided (not shown) in association with the outputs of the flip-flop circuits 73, 81, 93, and 116 (FIG. 4). The indicators 67 are so arranged that, upon the occurrence of a hold command signal from the sorter control unit, an operational display of them will be effected, and no further change in them will occur while a particular check is being read. The hold command signal is applied from the sorter control unit over a conductor 191 (FIG. 4) via an inverter 192 to the indicators 67. When the hold command conductor 191 goes thru, it causes a threshold circuit associated with a flip-flop circuit associated with each of the indicators 67 to be changed, making it impossible to set these indicators in response to any of the remaining characters on a check. At the same time, the output of the inverter 192 is applied to an AND gate 193 along with the output of the OR gate 146. The output of the AND gate 193 is applied via an inverter 194 to an indicator reset driver 195, whose output, called indicator reset, is coupled to the flip-flop circuit associated with each of the indicators 67. Accordingly, each of the indicators 67 is operated by its associated flip-flop circuit. Once an indicator 67 is lit or set, it remains so until it is reset. Normally, the indicators 67 are reset after each character is read in response to the output of the driver 195 (indicator reset signal) in the following manner. Indicator Reset$=I_R=IH'(C_c+R1)$, where $I_H$=Indicator Hold,
$C_C$=Character Clear, and
$R1$=Reset #1.

When the Hold Command conductor 191 from the sorter control unit goes true, indicator hold goes false, and indicator reset is inhibited. The indicators 67 are held set until the Hold Command is no longer present, which event would occur at the time that the leading edge of the succeeding check is detected by the sorter control unit. In response to this leading edge of the succeeding check, the sorter control unit would develop the Sync #1 signal, which, in turn, is used to develop the Reset #1 signal. The indicator hold signal also inhibits any successive signals derived from reading other characters on a check from causing the indicators 67 to be set, as mentioned previously. In this manner, the indicators 67 remain lit until the next document is read.

The data register comprising the flip-flop circuits 53 to 58 (FIG. 3) utilizes a two-out-of-six bit binary code. Thus, for each character decision entered into this data register from the summing amplifier and peak detector units 49 to 52 (FIG. 2), two of the six flip-flop circuits 53 to 58 are set. If more than two of the flip-flop circuits 53 to 58 are set, a multiple read (MR) condition exists, and, if less than two are set, a no read (NRO) condition is indicated. If the character decision resulting from a first or a second sample operation causes more than two of the flip-flop circuits 53 to 58 to be set, the multiple read condition is indicated at the output of the system 130 (FIG. 7), and, if the character decision produced as a result of a second sample operation does not agree with the character decision produced by a first sample operation, the multiple read condition is also indicated at the output of the system 130. A no read (NR) condition will also be indicated at the output of the system 130. A no read (NR) condition can result from weak printing of characters on a check or component failure in the character reader.

The multiple read and no read detection system 130 (FIG. 7) receives as inputs the outputs from the "0" output terminals of the six flip-flop circuits 53 to 58 of the data register (FIG. 3) and detects the MR and NR conditions. Basically, the system 130 comprises two resistor adder networks, the output of each being coupled to a level detector circuit. The thresholds of the level detector circuits are set so that the MR output of the system 130 changes from false to true if three or more of the flip-flop circuits 53 to 58 are set. The NR' output of the system 130 changes from true to false if less than two of the flip-flop circuits 53 to 58 is set.

An error condition causes the error conductor 155 (FIG. 7) to go true at the error clock time indicated by the output of the inverter 160 (FIG. 7). However, because the MR condition is less serious than an error condition, the MR conductor 171 (FIG. 7) separately indicates this specific condition to the sorter control unit. The no read (NR) condition causes only the error conductor 155 to go true.

Referring now to FIG. 2 again, a first pass control is provided in the character reader to exert control over the amplitude of the sample pulse applied to the detectors in the summing amplifier and peak detector units 49 to 52 and the minimum level of this noise peak detector (N). A first pass switch is located on the sorting apparatus, and, when it is in the ON position, a signal applied to the peak detector over the conductor 196 (FIG. 4) via an emitter follower 197 causes the amplitude of the sample pulse applied to the peak detectors via the sample pulse driver 115 and the conductor 13 to be increased to a level where a cross-condition threshold is changed from 87 percent to 81 percent. Accordingly, the response of the peak detectors to outputs from the resistor matrix units 39 to 41 resulting from character waveforms which resemble a character other than the one which produced it is increased by a factor of six percent. As a result, the character reader will be more sensitive to multiple read (MR) conditions when the first pass control is used. Also, by increasing the minimum level of the noise peak detector (N) in the unit 51 (FIG. 2), the character reader will be able to reject marginally weak printing on a check on the first pass.

Referring now to FIG. 7 again, a trigger reset circuit 198 is provided to develop the trigger reset signal which is applied over the conductor 20 to the comparator 78 (FIG. 4). The trigger reset circuit comprises OR gates 200 to 202, an AND gate 203, and inverters 129, 204, and 205. The unblanking signal UBK developed in the sorter control unit is applied via a test switch 206 and the inverter 205 to the OR gates 200 to 202. The "1" output terminal of the flip-flop circuit 93 (FIG. 4) is applied via the inverter 204 to the OR gate 202, while the "1" output terminals of the P6 and P7 flip-flop circuits 89 and 90 (FIG. 5) are each applied to the OR gates 200 and 201, respectively.

The trigger reset signal is applied to the variable threshold of the timing circuits of the character reader; that is, to the comparator 78 (FIG. 4). As described heretofore, a variable threshold is provided to avoid triggering on extraneous ink in front of a character being read. The variable threshold is important, since the peak value of information preceding or succeeding a character in the delay line 38 is stored on a storage capacitor.

The development of the trigger reset signal by the trigger reset circuit 198 (FIG. 7) is such that a storage capacitor of the threshold comparator 78 (FIG. 4) is allowed to charge without disturbance before the first character read is applied to it. After the first character decision has been made, as indicated by the setting of the T flip-flop circuit 93 (FIG. 4), the trigger reset signal is changed to allow the discharge of the comparator 78 storage capacitor. After the end of reading of the first character and at a suitable time before the beginning of the second character, the trigger reset signal changes back to its original level, which again allows the compartor 78 storage capacitor to charge on the information corresponding to the second character read. The trigger reset circuit 198 responds to the beginning of a character and causes discharge of the comparator 78 storage capacitor after the character decision relative to such character has been made.

Referring again to FIG. 6, a counter 210 is provided to develop signals used in the character reader and the sorter control unit. The counter 210 comprises the R1 to R13 flip-flop circuits 211 to 223 and the OR gates 224 to 236. Signals from the clock circuit 96 (FIG. 5) are applied via a conductor 18 to an OR gate 237. The counter 210 is started when a start-stop signal developed in the sorter control unit is also applied via SSL line to the OR gate 237. The output of the OR gate 237 is coupled to the R1 flop-flop circuit 211 and the OR gate 224 via an inverter 238. The counter 210 is reset by the Sync #1 signal and the output of the clock circuit 96, which is applied to the reset driver 126 via the AND gate 127 and the inverter 128. Various outputs of the counter 210 which are utilized in the sorter control unit are shown in FIG. 7. The outputs from the flip-flop circuits 220 to 222 are applied to an OR gate 239, whose output is designated $t_2$K. The outputs from the flip-flop circuits 221 and 223 are applied to an OR gate 240, whose output is designated UBK1. The outputs from the flip-flop circuits 221 to 223 are applied to an OR gate 241, whose output is designated UBK2, and the outputs from the flip-flop circuits 216, 218, and 219 to 223 are applied to an OR gate 242, whose output is designated UBK3. Accordingly, the counter 210 is used to develop signals which are applied to the sorter control unit to develop the unblanking signal UBK and the $t1$, $t1'$, $t2$, and $t2'$ signals. The unblanking signal UBK is applied to the inverter 205 (FIG. 7), whose output UBK′ is then applied to the OR gates 200 to 202 (FIG. 7) and the OR gates 72 and 76 (FIG. 4). The $t1$ and $t2'$ signals are applied to the OR gate 183 (FIG. 3), and the $t1'$ and $t2$ signals are applied to the OR gates 181 and 182, respectively (FIG. 3).

Figure 9:
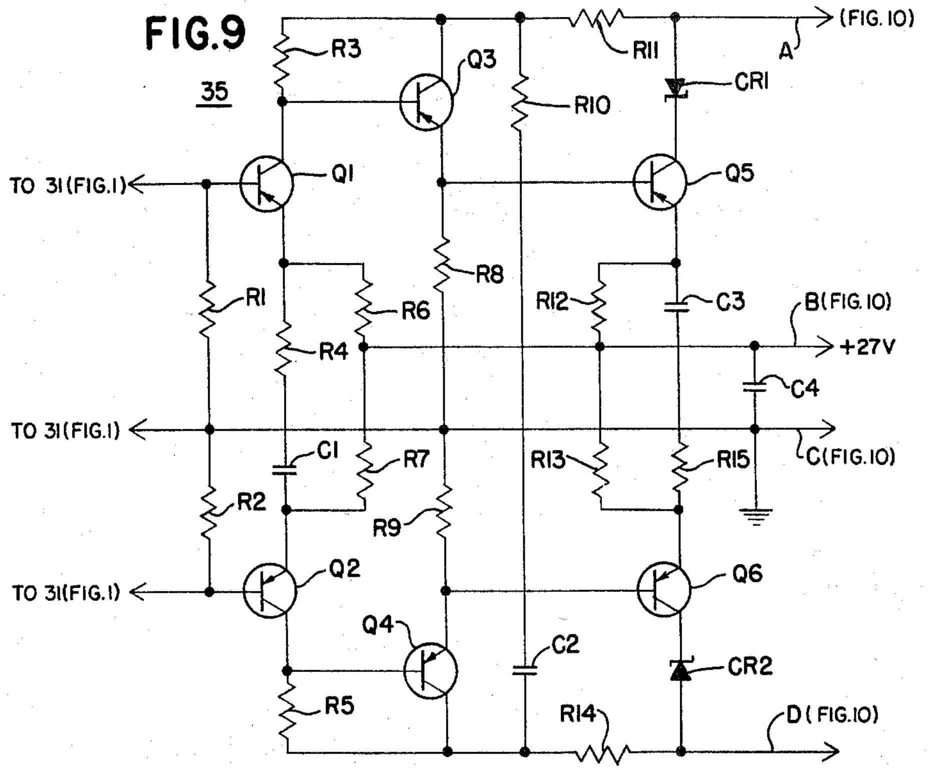
FIGURE 9 is the circuit diagram of the pre-amplifier shown in FIGURE 1.

The schematic circuit diagram for the preamplifier 35 (FIG. 1), which is a three-stage differential-type amplifier, is shown in FIG. 9. The input for the preamplifier 35 is directly coupled from the transducer 31 (FIG. 1). The signals developed in the transducer 31 vary between 0.25 and 10 millivolts, and the gain of the preamplifier 35 is held to approximately 75. The preamplifier 35 develops a push-pull output on the output lines A and D which is coupled to the character amplifier 36 (FIG. 1) by way of a two-conductor twisted double-shielded cable (not shown). The shields are insulated from one another, as the inner shield is coupled to ground and the outer shield serves as a supply voltage conductor. The input impedance from the winding 34 of the transducer 31 (FIG. 1) is in the order of 30K. The winding 34 is center-tapped to ground potential, and each outer leg is direct-coupled to the bases of the transistors Q1 and Q2. The transistors Q1 and Q2 are connected in the common or grounded emitter configuration. The instantaneous signal amplitude between each input leg of the transistors Q1 and Q2 and ground potential is opposite in polarity. The input signals of opposite polarity (differential mode) are amplified, and input signals of like polarity (common mode) are cancelled. The common mode signals are mostly in the form of noise contained in the input signal. The transistors Q1 and Q2 comprise a common emitter stage, the transistors Q3 and Q4 comprise an emitter follower stage, and the transistors Q5 and Q6 comprise a common emitter stage. The three stages are operated at low current and voltage to reduce noise. Current feedback is used in all stages of the preamplifier 35, and voltage feedback is used between the third stage collectors and the first stage collectors. The resistor capacitor combinations R4–C1 and R15–C3 provide for current feedback, while the resistors R11 and R14 provide for voltage feedback. The resistors R11 and R14 also provide negative bias to the second stages. The resistor-capacitor combination R10–C2 serves as a signal shunt path in order to allow more direct current and less feedback signal to be coupled to the first stages. The Zener diodes CR1 and CR2 limit the collector voltage at the transistors Q5 and Q6, lessening noise effects. The Zener diodes CR1 and CR2 act as a very low impedance signal path. The push-pull signal from the anode of each of the Zener diodes CR1 and CR2 is directly coupled to the primary winding of a center-tapped transformer T1 (FIG. 10). A sixteen-volt potential from the center tap of the transformer T1 is fed back (via C) to the preamplifier 35 for use as a bias supply. A +27-volt potential appears on conductor B of the preamplifier 35, and the capacitor C4 provides additional filtering for the positive voltage.

The schematic circuit diagram for the character amplifier 36 (FIG. 1) is shown in FIGS. 10 and 11. The signal on the conductors A and B of the preamplifier 35 is applied to the primary winding of the transformer T1. A potential of −16 volts is developed at the center tap of the transformer T1 and the collector of the transistor Q8 through the use of the Zener diode CR3. The resistor R26 shunts the secondary winding of the transformer T1 to provide for input matching to the base of the transistor Q8. The transistor Q8 is connected to the emitter follower configuration to provide a low impedance to the transistor Q2. The transistors Q2 and Q1 are connected in the common emitter and emitter follower configurations, respectively. The gain of the transistor Q1 stage is determined by the ratio of R25 to R1, and is approximately 5 at maximum. This gain is controlled by a feedback loop between the emitter of the transistor Q1 and the base of the transistor Q2 and comprises the capacitor C2 and the resistors R1 and R3. The output of the transistor Q1 stage is increased as the resistance effect of the resistor R1 is increased. The D.C. bias is set by the resistors R3, R1, R9, and R22. Decoupling capacitors C3 and C8 connected to ground are provided between bias voltage dividing resistors R5–R23 and R22–R9, respectively. The transistor Q3 (FIG. 11) is connected in the common emitter configuration and is a high voltage gain amplifier stage. The transistor Q3 stage drives a complementary amplifier stage comprising the transistors Q4 and Q5, which allows a large output voltage swing to be obtained from this stage. The output of the character amplifier is obtained at the junction of the resistors R16 and R17. A multiple feedback loop couples a portion of the output signal back to the base of the transistor Q3. The roll-off (attenuation) and gain characteristics of the Q3 and Q4, Q5 transistor stages is determined by the multiple feedback loop. With feedback, the mid-frequency gain of the transistor Q3, transistor Q4 and Q5 stages is approximately 20. High-frequency roll-off is determined by the capacitor C10 and the resistor R15, since the reactance of the capacitor C10 decreases as the signal frequency increases. The capacitor C4 is provided for low-frequency roll-off. At the lower frequencies, the reactance of the capacitor C4 increases, allowing more signal to be fed into the resistor R12 and therefore to the base of the transistor Q3.

A two-position Test-Normal switch 280 (FIGS. 1 and 11) is provided in the output circuit of the character amplifier 36. In the normal position, the character amplifier output is applied via the switch 280, the capacitor C1, and the resistor R2 to the delay line 38. In the test position, a test signal from a 12.5 kc. phase shift oscillator 281 is applied to the delay line 38 in the same manner. The resistor R2 determines the output impedance of the character amplifier 35 and the oscillator 281. The phase shift oscillator 281 is a summing amplifier comprising the transistors Q6 and Q7. Feedback from the junction of the diodes CR1 and CR2 is coupled to the base of the transistor Q7 through an R-C phase-shifting network, which presents a 180-degree phase shift at 12.5 kc. The phase-shifting network comprises the capacitors C11 to C14 and the resistors R33 to R36. The output of the oscillator 281 is a 10-volt peak-to-peak signal referenced to −5 volts.

The character reader contains nine pairs of delay line amplifier circuits, one pair being coupled to each of the taps T1 to T8 and T11 (FIG. 1) of the delay line 38. One pair of the delay line amplifier circuits each comprises the combination of the emitter follower 44, the amplifier 42, the emitter follower 45, the amplifier 43, and the emitter follower 46 (FIG. 1). Accordingly, the output of the first amplifier 42 is coupled to the input of the second amplifier 43. The gain of the first amplifier 42 is adjustable from 3.2 to 4.0, while the gain of the second amplifier 43 is unity. The second amplifier 43 is used for phase inversion. The resistor matrix units 39 to 41 provide the output load for each of the delay line amplifier circuits. FIG. 12 is the schematic diagram showing one of the pairs of delay line amplifier circuits. The emitter follower 44 (FIG. 1) comprises the transistor Q14 and is used to change the impedance of the delay line 38 to match the input impedance of the amplifier 42. The amplifier 42 comprises two stages. The first stage is a high-gain voltage amplifier driver comprising the transistor Q5, which is D.C. coupled to an emitter follower type complementary output second state operating in Class B and comprising the transistors Q6 and Q11. Feedback is employed around both stages in order to reduce distortion and gain variation and to insure the D.C. stability of all operating points.

The operation of the second stage, comprising the transistors Q6 and Q11, is as follows. In the quiescent state, the NPN transistor Q6 is non-conducting, so that it is reverse-biased and the PNP transistor Q11 is forward-biased. In order to achieve maximum swing before clipping occurs, the junction of the resistors R12 and R13 is biased to approximately −20 volts in the quiescent state of the amplifier stage. This level is set by the value of the resistors R28 and R11. Neglecting the small voltage drop across the resistor R12, the bases of the transistors Q6 and Q11 will be more negative than the voltage at the junction of the resistors R12 and R13 by the base-to-emitter voltage of the transistor Q11. The transistor Q6 is non-conducting because its reverse bias is approximately equal to the forward drop across the base-emitter junction of the transistor Q11. Therefore, as long as the transistor Q11 is forward-biased, the transistor Q6 is cut off. If a sine wave signal is applied to the bases of the transistors Q6 and Q11, the transistor Q11 will deliver current to the load of this stage during the negative half-cycle, while, during the positive half-cycle, the transistor Q6 will be forward-biased. Since the transistors Q6 and Q11 conduct alternately, the operation of this stage is Class B, and the flow or phase angle is 180 angular degrees. However, load current will flow during both half-cycles and will equal the sum of the currents alternately delivered by each of the transistors Q6 and Q11 operating as emitter followers. The driver amplifier stage (transistor Q5) delivers approximately the same voltage swing as the output voltage swing of the second stage (transistors Q6 and Q11), as the voltage gain of the second stage is approximately one. The overall gain requirement of the amplifier is approximately 3.56. Since the voltage gain of the driver stage (transistor Q5) is high, a large amount of negative feedback is utilized. The total amplifier gain (transistors Q5, Q6, and Q11) is equal to the ratio of the resistor R11 and the resistors R1 and R4, where the resistor R11 is the negative feedback resistor. The capacitor C6, in parallel with the resistor R11, is used for high-frequency roll-off or attenuation. The capacitor C7 is used to couple the output of the first amplifier circuit (emitter follower 45, FIG. 1) to the second amplifier circuit (amplifier 43, emitter follower 46, FIG. 1). The second amplifier circuit comprises the transistors Q7, Q8, and Q12 and is similar to the first amplifier circuit except that no variable gain control is provided. The gain of the second amplifier circuit is held to unity by the ratio of the resistors R30 to R14.

The resistor matrix units 39 to 41 (FIG. 1) comprise sixteen resistor matrices (FIGS. 35 to 50) provided to separately identify the symbols 0 to 9, the four Q symbols Q1 to Q4, an error character, and a noise character. Thus, the resistor matrix shown in FIG. 35 is designed with a summing function determined by the waveshape derived from the delay line 38 when the number "0" is being scanned by the head 31, and the design of each of the remaining resistor matrices shown in FIGS. 36 to 50 is similarly derived from the delay line 38 when the respective numbers "1" to "9," the four Q symbols Q1 to Q4, the error character, and the noise character are being scanned by the head 31.

In FIGS. 35 to 50, the resistors or multiplying elements at the top thereof are coupled to certain of the delay line taps T1 to T8 and T11 through the delay line amplifiers 42 and 43 (FIG. 1), while the resistors or multiplying elements at the bottom thereof are coupled to certain of the delay line taps T1 to T8 and T11 through only one of the delay line amplifiers 42. Accordingly, the voltages sampled from the delay line taps identified as T1′ to T8′ and T11′ are of inverse polarity to those actually in the delay line 38.

Figure 35:
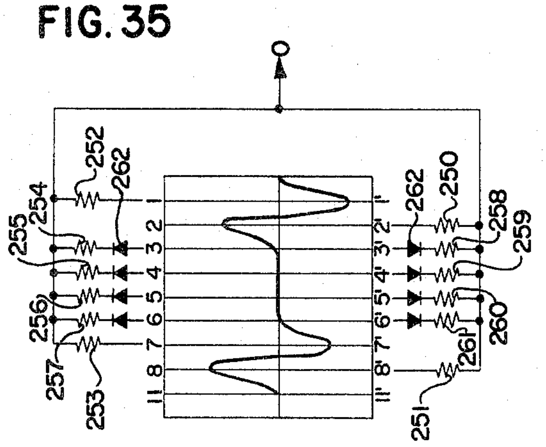
Figure 42:
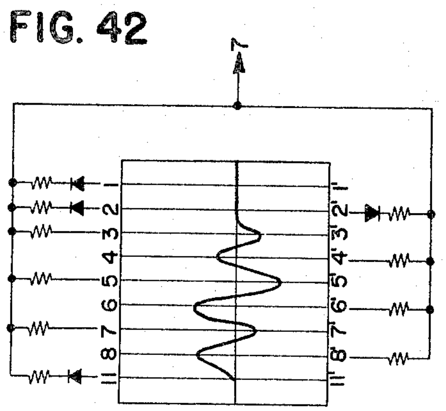
Figure 44:
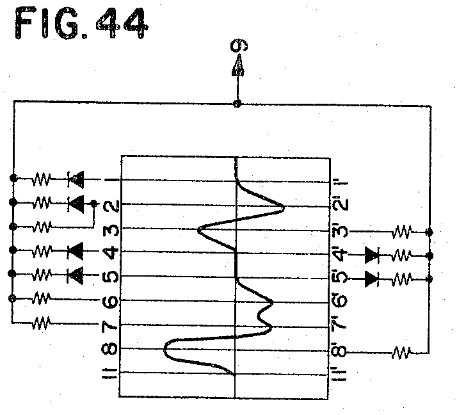
Figure 41:
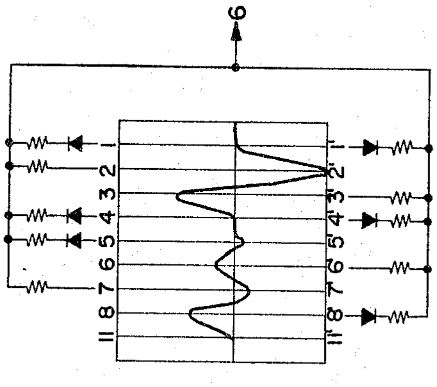
Figure 43:
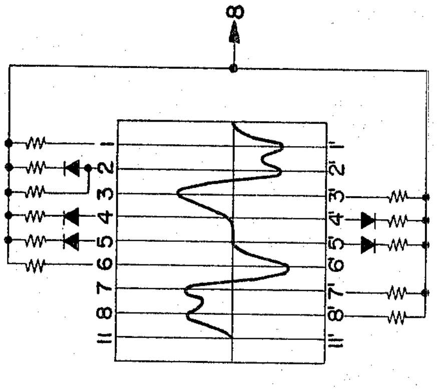
Figure 40:
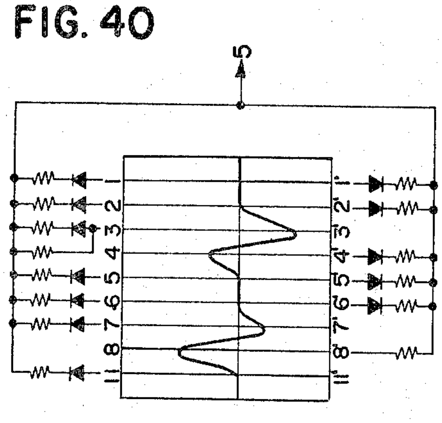
Figure 47:
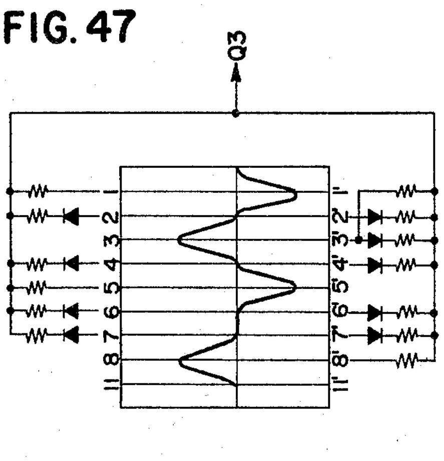
Figure 49:
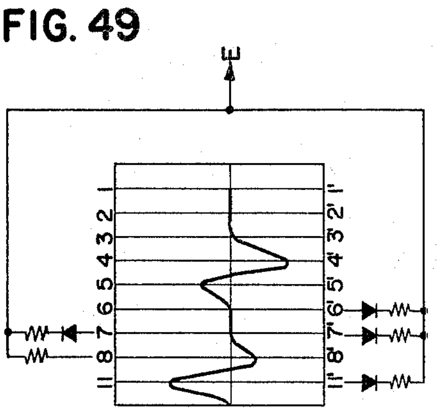
Figure 46:
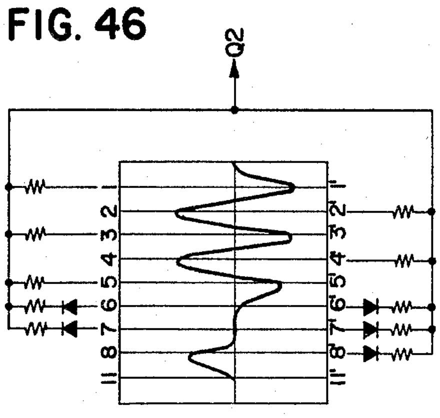
Figure 48:
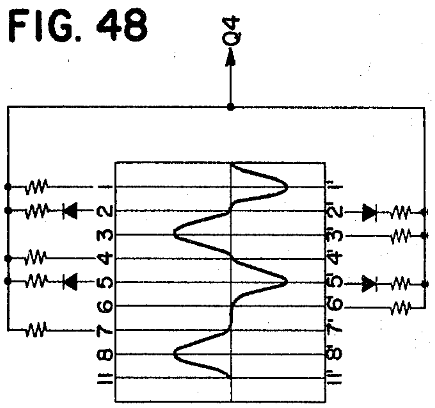
Figure 45:
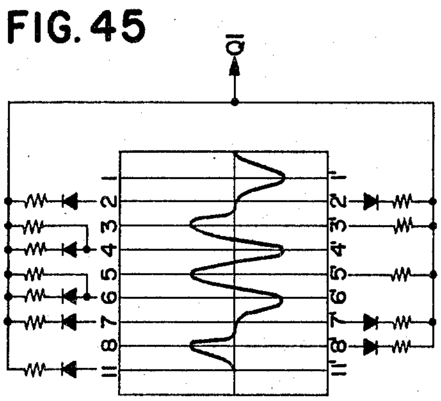

FIGS. 8 and 35 illustrate the "0" character waveform in its reference position in the delay line 38 for detection by the "0" resistor matrix and the "0" summing amplifier and peak detector circuit. Positive waveform peaks at sampling points 2 and 8 of the delay line 38 are coupled through the delay line amplifiers 42 (FIG. 1) to the resistors 250 and 251, respectively, to cause current to flow from the "0" summing amplifier and peak detector circuit. Negative waveform peaks at sampling points 1 and 7 of the delay line 38 are coupled through the delay line amplifiers 42 and 43 (FIG. 1) to the resistors 252 and 253, respectively, to also cause current to flow from the "0" summing amplifier and peak detector circuit. Accordingly, when the "0" character waveform is in its reference position in the delay line 38, the "0" resistor matrix provides, at the input to its associated summing amplifier and peak detector circuit, a larger negative voltage than all the other fifteen resistor matrices provide to their associated summing amplifier and peak detector circuits.

In FIGS. 8 and 35, the "0" resistor matrix also comprises a plurality of resistors 254 to 261, each of which is coupled through a diode 262 to the output of one of the delay line amplifiers 42 or 43. The diodes 262 are all poled in such a manner that positive voltage outputs of the delay line amplifiers 42 or 43 will cause them to conduct and cause current to flow through the associated resistors 254 to 261 to the "0" summing amplifier and peak detector circuit. This latter flow of current is opposite to that which flows from the "0" summing amplifier and peak detector circuit in response to detection of the positive and negative peaks of the "0" character waveform. Accordingly, with one or more of the diodes 262 conducting, a lower negative voltage than would otherwise exist is present at the input of the "0" summing amplifier and peak detector circuit. In this manner, if the "0" resistor matrix receives some character waveform other than the "0" character waveform, such as the "1" character waveform shown in FIG. 8, the positive and negative waveform peaks would occur at different tap points of the delay line 38 other than the tap points T1, T2, T7, and T8, and positive voltages from the line amplifiers 42 and 43 which are coupled to other tap points of the delay line 38 would cause their associated diodes 262 to conduct, which in turn would cause the output of the "0" resistor matrix to go positive. For example, in FIG. 8, with the "1" character waveform in its reference position in the delay line 38, the portion of the "1" character waveform sampled at taps T4 and T5 of the delay line 38 would cause the diodes 262 associated with the resistors 259 and 260 to conduct, and current would flow through these resistors to the "0" summing amplifier and peak detector circuit, presenting a positive voltage signal at the input of this circuit. At the same time, very little current would flow through the resistors 250, 252, and 253, since the portions of the "1" character waveform sampled at tap points T1, T2, and T7 are at zero reference voltage, and the current through the resistor 251 will be in a direction out of the "0" summing amplifier and peak detector circuit, causing the positive voltage input of this circuit to be lowered somewhat. It is apparent from the above description of the "0" resistor matrix that voltages obtained from the taps or sampling points of the delay line 38 that do not correspond to the "0" character waveshape will lessen the maximum negative output of the "0" resistor matrix. The other fifteen resistor matrices shown in FIGS. 36 to 50 also are provided with additional resistors, which are controlled by diodes to cause these additional resistors to conduct current from their associated summing amplifier and peak detector circuits only in response to positive voltages from the delay line amplifiers 42 and 43. Accordingly, when a character waveform occupies a reference position in the delay line 38 and signal samples thereof are delivered to a resistor matrix that corresponds to that character waveform, the additional resistors and their associated diodes 262 are ineffective to lessen the negative output of the corresponding resistor matrix, but one or more of the additional resistors and their associated diodes 262 in the other resistor matrices will be effective to lessen the negative output of these other resistor matrices, so that the differential between the character-identifying output of the one resistor matrix corresponding to the character waveform in the delay line 38 and the other resistor matrices is increased.

In FIG. 13 is shown the schematic circuit diagram of a summing amplifier and peak detector circuit which is used in the units 49 to 52 (FIG. 2). Sixteen of these circuits are used in the character reader, one circuit for each possible character read by the character reader. Each of the units 49 to 52 (FIG. 2) compises four of these summing amplifier and peak detector circuits. The input to these circuits comes from the resistor matrix units 39 to 41 (FIG. 1). The resistor matrix units 39 to 41 sum the voltages appearing at the taps T1 to T8 and T11 of the delay line 38 in the manner previously described, so that one of the individual outputs of the resistor matrix units 39 to 41 produces a higher voltage than the other individual outputs for a specific character read. The summing amplifier and peak detector circuits develop a true or false output that is applied via the OR gates 60 to 66 (FIG. 2) to operate the A to G flip-flop circuits 53 to 59 (FIG. 3). The A to F flip-flop circuits 53 to 58 convert the detected characters into a two-out-of-six bit code.

To accomplish peak detection, the positive peak value of a character wave form is detected by the capacitor C12 charging. Each summing amplifier and peak detector circuit is strobed by a sample pulse applied through the resistor R25 to the emitter of the transistor Q13, and the summing amplifier and peak detector circuit with the highest peak value switches its output from false to true. Between the reading of characters, a reset pulse is applied to the cathode of the diode CR21 to cause discharge of the peak-detecting capacitor C12, preparing it for the next cycle. The sample pulse is negative-going (0 to −20 volts) and has a duration of six microseconds. The reset pulse (−20 volts) has a variable duration between characters and has a non-reset interval during reading of characters at 0 volts.

The signals from a resistor matrix circuit in the units 49 to 52 are applied to a common emitter stage comprising the transistor Q11. Positive input signals are clipped by the transistor Q11 stage, and negative input pulse signals are amplified, inverted, and then applied to the base of the transistor Q12, which is connected in the emitter follower configuration. The positive clipping results from a biasing level between the collector and the emitter of the transistor Q11, which is approximately one volt below −20 volts. The bias level at the junction of the diodes CR27 and CR33 is held uniform by adjustment at the resistor R22. The resistor R22 is coupled to a plugboard (not shown) which is used to select voltages of −8, −20, 0, and +12. The signal at the junction of the diodes CR27 and CR33 is applied to the base of the transistor Q11 via the capacitor C8 and the resistor R33. The capacitor C8 provides high-frenquency roll-off. The diodes CR26 and CR33 prevent the transistor Q11 from saturating.

The diode CR26 also provides that the input impedance at the transistor Q11 is equal for both positive and negative going input signals. The input impedance is kept constant to prevent shifting of D.C. levels in the resistor matrices. For negative-going input signals, the resistor R33 appears to the input as an impedance-resistor R33 divided by the open-loop-gain of the amplifier, which is in the order of 1000. Input impedance for negative-going signals is then ten ohms, disregarding the transistor Q11 input impedance, which is considerably higher. For positive-going input signals, the open-loop-gain falls off as signal level increases. Input impedance would then increase, if it were not for the diode CR26, which begins to conduct. The diode CR26 conducts current into the output stage impedance of the transistor Q12, which is approximately ten ohms. The capacitor C11, connected between ground and the base of the transistor Q12, prevents high-frequency oscillations.

While characters are being read, the reset potential at the diode CR21 is held at ground potential by the reset driver 112 (FIG. 4). A positive signal at the output of the transistor Q12 is applied through the gating diode CR27 and charges the storage capacitor C12. If this positive signal momentarily decreases in amplitude, the diode CR27 becomes reverse-biased, and the charge on the storage capacitor C12 will be retained. The capacitor C12 therefore charges to the peak value of the character waveform. A sampling transistor Q13 is held inoperative until a sample strobe pulse appears at the resistor R25. The presence of the six-microsecond negative-going sample pulse developed by the sample driver 115 (FIG. 4) allows the transistor Q13 to conduct, provided that the capacitor C12 is sufficiently charged. Only the peak detector circuit including the capacitor C12 and the transistor Q13 associated with the character being read will be operated. After the termination of the sampling operation, the reset potential at the cathode of the diode CR21 drops to —20 volts for a period of one hundred microseconds. The storage capacitor 21 then discharges during the interval between characters and remains quiescent until the next character waveform enters the delay line 38 and a positive-going waveform appears at the storage capacitor C12 via the diode CR27. When the transistor Q13 is conducting the transistor Q14 is cut off. The diodes CR34 and CR35 limit the voltage excursion at the base of the transistor Q15. Accordingly, the transistor Q15 now conducts, and the output signals at the cathodes of the diodes CR24 and CR25 approach ground (true). The appropriate flip-flop circuits 53 to 59 (FIG. 3) are set to indicate the character being read. The diode CR36 clamps the stable state of the output to —8 volts.

The schematic circuit diagram of the J-K flip-flop circuits used in the character reader in shown in FIG. 14. The J-K flip-flop circuit will always change state on application of identical set and reset input signals. The J-K flip-flop circuit comprises the four transistors Q13 to Q16.

Assume that the J-K flip-flop circuit is in its set state, with the output signal at A ("1" output) true (0 volts) and the output signal at B ("0" output) false (—8 volts). The voltage at the anodes of the diodes CR15 and CR16 is approximately —2 volts, due to the voltage division through the resistors R53 and R39 and the resistors R56 and R40. The voltage at the base of the transistor Q16 is approximately —0.6 volt. The transistors Q14, Q15, and Q16 are conducting, and the transistor Q13 is non-conducting. The resistor R28 supplies sufficient base current to the transistor Q16 to keep it in saturation; however, the transistor Q15 will never saturate, since the collector-to-emitter voltage drop of the transistor Q16 holds the collector-to-base junction or diode of the transistor Q15 reverse-biased. The circuit configuration of the transistors Q15 and Q16 (Q13 and Q14) allows large load currents while requiring minimal input current and base current.

The resistor R32 supplies base current to the transistor Q14 to hold it conducting. The voltage at the emitter of the transistor Q14 is approximately +2.0 volts, thus holding the transistor Q13 non-conducting. The collector current of the transistor Q14 is not sufficient to reverse-bias the diode CR7 and pull the "0" output (—8 volts) out of clamp when the transistor Q13 is made non-conducting. The diodes CR20 and CR24 provide cross-gating to assume that switching takes place in the event of identical set and reset input signals.

A true signal (signal rise from —8 to 0 volts) at the "J" or set input has no effect on the state of the flip-flop circuit, since the input is already grounded through the diode CR24. However, a true signal at the "K" or reset input will be coupled via the capacitor C16 and the diode CR16 to the base of the transistor Q16, causing it to conduct less. The resistors R40 and R56, together with the diode CR16, determine the noise threshold voltage which must be overcome before the current making the transistor Q16 less conducting is applied thereto. When the transistor Q16 conducts less, the transistor Q15 is made non-conducting. Current is then sent to the transistor Q14 via the capacitor C8, causing it to conduct more. When the transistor Q14 conducts more, the transistor Q13 is made conducting.

The schematic circuit diagram of inverter circuits used in the character reader is shown in FIG. 15. The inverter circuit comprises a single PNP transistor Q6 common emitter stage, whose output is clamped at —8 volts (false) when the transistor Q6 is non-conducting. When the transistor Q6 is conducting, the output signal at point A is equal to the zero volt (true) emitter potential. A —8-volt (false) input signal causes the transistor Q6 to conduct. Each inverter circuit is provided with an input circuit including an AND gate having one or more inputs. The AND gate in FIG. 15 comprises the diodes CR16 and CR17 and the resistors R44 and R45. Each inverter circuit also is provided with an output circuit including one or more OR diodes (diode CR39 in FIG. 15). The resistor R32-capacitor C6 network in the base circuit of the transistor Q6 provides a short fall time when the transistor Q6 is cut off. When the input signal to the transistor Q6 is switched from zero to —8 volts, its output signal approaches 0 volt, and approximately 8 milliamperes per output OR diode (diode CR39) can be delivered to an external load.

The schematic circuit diagram for the sample pulse driver 115 (FIG. 4) is shown in FIG. 16. The sample pulse driver comprises a sample gate circuit including the transistor Q4, which is connected in the common emitter configuration, and a pass control circuit including the transistors Q5, Q6, and Q7. The transistors Q5 and Q6 are connected in the common emitter configuration, while the transistor Q7 is connected in the emitter follower configuration. The transistors Q5 and Q6 increase conduction in the Q4 and Q7 transistor stages on receiving a false (—8 volts) input (pass control) on conductor D from the sorter control unit. The resistor R16 is effectively placed in parallel with the resistor R2 in the collector circuit of the transistor Q4, and the resistor R20 is effectively placed in parallel with the resistor R8 in the base circuit of the transistor Q7.

The operation of the sample gate circuit (transistor Q4 stage) is as follows. The input on the conductor B is delivered from the six-microsecond one-shot circuit 154 (FIG. 4) and consists of pulses which vary from —8 volts (false) to 0 volt (true). These input pulses are false for thirty-four microseconds and true for six microseconds. When the input signal on conductor B (sample gate) is true, the base voltage of the transistor Q4 is approximately +0.7 volt, causing the transistor Q4 to be non-conducting. With the transistor Q4 non-conducting, the output voltage threshold of the transistor Q4 falls to some value between ground and —20 volts, depending upon the impedance presented by the peak detectors in the summing amplifier and peak detector units 49 to 52 (FIG. 2). When the input signal on conductor B is false, the voltage at the base of the transistor Q4 is negative, with a minimum base current (approximately 2.66 milliamperes), causing the transistor Q4 to become conducting. With the transistor Q4 conducting, the output voltage on conductor C rises to ground potential. The switching time of the transistor Q4 is shortened through the use of the capacitor C2.

The operation of the transistor Q6 of the pass control circuit is similar to the operation of the transistor Q4 stage. In addition, when the transistor Q6 is made non-conducting, its collector voltage falls until the diode CR3 is forward-biased. The worst-case voltage at the anode of the diode CR3 would result in a worst-case steady-state voltage of −25.8 volts at the base of the transistor Q5. However, the diode CR2 becomes forward-biased before the voltage of −25.8 volts can be reached at the base of the transistor Q5. The minimum voltage drop across the diode CR2 is approximately −0.58 volt, which is sufficient to cause the transistor Q5 to become non-conducting and to hold it in that state.

When the transistor Q6 is conducting, the output voltage at its collector is at ground, resulting in a worst-case steady-state voltage greater than −20 volts at the base of the transistor Q5. At this time, the diodes CR2 and CR3 are reverse-biased, and the transistor Q5 is made conducting with a minimum base current (approximately 0.8 milliampere).

When the pass control input on conductor D is false, the transistor Q6 conducts, grounding the resistor R20. The transistor Q7 conducts more, making the output on conductor A less negative. The output on conductor A is applied to the base of the transistor Q13 (FIG. 13) of the summing amplifier and peak detector units 49 to 52 (FIG. 2), causing a threshold at the base of the transistor Q13. With the transistor Q5 conducting, the resistors R16 and R2 are conducting in parallel. The sample pulse output on conductor C will now approach the −20 volt level, and so the character reader's sensitivity for detecting characters that cause the multiple read condition is increased. Accordingly, when the pass control is utilized, the character reader will reject more checks for the multiple read condition.

The schematic circuit diagram for the summing amplifier 68 (FIG. 4) is shown in FIG. 17. The summing amplifier 68 comprises the transistor Q2 common emitter stage, which is directly coupled to the transistor Q1 emitter follower stage. The summing amplifier 68 receives the composite peaks of the character waveform from the resistor matrix units 39 to 41 (FIG. 1). The positive-going output peaks are used by the timing circuit including the *A<B* comparator 69 (FIG. 4). In its quiescent state, the output on conductor A is at −20 volts. Positive-going input signals on conductor B are not amplified, while negative-going input signals cause the transistor Q2 to conduct less. The output on conductor A then goes positive along with the collector of the transistor Q2.

The gain of the summing amplifier 68 is controlled by feedback networks comprising the resistor R14 and the resistor R1 and the diode CR1. With a small input signal, the gain is equal to the resistor R14 divided by the input resistance. When the output voltage approaches +2 volts, the voltage at the junction of the resistor R1 and the resistor R15 goes more positive than −20 volts. The diode CR1 then conducts, and the gain then equals the resistor R14 in parallel with the resistor R1 divided by the input resistance. The feedback networks limit the emitter voltage of the transistor Q1 and prevent the saturation of this transistor.

The schematic circuit diagram for the reset driver 112 (FIG. 4) is shown in FIG. 18. The purpose of the reset driver 112 is to discharge the parallel network of sixteen R-C combinations (resistor R34, capacitor C12, FIG. 13) in the summing amplifier and peak detector circuits of the units 49 to 52 (FIG. 2). Each R-C combination forms a peak detector for the preceding summing amplifier (Q11, Q12, FIG. 13). When the input signals on the conductors A and B are true, the transistors Q16 and Q17 are non-conducting, and current from the resistor R48 flows to ground through the diode CR7. When either or both of the input signals on the conductors A and B are false, the change in current through the resistors R46 and R53 causes the transistor Q16 to conduct. When the transistor Q16 conducts, it supplies current to the base of the transistor Q17, causing it to conduct. With the transistor Q17 conducting, the potential on the output conductor 196 drops to −20 volts, causing the sixteen peak detector capacitors C12 (FIG. 13) to become discharged.

The schematic circuit diagram for a drive inverter is shown in FIG. 19. The drive inverter is used for the drivers 195 (FIG. 4), 147 (FIG. 4), 101 (FIG. 5), and 126 (FIG. 6). When the input signal on the conductor A is true, the transistor Q4 is back-biased by the current through the resistors R20 and R25, and the output signal on the conductor B decreases to the clamp level (−8 volts) of the diode CR35. When the input signal on the conductor A is false, the transistor Q4 is made conducting by the current through the resistor R26, resistor R20-capacitor C4, and the resistor 25. When the transistor Q4 is conducting, it can drive 120 milliamperes of current through the OR diodes CR23 and CR24 in the output circuit of the inverter.

The schematic circuit diagram for one portion of the timing circuit comprising the A<B comparator 69 (FIG. 4), the fifteen-microsecond delay line 70 (FIG. 4), and the attenuator 71 (FIG. 4) is shown in FIG. 20. The first input portion of this timing circuit comprises the summing amplifier 68 (FIG. 4), which is shown in FIG. 17 and has been described previously. The waveforms of this timing circuit are shown in FIG. 31.

The input signal appearing on the conductor A is received from the output of the summing amplifier 68 (FIGS. 4 and 17). The input to the summing amplifier 68 comprises the sum of the character waveform signals derived from the resistor matrix units 39 to 41 (FIG. 1). The significant frequencies of the character waveform signals range from ten to twenty-five kilocycles. These waveform signals in the resistor matrix units 39 to 41 do not change their frequency spectrum, and so the input signal to the summing amplifier 68 may therefore be defined as a sine wave with a frequency range of ten to twenty-five kilocycles. The input signal is applied through a high resistance to the summing amplifier 68. The input impedance of this timing circuit is low and has a quiescent D.C. level of approximately −20 volts. The input signal to the summing amplifier 68 is therefore a sine wave current, with its positive peak at zero (I.C., FIG. 31*a*). This input signal (I.C.) is amplified by the summing amplifier 68.

The output signal of the summing amplifier 68, which is a current-to voltage D.C. coupled amplifier, is then attenuated by the resistor R26 (attenuator 71, FIG. 4), and the signal A (FIG. 31*b*) is applied to the base of the transistor Q3. The output signal of the summing amplifier 68 is also delayed by the fifteen-microsecond delay line DL1 (70, FIG. 4), and the signal B (FIG. 31*b*) is applied to the base of the transistor Q1. The transistors Q1 and Q3 are connected in a difference amplifier circuit whose output (FIG. 31c) is equal to the difference of signals A and B (FIG. 31*b*). The output (FIG. 31*c*) of this difference amplifier is applied to a squaring circuit comprising the transistors Q2 and Q11. The threshold of the squaring circuit is such that the transitions of its output (FIG. 31*d*) on the output conductor B occur at approximately the same time as the zero crossings of its input signal (FIG. 31*c*) from the difference amplifier. Accordingly, this timing circuit provides a negative-going output signal (FIG. 31*d*) on the output conductor B when the delayed signal B (FIG. 31*b*) exceeds the level of the undelayed signal A (FIG. 31*b*). The negative-going output signal on the output conductor B should occur at a time $Td/2$ later than the negative peak of the input signal (I.C., FIG. 31*a*) to the summing amplifier 68, were $Td$ equals $\pm T1/12$ and $T1$ is equal to the period of the input current waveform to the summing amplifier 68.

The schematic circuit diagram for the A.C. inverters 82, 110, and 124 (FIG. 4) is shown in FIG. 21. The A.C. inverter comprises the transistor Q15, connected in the common emitter configuration. Normally, the transistor Q15 is biased to be non-conducting, and the voltage on the output conductor is held at −8 volts (false) by means of the clamp diode CR47. The voltage on the input conductor A is at 0 volts (true), and the bias at the base of the transistor Q15 is held at approximately +1.2 volts as determined by the forward voltage drop across the diode CR32. This positive threshold is maintained at the base of the transistor Q15 to guard against the possibility of operation from noise. When the voltage on the input conductor A goes false, the transistor Q15 conducts, and the voltage on the output conductor B goes true for a period determined by the capacitor C13 and resistor R43 time constant circuit and the storage time of the transistor Q15. The transistor Q15 remains conducting until the capacitor C13 becomes charged through the resistor R43. In this circuit, the charging of the capacitor C13 continues for approximately 4.0 microseconds, after which time the potential at the base of the transistor Q15 rises to approximately 1.2 volts. When the base potential of the transistor Q15 reaches approximately +0.3 volt, the transistor Q15 becomes nonconducting, and the inverter circuit is returned to its quiescent state.

The schematic circuit diagram for the one-shot circuits 79, 98, 113, and 154 (FIG. 4) is shown in FIG. 22. The triggered or input side of the one-shot circuit comprises two stages, the first stage comprising the transistor Q12, connected in the emitter follower configuration, and the second stage comprising the transistor Q11, connected in the common emitter configuration. The output side of the one-shot circuit comprises the transistor Q10, connected in the common emitter configuration. The emitter follower transistor Q12 reduces the amount of triggering power required and also the electrical size of the timing capacitor C9. The one-shot circuit is triggered into operation by a positive-going pulse signal (−8 to 0 volts), at which time the output level at B switches from −8 to 0 volts for a period determined mainly by the timing capacitor C9 and the resistors R24 and R14. The one-shot circuit uses an eight-volt Zener diode CR8, connected between ground and the resistor R14 to develop an eight-volt potential from the −20-volt source, which is connected to the resistor R7.

A positive-going signal on the input conductor A is coupled via the capacitor C19 and the diode CR14 to the base of the transistor Q12, rendering it non-conducting. The resistor R67 is part of an OR circuit whose diode may be external to the circuit. The voltage divider comprising the resistors R34 and R39 establishes a D.C. voltage of approximately −2 volts with respect to ground. The transistor Q12 remains non-conducting for a short time until the transistor Q11 is rendered non-conducting. When the transistor Q11 is rendered non-conducting, it causes the transistor Q12 to be conducting again, except that now its emitter potential is positive with respect to ground, and the transistor Q11 is kept non-conducting until the end of the unstable state of the one-shot circuit. The transistor Q12 is not in saturation in the unstable state of the one-shot circuit, but is conducting in the Class A manner.

When the transistor Q11 is rendered non-conducting, the developed pulse is transferred via the resistor R44 and the capacitor C14 to the base of the normally-non-conducting transistor Q10, causing it to become conducting. The capacitor C9 charges through the resistors R14 and R24 upon the rise of the collector voltage of the transistor Q10 and then begins to discharge. The voltage at the junction of the capacitor C9 and the resistor R24 decreases exponentially from approximately +7 volts to a negative value upon which the transistors Q11 and Q12 will again be conducting. The isolating diode CR19 is used to decrease leakage current which would affect the unstable state of the one-shot circuit. During the unstable state of the one-shot circuit, the diode CR29 and the resistor R57 hold the base of the transistor Q12 positive by a few tenths of a volt.

When the transistor Q10 begins to become non-conducting, the diode CR24 will become reverse-biased, isolating the slow discharge of the capacitor C9 from the transistor Q10 output stage. The output of the transistor Q10 at B is clamped at −8 volts by the diode CR7.

The schematic circuit diagram of the $T7'<T7/2$ comparator 75 (FIG. 4) or T7 peak detector circuit is shown in FIGS. 23 and 24. The comparator 75 provides a negative-going peak of a character waveform produced by the leading edge of a character arriving at tap T7 of the delay line 38. The comparator 75 comprises the transistors Q12 to Q20. The input signal is applied to conductor A from the emitter follower 46 (FIG. 1), which is coupled to tap T7 of the delay line 38. This input signal comprises a character waveform ranging in frequency between three and fifteen kilocycles, and the peak-to-peak input voltage amplitude may vary between two and thirty volts. The output signal of the comparator 75 appears on conductor D (FIG. 24) and is a pulse signal switching from 0 to −8 volts. This output signal switches to −8 volts when the delayed signal amplitude (output of fifteen-microsecond delay line 74, FIG. 4) is greater than the actual input signal. With a sine wave input signal, this event occurs 7.5 microseconds after the character waveform peak passes tap T7 of the delay line 38.

The input signal from the emitter follower 46 (FIG. 1) coupled to tap T7 of the delay line 38 is coupled via the capacitor C13 and the resistor R57 (FIG. 23) to the base of the transistor Q17. The transistors Q15, Q16, and Q17 constitute a summing amplifier. A second input signal of the same waveshape, except delayed by fifteen microseconds by the delay line DL2 and inverted by a delay line amplifier 77 (FIG. 4) comprising the transistors Q12, Q13, and Q14, is also applied to the base of the transistor Q17 via the resistor R48.

The delay line amplifier 77 (FIG. 4) comprises the transistor Q13 connected in the common emitter configuration, followed by a complementary push-pull stage comprising the NPN transistor Q12 and the PNP transistor Q14. The closed-loop gain of the delay line amplifier 77 is decreased and made adjustable by a feedback path comprising the resistors R34 and R37 and the capacitor C15. The gain of this delay line amplifier 77 is adjusted so that the peak voltages at the points E and F are equal in amplitude. The actual signals, though, as received by the summing amplifier (transistors Q15, Q16, and Q17) are not of the same amplitude. Because of the ratio between the values of the resistors R57 and R48, the delayed signal is approximately 2.06 times greater than the non-delayed signal.

The summing amplifier comprises the transistor Q17, connected in the common emitter configuration, the transistor Q16, connected in the emitter follower configuration, and the transistor Q15, which is used to regulate clipping. The transistor Q17 produces a high open-loop voltage gain and is directly coupled to the transistor Q16 to obtain a low output impedance. The closed-loop gain is set by the resistor R50. The diodes CR26 and CR27 assure that the transistor Q17 does not saturate. During the positive half-cycle of the waveform, it is clipped by the transistor Q15. The value for the resistors R45 and R49 are so chosen that the positive and negative clipping of the waveform is symmetrical.

The transistors Q18 and Q20 constitute a difference amplifier which is used as a level detector. This difference amplifier operates when the summing amplifier output crosses the reference axis in a positive direction. The capacitor C18 is charged to the quiescent voltage at the base of the transistor Q18. The value of capacitance for the capacitor C18 is large enough that the significant charging or discharging does not occur during signal excursions. The symmetrical clipping of the waveshape in the summing amplifier assures that any change in the charge on the capacitor C18 is equal to zero over any cycle.

During the periods when no input signal is present, the output of the difference amplifier is undefined. However, when an input waveform is present and the input signal begins going positive, the base potential of the transistor Q18 goes negative, causing it to conduct. The emitter potential of the transistors Q18 and Q20 then goes negative, reverse-biasing the transistor Q20. The transistor Q20 then ceases to conduct, causing the transistor Q19 in a squaring circuit to conduct. The output voltage on conductor D then becomes 0 volts. When the delayed signal is just equal to the actual signal, the A.C. component of voltage at the base of the transistor Q18 is zero. As the delayed voltage becomes greater than the actual voltage, the transistor Q18 becomes non-conductive, the transistor Q20 becomes conductive, and the transistor Q19 also becomes non-conductive, causing the output on the conductor D to switch to −8 volts. Accordingly, the comparator 75 develops a pulse output which switches to −8 volts when the delayed character waveform exceeds one half the non-delayed character waveform.

The schematic circuit diagram of the *T7'*<1.0-volt comparator 78 (FIG. 4) or T7 level detector circuit is shown in FIG. 25. The comparator 78 functions as both a voltage comparator and a noise discriminator. The inputs for the comparator 78 come from the emitter followers 45 (FIG. 1), which are coupled to taps T1 to T6 of the delay line 38, trigger reset R from inverter 129 (FIG. 7) and the signal T7*d'* from the delay line amplifier (transistors Q12 and Q14, FIG. 23). The output of the comparator 78 appears on the conductor C and is applied to the OR gate 76 (FIG. 4).

Two conditions must be satisfied for the output on conductor C to switch to −8 volts. The first condition is that the T7*d'* input must be equal to or greater than one volt, and the second condition is that the T7*d'* input must be greater than one third, in the illustrative embodiment, of the peak level of the voltages at the inputs T1 to T6.

The operation of the comparator 78 is as follows. A quiescent voltages of −20 volts is present at the inputs T1 to T6. Because of the diodes CR7 through CR12, only positive-going signals (more positive than −20 volts) are applied to the base of the transistor Q6. The transistors Q6 and Q9 serve as a peak detector. The transistor Q6 is connected as an emitter follower, and therefore its emitter follows the signals delivered at the T1 to T6 inputs. The capacitor C8 charges to the highest peak level of the transistor Q6's emitter. The emitter of the transistor Q9 follows the voltage on the emitter of the transistor Q6. The resistor R18, connected to the emitter of the transistor Q9, is one of the inputs to a summing amplifier comprising the transistors Q4, Q5, and Q8. The other input to the summing amplifier is the T7*d'* signal appearing on the conductor G. The transistors Q10 and Q7 are both inverters.

Assume that a character waveform has entered the delay line 38 and is so positioned that its first peak of approximately three volts is at tap T7 and its highest peak of approximately nine volts is at tap T4. The capacitor C8 then is charged to approximately −11 volts (−20 plus +9 volts). The base of the transistor Q8 is at −20 volts, and the voltage across the resistor R18 is approximately nine volts. The current through the resistor R18 (3K) is three milliamperes, and most of it flows into the emitter of the transistor Q4, allowing only enough base current for the transistor Q8 to keep it near saturation. Since the transistor Q4 is forward biased, the summing amplifier output at the junction of the resistors R27 and R28 is about 0.1 volt more negative than the base of the transistor Q8. The output of the summing amplifier does not change until the transistor Q4 ceases to conduct.

Now consider the effect of the input T7*d'*, which is a −3.0-volt signal obtained from the output of the amplifier 77 (FIG. 4). In response to this −3.0-volt signal, the current through the resistor R16 is approximately three milliamperes, and the transistor Q4 ceases to conduct. Because of a 1.0-volt noise threshold, the transistor Q4 would not have ceased to conduct if the signal voltage at tap T7 were below +1.0 volt. This fixed threshold level is established by the current source comprising the resistors R12, R17, and R18 connecting the base of the transistor Q8 to a +70-volt source. If the T7*d'* signal is less than −3.0 volts, the transistor Q4 would not cease to conduct because of the current flow through the resistor R18. Thus, even though a T7*d'* signal be greater than the 1.0-volt noise threshold, the comparator 78 develops a false output only if the T7*d'* signal is also greater than the maximum positive voltage on tap T1 to T6 of the delay line 38 divided by the constant K. The constant K, in the illustrative embodiment, is equal to resistor R18/resistor R16 or 3.

If the T7*d'* voltage increases further in the negative direction, meaning greater current flow through the resistor R16, then that additional current must come via resistor R27. For example, an increase in the T7*d'* voltage from −3.0 to −3.1 volts causes a corresponding increase in current through the resistor R27 of 0.1 milliampere. The voltage across the resistor R27, and therefore the transistor Q4 base level, then increases by about +5.0 volts. This action raises the gain of the summing amplifier from zero to 51 (resistor R27/resistor R16).

In the quiescent state, the junction of the resistors R28, R29, and R32 is more negative than the −20-volt supply connected to the emitter of the transistor Q10 by about 1.5 volts. This condition keeps the transistor Q10 nonconducting. However, when the summing amplifier output goes more positive, current flows into the base of the transistor Q10, causing it to conduct. When the collector of the transistor Q10 goes more negative than −8 volts, the transistor Q7 is rendered non-conducting, and the output on the conductor C switches to the −8-volt level.

It is important that the transistor Q8 not saturate, as this would present a variable input impedance to the capacitor C7, resulting in a D.C. level shift at the input to the summing amplifier. Accordingly, when the emitter of the transistor Q5 is about −12 volts, the diode CR2 conducts, placing the resistors R29 and R28 in the feedback loop. This condition reduces the gain of the summing amplifier to 0.69 (resistor R28 + resistor R29/resistor R16).

After a false output occurs on the output conductor C, the capacitor C8 is restored to −20 volts preparatory to receiving the input signal for a new character. The trigger reset input on the conductor A accomplishes this function by lowering the cathode of the diode CR1 to −20 volts. Within sixty microseconds, the capacitor C8 will discharge from the highest possible voltage to a voltage lower than the smallest input signal. The capacitor C8 discharges through the resistor R25, which is large enough in value to obtain reasonable dissipation of the transistor Q6. When the next character is in the delay line 38, the trigger reset signal switches to 0 volts, reverse-biasing the diode CR1.

The capacitors C4 and C5 and the resistor R19 reduce oscillations of the summing amplifier to a minimum. The diode CR23 establishes ground level for the transistor Q7 emitter follower, and the resistor R44 and the diode CR24 prevent the saturation of the transistor Q7.

The schematic circuit diagram for the multiple read and no read detection system 130 (FIG. 7) is shown in FIGS. 26 to 29 inclusive. The circuits of FIGS. 26 to 29 inclusive are shown in block diagram form in FIG. 30. The system 130 has six inputs, identified as A', B', C', D', E', and F'. These six inputs are the outputs from the "0" terminals of the flip-flop circuits 53 to 58 (FIG. 3). Each of the six inputs is applied to an inverter. The inverters comprise the transistors Q13, Q5, Q12, Q4, Q11, and Q3. In the inverters, the input signal level of 0 to −8 volts is inverted and increased to a −8 to +12 volts signal level. Each of the inverter output signals is coupled directly into two resistor adder networks. One resistor adder network comprises the resistors R40, R26, R37, R23, R34, R20, and R31. The other comprises the resistors R39, R25, R36, R22, R33, R19, and R32. The first resistor adder network is provided for multiple read (MR) detection, and the second is provided for no read (NR) detection. Each of the resistor adder network outputs is applied to a voltage level detector and then to a logic inverter. The voltage level detectors comprise the transistors Q9 and Q2, and the logic inverters comprise the transistors Q10 and Q1. Each logic inverter provides a true or false output signal. The MR output (FIG. 28) switches to 0 volts (true) if three or more of the flip-flop circuits 53 to 58 (FIG. 3) are in their set state. The NR′ output switches to 0 volts if two or more of the flip-flop circuits 53 to 58 are in their set state.

When the flip-flop circuits 53 to 58 are in their reset state, the input signals of the inverters (transistors Q3, Q5, etc.) are true. Under this condition, the individual transistors of these inverters are saturated, and all the input signals to the two resistor adder networks, except the −70-volt fixed potentials, are at a −8-volt potential. The level of the signal outputs of the two resistor adder networks are sensed by the two voltage level detectors comprising the transistors Q9 and Q2. In each case, the transistors Q9 and Q2 will not conduct until the proper number of inverters is cut off. The outputs of the two resistor adder networks increase by approximately +3 volts for each of the six inverters that are rendered non-conducting by application of a signal input of −8 volts (false). An adjustment of the two resistor adder networks output voltage levels with respect to ground is accomplished by the resistors R31 and R32, which are connected to a −70-volt source. The MR level detector (transistor Q9) conducts when its base potential exceeds the emitter level, which is 0 volts. The NR′ level detector (transistor Q2) conducts when its base potential is more positive than −8 volts, which is transistor Q2's emitter potential. The signal output from the collectors of the transistors Q2 and Q9 is directly coupled to the logic inverters (transistors Q10 and Q1).

When the input signal to the inverter comprising the transistor Q3, for example, switches to −8 volts (false), the base potential of the transistor Q3 increases until the clamp diode CR2 conducts. The voltage drop across the diode CR2 is then sufficient to cause the transistor Q3 to become non-conducting. The collector potential of the transistor Q3 increases until it reaches the +12-volt clamp level of the diode CR1. The diode CR1 also provides a low-impedance path to the resistor adder network.

When two of the inverters (transistors Q3, Q11, etc.) are rendered non-conducting, the output of the NR′ resistor adder network is raised sufficiently to cause the transistor Q2 to become conducting. The base of the transistor Q2 is clamped at −8 volts by the diode CR25 protecting the transistor Q2 from the possibility of receiving excessive base-to-emitter voltage. The collector of the transistor Q2 then goes negative, causing the transistor Q1 to become conducting. The transistor Q1 supplies a 0-volt (true) signal via the OR diode CR18 to the NR′ output conductor.

The above operation occurs normally when a two-out-of-six bit code is present in the flip-flop circuits 53 to 58 (FIG. 3). If more than two of these flip-flop circuits are in their set state, an equal number of inverters will be rendered non-conducting. A resulting potential greater than 0 volts will then be present at the base of the transistor Q9, causing it to conduct. The transistor Q10 will then be rendered conducting, and a 0-volt (true) signal will be present on the MR output conductor, indicating a multiple read condition.

The schematic circuit diagram of the clock circuit 96, the OR gate 95, and the inverter 97 of FIG. 5 is shown in FIG. 34. The clock circuit 96 comprises a two-stage crystal oscillator including the transistors Q3 and Q4. The signal output of the crystal oscillator is a sine wave which is coupled to a non-regenerative one-shot circuit for pulse shaping. The one-shot circuit comprises the transistors Q5 and Q6. The signal output of the one-shot circuit is then coupled to both an emitter follower and a logic inverter (97, FIG. 5). The emitter follower comprises the transistor Q7, and the logic inverter comprises the transistor Q8. An OR gate (95, FIG. 5), comprising the diodes CR6 and CR8, intervenes between the output of the one-shot circuit and the logic inverter. The clock inhibit signal is logically combined with the output of the one-shot circuit at the OR gate (95, FIG. 5). Pulses can then be inhibited from reaching the logic inverter. The output signal from the logic inverter varies between −8 volts and 0 volts. The period of this output signal is four microseconds, and of this period the signal is at 0 volts for 1.35 microseconds.

The clock circuit 96 is a 250-kilocycle oscillator comprising the transistors Q3 and Q4, which are connected in series in the common emitter configuration. Positive feedback from the output of the second stage to the first stage is provided. The first stage (transistor Q3) operates Class A to avoid unnecessary distortion, which would tend to destroy the inherent frequency stability of the crystal Y1. The gain of the first stage is unity, and is used to provide a constant impedance for the crystal Y1. The second stage (transistor Q4) is operated Class AB in order to obtain high efficiency (approximately 50%) with moderate output power. Under quiescent conditions, the transistor Q4 is biased just into conductivity. The inductor L1 and the capacitor C10 tune the collector load of the transistor Q4 to 250 kilocycles to eliminate the possibility of the crystal Y1 operating at some multiple of that frequency. The resistor R24 and the capacitor C16 are also in series in the feedback line. The resistor R24 reduces power dissipation in the crystal Y1 below one milliwatt, and the capacitor C16 is used as a trimming capacitor. The output of the oscillator at the resistor R27 is a sine wave having a peak-to-peak amplitude of approximately sixteen volts.

The transistor Q5 circuit is a pulse shaper stage. The sinusoidal output signal from the oscillator is applied to the base of the transistor Q5 and is converted to a two-volt peak-to-peak square wave signal capable of driving the transistor Q6 one-shot circuit stage. The diode CR2 in the base circuit of the transistor Q5 is used to equalize the impedance seen by the oscillator during each half-cycle. A negative-going signal applied to the transistor Q5 causes it to saturate and impress a positive-going voltage at the trimming capacitor C13, thus causing the transistor Q6 to become reverse-biased and to become non-conductive. The width of the pulse output of the one-shot circuit is determined by the discharge time of the capacitor C13 through the resistor R19. An L-C filter, comprising the inductor L2 and the capacitor C12, is used to decrease the effect of any voltage variation of the −20-volt supply on the one-shot circuit.

The output of the one-shot circuit (transistors Q5 and Q6) is applied to the emitter follower (transistor Q7) and the logic inverter (transistor Q8). The emitter follower output at point A switches between 0 and −8 volts, as the output of the one-shot circuit does. The emitter follower 282 (FIG. 5) output is coupled via the diode CR11 to the OR gate 237 at the input of the R1–R13 counter 210 (FIG. 6). It is also coupled via the diode CR10 and the inverter 100 (FIG. 5) to the AND gates 99 (FIG. 5) and 127 (FIG. 6) for causing the resetting of the counters 83 and 210. The OR gate (diodes CR6 and CR8) intervenes between the one-shot circuit output and the inverter 97 (FIG. 5). The clock inhibit signal (0 volts) from the inverter 94 (FIG. 5) is used to inhibit the operation of the inverter. The output of the inverter (transistor Q8) is coupled to the OR gate 103 and the P1 flip-flop circuit 84 (FIG. 5).

While the form of the invention shown and described herein is admirably adapted to fulfill the objects primarily stated, it is to be understood that it is not intended to confine the invention to the forms or embodiments disclosed herein, for it is susceptible of embodiment in various other forms.

What is claimed is:

1. In a system for identifying each of a plurality of different waveshapes, apparatus comprising:

a plurality of transmission channels equal in number to the number of said different waveshapes, each of said transmission channels corresponding to one of said waveshapes;

sampling means for receiving any one of said waveshapes and in response thereto for delivering a plurality of signal samples of said waveshape to all of said transmission channels;

each of said transmission channels having a plurality of multiplying elements disposed therein, each of said plurality of multiplying elements being adapted to multiply the amplitude of a signal applied thereto by a value proportional to the amplitude of a respective signal sample delivered by said sampling means when said corresponding channel waveshape occupies a reference position in said sampling means to produce multiplied signals of a like polarity;

each of said transmission channels having at least one additional multiplying element disposed therein, each of said additional multiplying elements being adapted to multiply the amplitude of a signal applied thereto by a value proportional to the amplitude of another signal sample that may be delivered by said sampling means when a different channel waveshape occupies said reference position in said sampling means to produce a multiplied signal of a polarity different from those multiplied signals produced by said plurality of multiplying elements;

each of said plurality of multiplying elements being coupled to receive said respective one of the signal samples delivered to the associated transmission channel when said corresponding channel waveshape occupies said reference position in said sampling means to produce said multiplied signals of a like polarity;

each of said additional multiplying elements being coupled to receive another one of the signal samples that may be delivered to the associated transmission channel when said different channel waveshape occupies said reference position in said sampling means to produce said multiplied signals of a polarity different from those multiplied signals produced by said plurality of multiplying elements;

means in each of said transmission channels for combining all of said multiplied signals produced by the multiplying elements therein when a waveshape occupies said reference position in said sampling means and for delivering a corresponding combination signal;

and means for sensing the combination signals delivered by all of said transmission channels to determine which one of said delivered signals has the greatest amplitude and for producing a signal identifying the one of said transmission channels which delivers said greatest amplitude signal.

2. In a system for identifying each of a plurality of different waveshapes, apparatus comprising:

a plurality of transmission channels equal in number to the number of said different waveshapes, each of said transmission channels corresponding to one of said waveshapes;

sampling means for receiving any one of said waveshapes and in response thereto for delivering a plurality of signal samples of said waveshape to all of said transmission channels;

each of said transmission channels having a plurality of multiplying elements disposed therein, each of said plurality of multiplying elements being adapted to multiply the amplitude of a signal applied thereto by a value proportional to the amplitude of a respective signal sample delivered by said sampling means when said corresponding channel waveshape occupies a reference position in said sampling means to produce multiplied signals of a negative polarity;

each of said transmission channels having at least one additional multiplying element disposed therein, each of said additional multiplying elements being adapted to multiply the amplitude of a signal applied thereto by a value proportional to the amplitude of another signal sample that may be delivered by said sampling means when a different channel waveshape occupies said reference position in said sampling means to produce a multiplied signal of a positive polarity;

each of said plurality of multiplying elements being coupled to receive said respective one of the signal samples delivered to the associated transmission channel when said corresponding channel waveshape occupies said reference position in said sampling means to produce said multiplied signals of a negative polarity;

each of said additional multiplying elements being coupled to receive another one of said signal samples that may be delivered to the associated transmission channel when said different channel waveshape occupies said reference position in said sampling means to produce said multiplied signal of a positive polarity;

means in each of said transmission channels for combining all of said multiplied signals produced by the multiplying elements therein when a waveshape occupies said reference position in said sampling means and for delivering a corresponding combination signal;

and means for sensing the combination signals delivered by all of said transmission channels to determine which one of said delivered signals has the greatest amplitude and for producing a signal identifying the one of said transmission channels which delivers said greatest amplitude signal.

3. In a system for identifying each of a plurality of different waveshapes, apparatus comprising:

a plurality of transmission channels equal in number to the number of said different waveshapes, each of said transmission channels corresponding to one of said waveshapes;

sampling means for receiving any one of said waveshapes and in response thereto for delivering a plurality of signal samples of said waveshape to all of said transmission channels;

each of said transmission channels having a plurality of multiplying elements disposed therein, each of said plurality of multiplying elements being adapted to multiply the amplitude of a signal applied thereto by a value proportional to the amplitude of a respective signal sample delivered by said sampling means when said corresponding channel waveshape occupies a reference position in said sampling means to produce multiplied signals of a like polarity;

each of said transmission channels having at least one additional multiplying element and an associated unidirectional conducting device disposed therein, each of said additional multiplying elements being adapted to multiply the amplitude of a signal applied thereto by a value proportional to the amplitude of another signal sample that may be delivered by said sampling means when a different channel waveshape occupies said reference position in said sampling means to produce a multiplied signal of a polarity different from those multiplied signals produced by said first plurality of multiplying elements;

each of said plurality of multiplying elements being coupled to receive said respective one of the signal samples delivered to the associated transmission channel when said corresponding channel waveshape occupies said reference position in said sampling means to produce said multiplied signals of a like polarity;

each of said additional multiplying elements being coupled through said unidirectional conducting device to receive another one of the signal samples that may be delivered to the associated transmission channel when said different channel waveshape occupies said reference position in said sampling means to produce said multiplied signals of a polarity different from those multiplied signals produced by said plurality of multiplying elements;

means in each of said transmission channels for combining all of said multiplied signals produced by the multiplying elements therein when a waveshape occupies said reference position in said sampling means and for delivering a corresponding combination signal;

and means for sensing the combination signals delivered by all of said transmission channels to determine which one of said delivered signals has the greatest amplitude and for producing a signal identifying the one of said transmission channels which delivers said greatest amplitude signal.

References Cited by the Examiner

UNITED STATES PATENTS 3,233,220 2/1966 Wilby ------------ 340—146.3

FOREIGN PATENTS 1,317,398 1/1963 France.

MAYNARD R. WILBUR, *Primary Examiner.*

MALCOLM A. MORRISON, *Examiner.*

J. E. SMITH, *Assistant Examiner.*